(12) United States Patent
Yaghi et al.

(10) Patent No.: US 8,540,802 B2
(45) Date of Patent: Sep. 24, 2013

(54) ADSORPTIVE GAS SEPARATION OF MULTI-COMPONENT GASES

(75) Inventors: Omar M. Yaghi, Los Angeles, CA (US); Hideki Hayashi, Kumamoto (JP); Rahul Banerjee, Maharashtra (IN)

(73) Assignee: The Regents of the University of California, Oakland, CA (US)

( * ) Notice: Subject to any disclaimer, the term of this patent is extended or adjusted under 35 U.S.C. 154(b) by 631 days.

(21) Appl. No.: 12/598,855

(22) PCT Filed: May 9, 2008

(86) PCT No.: PCT/US2008/006008
§ 371 (c)(1),
(2), (4) Date: Nov. 4, 2009

(87) PCT Pub. No.: WO2008/140788
PCT Pub. Date: Nov. 20, 2008

(65) Prior Publication Data
US 2010/0132549 A1  Jun. 3, 2010

Related U.S. Application Data

(60) Provisional application No. 60/917,611, filed on May 11, 2007.

(51) Int. Cl.
*B01D 53/02* (2006.01)
(52) U.S. Cl.
USPC ........ 95/128; 95/90; 95/116; 95/127; 95/130; 95/131; 95/139; 95/140; 95/141; 95/143; 95/900; 95/902; 96/108; 96/153; 96/154; 210/502.1; 210/660; 502/400; 548/101; 548/108

(58) Field of Classification Search
USPC ............... 96/108, 153, 154; 95/90, 116, 127, 95/128, 130, 131, 139–141, 143, 900, 902; 548/101, 108; 210/502.1, 660; 502/400
See application file for complete search history.

(56) References Cited

U.S. PATENT DOCUMENTS

| | | | |
|---|---|---|---|
| 4,532,225 A | 7/1985 | Tsao et al. | |
| 5,160,500 A | 11/1992 | Chu et al. | |
| 5,208,335 A | 5/1993 | Ramprasad et al. | |
| 5,648,508 A | 7/1997 | Yaghi | |
| 5,779,904 A * | 7/1998 | Ruderman et al. | ....... 210/500.25 |
| 6,479,447 B2 | 11/2002 | Bijl et al. | |
| 6,501,000 B1 | 12/2002 | Stibrany et al. | |
| 6,617,467 B1 | 9/2003 | Muller et al. | |
| 6,624,318 B1 | 9/2003 | Muller et al. | |

(Continued)

FOREIGN PATENT DOCUMENTS

| | | |
|---|---|---|
| DE | 102005023856 A1 | 11/2006 |
| DE | 102005054523 A1 | 5/2007 |

(Continued)

OTHER PUBLICATIONS

Ashton, Peter R et al., "Hydrogen-Bonded Complexes of Aromatic Crown Ethers with (9-Anthracenyl) methylammonium Derivatives" J. Am. Chem. Soc., 1997, 119 (44), pp. 10641-10651.

(Continued)

*Primary Examiner* — Christopher P Jones
(74) *Attorney, Agent, or Firm* — Joseph R. Baker, Jr.; Gavrilovich, Dodd & Lindsey LLP

(57) ABSTRACT

The disclosure relates generally to a gas-separation system for separating one or more components from a multi-component gas using Zeolitic imidazolate or imidazolate-derived framework.

12 Claims, 31 Drawing Sheets

(56) References Cited

U.S. PATENT DOCUMENTS

| | | | |
|---|---|---|---|
| 6,893,564 B2 | 5/2005 | Mueller et al. |
| 6,929,679 B2 | 8/2005 | Muller et al. |
| 6,930,193 B2 | 8/2005 | Yaghi et al. |
| 7,196,210 B2 | 3/2007 | Yaghi et al. |
| 7,202,385 B2 | 4/2007 | Mueller et al. |
| 7,279,517 B2 | 10/2007 | Mueller et al. |
| 7,309,380 B2 | 12/2007 | Muller et al. |
| 7,343,747 B2 | 3/2008 | Muller et al. |
| 7,411,081 B2 | 8/2008 | Mueller et al. |
| 7,524,444 B2 | 4/2009 | Hesse et al. |
| 7,582,798 B2 | 9/2009 | Yaghi et al. |
| 7,652,132 B2 | 1/2010 | Yaghi et al. |
| 7,662,746 B2 | 2/2010 | Yaghi et al. |
| 7,799,120 B2 | 9/2010 | Yaghi et al. |
| 7,815,716 B2 | 10/2010 | Mueller et al. |
| 2003/0004364 A1 | 1/2003 | Yaghi et al. |
| 2003/0078311 A1 | 4/2003 | Muller et al. |
| 2003/0148165 A1 | 8/2003 | Muller et al. |
| 2003/0222023 A1 | 12/2003 | Mueller et al. |
| 2004/0081611 A1 | 4/2004 | Muller et al. |
| 2004/0225134 A1 | 11/2004 | Yaghi et al. |
| 2004/0249189 A1 | 12/2004 | Mueller et al. |
| 2004/0265670 A1 | 12/2004 | Muller et al. |
| 2005/0004404 A1 | 1/2005 | Muller et al. |
| 2005/0014371 A1 | 1/2005 | Tsapatsis |
| 2005/0124819 A1 | 6/2005 | Yaghi et al. |
| 2005/0154222 A1 | 7/2005 | Muller et al. |
| 2005/0192175 A1 | 9/2005 | Yaghi et al. |
| 2006/0057057 A1 | 3/2006 | Muller et al. |
| 2006/0135824 A1 | 6/2006 | Mueller et al. |
| 2006/0154807 A1 | 7/2006 | Yaghi et al. |
| 2006/0185388 A1 | 8/2006 | Muller et al. |
| 2006/0252641 A1 | 11/2006 | Yaghi et al. |
| 2006/0252972 A1 | 11/2006 | Pilliod et al. |
| 2006/0287190 A1 | 12/2006 | Eddaoudi et al. |
| 2007/0068389 A1 | 3/2007 | Yaghi |
| 2007/0202038 A1 | 8/2007 | Yaghi et al. |
| 2008/0184883 A1 | 8/2008 | Zhou et al. |
| 2009/0155588 A1 | 6/2009 | Hesse et al. |
| 2010/0132549 A1 | 6/2010 | Yaghi et al. |
| 2010/0143693 A1 | 6/2010 | Yaghi et al. |
| 2010/0286022 A1 | 11/2010 | Yaghi et al. |
| 2011/0137025 A1 | 6/2011 | Yaghi et al. |

FOREIGN PATENT DOCUMENTS

| | | | |
|---|---|---|---|
| EP | 1674555 A1 | 6/2006 |
| WO | 2004101575 A2 | 11/2004 |
| WO | 2006072573 A2 | 7/2006 |
| WO | 2006116340 A1 | 11/2006 |
| WO | 2007101241 A2 | 9/2007 |
| WO | 2007111739 A2 | 10/2007 |
| WO | 2008091976 A1 | 7/2008 |
| WO | 2008138989 A1 | 11/2008 |
| WO | 2008140788 A1 | 11/2008 |
| WO | 2009020745 A9 | 2/2009 |
| WO | 2009042802 A1 | 4/2009 |
| WO | 2009149381 A2 | 12/2009 |
| WO | 2010078337 A1 | 7/2010 |
| WO | 2010080618 A1 | 7/2010 |
| WO | 2010083418 A1 | 7/2010 |
| WO | 2010088629 A1 | 8/2010 |
| WO | 2010090683 A1 | 8/2010 |
| WO | 2010148276 A3 | 12/2010 |
| WO | 2010148296 A3 | 12/2010 |
| WO | 2010148374 A3 | 12/2010 |
| WO | 2011014503 A1 | 2/2011 |
| WO | 2011038208 A2 | 3/2011 |

OTHER PUBLICATIONS

Carlucci, Lucia et al., "Polycatenation, polythreading and polyknotting in coordination network chemistry" Coordination Chemistry Reviews 246, 2003, pp. 247-289, Elsevier.

Han, SS et al., "Improved designs of metal-organic frameworks for hydrogen storage" Angew. Chem. Int. Ed. 2007, 46, pp. 6289-6292.

Kim, Su Mi, International Search Report and Written Opinion, Date of Mailing: Feb. 24, 2010, International Application No. PCT/US09/46463.

Loeb, SJ, "Rotaxanes as ligands: from molecules to materials" Chemical Society reviews, 2007, 36, pp. 226-235.

Moyse, Ellen, International Preliminary Report on Patentability and Written Opinion, Date of Issuance of Report: Nov. 17, 2009, International Application No. PCT/US08/006008.

Nickitas-Etienne, Athina, International Preliminary Report on Patentability and Written Opinion, Date of Issuance of Report: Jan. 19, 2010, International Application No. PCT/US08/70149.

Wong-Foy, AG et al., "Exceptional H2 saturation uptake in microporous metal-organic frameworks" J. Am. Chem. Soc., 2006, 128, pp. 3494-3495.

Young, Lee W., International Search Report and Written Opinion, Date of Mailing: Jan. 12, 2009, International Application No. PCT/US08/70149.

Young, Lee W., International Search Report and Written Opinion, Date of Mailing of Report: May 7, 2008, International Application No. PCT/US08/51859.

Young, Lee W., International Search Report and Written Opinion, Date of Mailing: Dec. 2, 2008, International Application No. PCT/US08/77741.

Nickitas-Etienne, Athina. International Preliminary Report on Patentability for PCT/US2008/07741. Mar. 30, 2010.

Nickitas-Etienne, Athina, International Preliminary Report on Patentability for PCT/US2009/068731. Jun. 21, 2011.

Nickitas-Etienne, Athina. International Preliminary Report on Patentability for PCT/US2009/068849. Jun. 30, 2011.

O'Keefe et al., "Germanate Zeolites: Contrasting the Behavior of Germanate and Silicate Structures Built from Cubic T8O20 units (T=Si or Ge)," Chem. Eur. J. 5:2796-2801 (1999).

O'Keefe et al., "Frameworks for Extended Solids: Geometrical Design Principles," J. Solid State Chem. 152:3-20 (2000).

Okeeffe et al., "Reticular Chemistry—Present and Future Prospects—Introduction,"J. Solid State Chem.178:V-VI (2005).

O'Keeffe et al., "The Reticular Chemistry Structure Resource (RCSR) Database of, and Symbols for, Crystal Nets," Acc. Chem. Res. 41:1782-1789 (2008).

Park, Jae Woo. International Search Report for PCT/US2010/039123. Feb. 24, 2011.

Patteux, Claudine. International Search Report for PCT/US2010/043373. Oct. 10, 2010.

Phan et al., "Synthesis, Structure, and Carbon Dioxide Capture Properties of Zeolitic Imidazolate Frameworks," Acc. Chem. Res 43:58-67 (2009).

Plevert et al., "A Flexible Germanate Structure Containing 24-Ring Channels With Very Low Framework Density," J. Am. Chem. Soc. 123:12706-12707 (2001).

Plevert et al., "Synthesis and Characterization of Zirconogermanates," Inorg. Chem., 42:5954-5959 (2003).

Plevert et al., "Layered Structures Constructed from New Linkages of Ge7(O,OH,F)19 Clusters," Chem. Mater. 15:714-718 (2003).

Rosi et al., "Advances in the Chemistry of Metal-Organic Frameworks," CrystEngComm 4:401-404 (2002).

Rosi et al., "Hydrogen Storage in Microporous Metal-Organic Frameworks," Science 300:1127-1129 (2003); Featured in (1) Chemical & Engineering News magazine, May 19, 2004, and (2) Technology Research News Magazine, May 21, 2003.

Rowsell et al., "Hydrogen Sorption in Functionalized Metal-Organic Frameworks," J. Am. Chem. Soc.126: 5666-5667 (2004).

Rowsell et al., "Strategies for Hydrogen Storage in Metal-Organic Frameworks," Angew. Chem. Int. Ed. 44: 4670-4679 (2005).

Rowsell et al., "Gas Adsorption Sites in a Large-Pore Metal-Organic Framework," Science 309:1350-1354 (2005).

Rowsell et al., "Effects of Functionalization, Catenation, and Variation of the Metal Oxide and Organic Linking Units on the Low-Pressure Hydrogen Adsorption Properties of Metal-Organic Frameworks," J. Am. Chem. Soc. 128: 1304-1315 (2006).

Spencer et al., "Determination of the Hydrogen Absorption Sites in Zn4O(1,4-benzenedicarboxylate) by Single Crystal Neutron Diffraction," Chem. Commun. 3:278-280 (2006); Epub Dec. 6, 2005.

Sudik et al., "Metal-Organic Frameworks Based on Trigonal Prismatic Building Blocks and the New "acs" Topology," Inorg. Chem. 44:2998-3000 (2005).

Sudik et al., "A Metal-Organic Framework with a Hierarchical System of Pores and Tetrahedral Bbuilding Blocks," Angew. Chem. Int. Ed. 45:2528-2533 (2006).

Vodak et al., "Computation of Aromatic C3N4 Networks and Synthesis of the Molecular Precursor N(C3N3)3C16," Chem. Eur. J. 9:4197-4201 (2003).

Wang et al., "Colossal Cages in Zeolitic Imidazolate Frameworks as Selective Carbon Dioxide Reservoirs," Nature 453:207-211 (2008).

Yaghi et al., "Selective binding and removal of guests in a microporous metal-organic framework," Nature, Dec. 1995, pp. 703-706, vol. 378.

Yaghi et al., "Conversion of Hydrogen-Bonded manganese(II) and zinc(II) squarate (C4O42-) molecules, Chains, and Sheets to 3-D Cage Networks," J. Chem. Soc., Dalton Trans., 1995, 727-732.

Yaghi et al., "Construction of Mictoporous Materials from Molecular Building Blocks," Fundamental Materials Research, T. J. Pinnavaia and M. F. Thorpe, eds., vol. II, Plenum: New York, p. 111 (1995).

Yaghi et al., "Conversion of Molecules and Clusters to Extended 3-D Cage and Channel Networks," Metal Containing Polymeric Materials, C. U. Pittman, C. E. Carraher, B. M. Culbertson, M. Zeldin, J. E. Sheets, Eds., Plenum: New York, p. 219 (1996).

Yaghi et al., "Designing Microporosity in Coordination Solids," Modular Chemistry, J. Michl, Ed., Kluwer: Boston, p. 663 (1997).

Yaghi et al., "Synthetic Strategies, Structure Patterns, and Emerging Properties in the Chemistry of Modular Porous Solids," Acc. Chem. Res. 31:474-484 (1998).

Yaghi et al., "Transformation of Germanium Dioxide to 4-Connected Porous Germanate Net," J. Am. Chem. Soc., 20:10569-10570 (1998).

Yaghi et al., "Design of Solids from Molecular Building Blocks: Golden Opportunities for Solid State Chemistry," J. Solid State Chem. 152, 1-2 (2000).

Yaghi et al., "A Molecular World Full of Holes," Chem. Innov. p. 3 (2000).

Yaghi et al., "Reticular Synthesis and the Design of New Materials," Nature 423:705-714 (2003).

Yaghi, Omar., "Porous Crystals for Carbon Dioxide Storage," slide presentation at the Fifth Annual Conference on Carbon Capture & Sequestration, US Department of Energy on May 10, 2006 http://www.netl.doe.gov/publications/proceedings/06/carbon-seq/Tech%20Session%20193.pdf.

Yaghi, Omar, "Hydrogen Storage in Metal-Organic Frameworks," slide presentation to DOE Hydrogen Program 2007 Annual Merit Review, US Department of Energy, on May 15, 2007 at http://www.hydrogen.energy.gov/pdfs/review07/st_10_yaghi.pdf.

Yaghi et al., "Metal-Organic Frameworks: A Tale of Two Entanglements," Nature materials 6:92-93 (2007).

Yaghi et al., "Reticular Chemistry and Metal-Organic Frameworks for Clean Energy," MRS Bulletin 34:682-690 (2009).

Young, Lee W., International Search Report and Written Opinion, Jan. 12, 2009, International Application No. PCT/US08/70149.

Young, Jung Doo. International Search Report for PCT/US2010/050170. Date of Mailing: Jun. 8, 2011.

Zhang et al., "Docking in Metal-Organic Frameworks," Science 325:855-859 (2009).

Zhao, Wei. The First Office Action for Chinese Application No. 200880003157.2. The State Intellectual Property Office of the People's Republic of China. Issue Date: Aug 5, 2011.

Andrew et al., "Post-Synthetic Modification of Tagged MOFs," Angew. Chem. Int. Ed. 47:8482-8486 (2008).

Baharlou, Simin. International Preliminary Report on Patentability for PCT/US2009/046463. Date of Mailing: Dec. 16, 2010.

Banerjee et al., "High-Throughput Synthesis of Zeolitic Imidazolate Frameworks and Application to CO2 Capture," Science 319:939-943 (2008).

Banerjee et al., "Control of Pore Size and Functionality in Isoreticular Zeolitic Imidazolate Frameworks and their Carbon Dioxide Selective Capture Properties," J. Am. Chem. Soc. 131:3875-3877 (2009).

Barman et al., "Azulene Based Metal-Organic Frameworks for Strong Adsorption of H2," Chem. Commun. 46: 7981-7983 (2010).

Barton et al., "Tailored Porous Materials," Chem. Mater. 11:2633-2656 (1999).

Bloch et al., "Metal Insertion in a Microporous Metal-Organic Framework Lined with 2,2'-Bipyridine" J. Am. Chem. Soc. 132:14382-14384 (2010).

Chae et al., "A Route to High Surface Area, Porosity and Inclusion of Large Molecules in Crystals," Nature 427, 523-527 (2004); Featured in (1) Chemical & Engineering News magazine, Feb. 9, 2004, (2) BBC World Service, Feb. 4, (3) New Scientist, Feb. 4.

Czaja et al., "Industrial applications of metal-organic frameworks," Chemical Society Reviews 38(5):1284-1293 (2009).

Delgado-Friedrichs et al., "Three-Periodic Nets and Tilings: Regular and Quasiregular Nets," Acta Cryst. A59: 22-27 (2003).

Delgado-Friedrichs et al., "Three-Periodic Nets and Tilings: Semiregular Nets," Acta Cryst. A59:515-525 (2003).

Delgado-Friedrichs et al., "The CdSO4, Rutile, Cooperate and Quartz Dual Nets: Interpenetration and Catenation," Solid State Sciences 5:73-78 (2003).

Delgado-Friedrichs et al., "Reticular Chemistry: Occurrence and Taxonomy of Nets, and Grammar for the Design of Frameworks," Acc. Chem. Res. 38:176-182 (2005).

Delgado-Friedrichs et al. "What Do We Know About Three-Periodic Nets?," J. Solid State Chem. 178: 2533-2554 (2005).

Delgado-Friedrichs et al. "Three-Periodic Nets and Tilings: Edge-Transitive Binodal Structures," Acta Cryst. 62:350-355 (2006).

Delgado-Friedrichs et al., "Taxonomy of Periodic Nets and the Design of Materials," Phys. Chem. 9:1035-1043 (2007).

Deng et al., "Multiple Functional Groups of Varying Ratios in Metal-Organic Frameworks," Science 327:846-850 (2010).

Deng et al., "Robust dynamics" Nature Chem. 2:439-443 (2010).

Duren et al., "Design of New Materials for Methane Storage," Langmuir 20:2683-2689 (2004).

Eddaoudi et al., "Modular Chemistry: Secondary Building Units as a Basis for the Design of Highly Porous and Robust Metal-Organic Carboxylate Frameworks" Acc. Chem. Res. 34:319-330 (2001).

Eddaoudi et al., "Geometric Requirements and Examples of Important Structures in the Assembly of Square Building Blocks," Proc. Natl. Acad. Sci. 99:4900-4904 (2002).

Eddaoudi et al., "Systematic Design of Pore Size and Functionality in Isoreticular Metal-Organic Frameworks and Application in Methane Storage," Science 295:469-472 (2002): Featured in (1) Chemical and Engineering News, Jan. 21, 2002, and (2) Chemical Insight magazine, Nov. 15, 2002.

Furukawa et al., "Control of Vertex Geometry, Structure Dimensionality, Functionality, and Pore Metrics in the Reticular Synthesis of Crystalline Metal-Organic Frameworks and Polyhedra," J. Am. Chem. Soc.130:11650-11661 (2008).

Furukawa et al., "Ultra-High Porosity in Metal-Organic Frameworks," Science 239:424-428 (2010).

Goebel, Matthias, Supplemental European Search Report and Written Opinion for EP08826913. Date of Completion of Search and Written Opinion: Nov. 10, 2010.

Goebel, Matthias, Supplemental European Search Report and Written Opinion for EP08754337. Date of Completion of Search and Written Opinion: Dec. 3, 2010.

Grzesiak et al., "Polymer-Induced Heteronucleation for the Discovery of New Extended Solids," Angew. Chem. Int. Ed. 45:2553-2556 (2006).

Halper et al., "Topological Control in Heterometallic Metal-Organic Frameworks by Anion Templating and Metalloligand Design," J. Am. Chem. Soc. 128:15255-15268 (2006).

Hayashi et al., "Zeolite A Imidazolate Frameworks," Nature Materials 6:501-506 (2007).

Hexiang et al., "Multiple Functional Groups of Varying Rations in Metal-Organic Frameworks," Science 327 (5967):846-850 (2010).

Honda, Masashi, International Preliminary Report on Patentability for PCT/US2008/051859. Date of Issuance of the Report: Jul. 28, 2009.

Howe, Patrick. International Search Report and Written Opinion for PCT/US2009/068849. Date of Mailing of the Search Report: Jun. 4, 2010.

Howe, Patrick. International Search Report and Written Opinion for PCT/US2010/022777. Date of Mailing: Jun. 7, 2010.

Huang et al., "Ligand-Directed Strategy for Zeolite-Type Metal—Organic Frameworks: Zinc(ii) Imidazolates with Unusual Zeolitic Topologies," Angew. Chem. Int. Ed. 45:1557-1559 (2006).

Kim et al., "Assembly of Metal-Organic Frameworks From Large Organic and Inorganic Secondary Building Units: New Examples and Simplifying Principles for Complex Structures," J. Am. Chem. Soc. 123:8239-8247 (2001).

Kim, Su Mi, International Search Report and Written Opinion for PCT/US2009/068731. Date of Mailing: Aug. 19, 2010.

Kim, Su Mi. International Search Report for PCT/US2010/039154. Date of Mailing: Feb. 23, 2011.

Klaes, Daphne. International Search Report and Written Opinion for PCT/US2010/021201. Date of Mailing: Apr. 27, 2010.

Lee, Ji Min. International Search Report for PCT/US2010/039284. Date of Mailing: Feb. 22, 2011.

Li et al., "Design and Synthesis of an Exceptionally Stable and Highly Porous Metal-Organic Framework," Science 402:276-279 (1999); Featured in (1) Chemical and Engineering News (Nov. 22, 19999) and (2) Science News (Nov. 20, 1999).

Linder, Nora. International Preliminary Report on Patentability for PCT/US2010/022777. Date of Mailing: Aug. 11, 2011.

Long et al., "The Pervasive Chemistry of Metal-Organic Frameworks," Chem. Soc. Rev. 38:1213-1214 (2009).

Lu et al., "Synthesis and Structure of Chemically Stable Metal-Organic Polyhedra," J. Am. Chem. Soc. 131:(35) 12532-12533 (2009).

Michalitsch, Richard. International Search Report and Written Opinion for PCT/US2009/069700. Date of Mailing: May 7, 2010.

Morris et al., "Crystals as Molecules: Postsynthesis Covalent Functionalization of Zeolitic Imidazolate Frameworks," J. Am. Chem. Soc. 130:12626-12627 (2008).

Morris et al., "A Combined Experimental—Computational Investigation of Carbon Dioxide Capture in a Series of Isoreticular Zeolitic Imidazolate Frameworks," J. Am. Chem. Soc. 132:11006-11008 (2010).

Mulfort et al., "Chemical Reduction of Metal-Organic Framework Materials as a Method to Enhance Gas Uptake and Binding," J. Am. Chem. Soc. 129:9604-9605 (2007).

Mulhausen, Dorothee. International Preliminary Report on Patentability for PCT/US2009/069700. Date of Mailing: Jul. 7, 2011.

Mulhausen, Dorothee. International Preliminary Report on Patentability for PCT/US2010/021201. Date of Mailing Jul. 28, 2011.

Ni et al,. "Porous Metal-Organic Truncated Octahedron Constructed from Paddle-Wheel Squares and Terthiophene Links," J. Am. Chem. Soc. 127:12752-12753 (2005).

Young, Lee W., "International search Report and Written Opinion," PCT/US08/06008, United States Patent & Trademark Office, Aug. 20, 2008.

Park, Kyo Sung et al., "Exceptional chemical and thermal stability of zeolitic imidazolate frameworks," Proc. Natl. Acad. Sci., Jul. 5, 2006, pp. 10186-10191, vol. 103, No. 27.

* cited by examiner (a)

(b)

ZIF-20

ZIF-21

ZIF-22

ZIF-23

ADSORPTIVE GAS SEPARATION OF MULTI-COMPONENT GASES

CROSS REFERENCE TO RELATED APPLICATIONS

This application claims priority to U.S. Provisional Application Ser. No. 60/917,611, filed May 11, 2007, the disclosure of which is incorporated herein by reference.

FIELD OF THE INVENTION

The invention relates generally to a gas-separation system for separating one or more components from a multi-component gas.

BACKGROUND

A large segment of the global economy ($350 billion) is based on the use of crystalline microporous zeolites in petrochemical cracking, ion-exchange for water softening and purification, and in the separation of gases.

SUMMARY

The disclosure shows the ability of functionalized zeolitic imidazolate frameworks (ZIFs) for gas separation. In one aspect, the disclosure demonstrate the separation of $CO_2$ from a mixture of $CO_2/CH_4$.

ZIFs are a new class of MOFs comprising tetrahedrally coordinated metal ions and bridging imidazolate linkers to form the same topological structure as amuminosilicate zeolites. The disclosure provides functionalized ZIFS in which the pore walls are functionalized by the use of substituted imidazolate linkers cuhch as purinate (diaza-substituted benzimidazolate) and 4-cyanoimidazolate. These functionalized ZIFs show five times higher $CO_2$ uptake than $CH_4$ at 273K at 1 atm. A breakthrough experiment using $CO_2/CH_4$ (ca. 50:50 v/v) mixture was carried out in a column packed with activated ZIF samples at 273K. The results provided herein show that functionalized ZIFs can separate $CO_2$ from $CH_4$. These gas separation abilities are likely due to the functional groups of ZIFs, e.g., uncoordinated nitrogen in purinate and cyano groups in 4-cyanoimidazolate, inducing a polar pore wall, thus favorable $CO_2$ binding sites, and/or the appropriate pore size that prefers $CO_2$ rather than $CH_4$.

One advantage in using ZIFs as gas separation materials over other studied alminosilicate zeolites and metal-organic frameworks is related to the pore size for adsorbing a gas selectively and the functionality producing polar pore wall for favorable binding site for polar molecules such as $CO_2$.

BRIEF DESCRIPTION OF THE DRAWINGS

The disclosure and its advantages will be better understood by referring to the following detailed description and the attached drawings, in which like reference numerals are used to indicate like parts in various views.

DETAILED DESCRIPTION

Figure 1A:
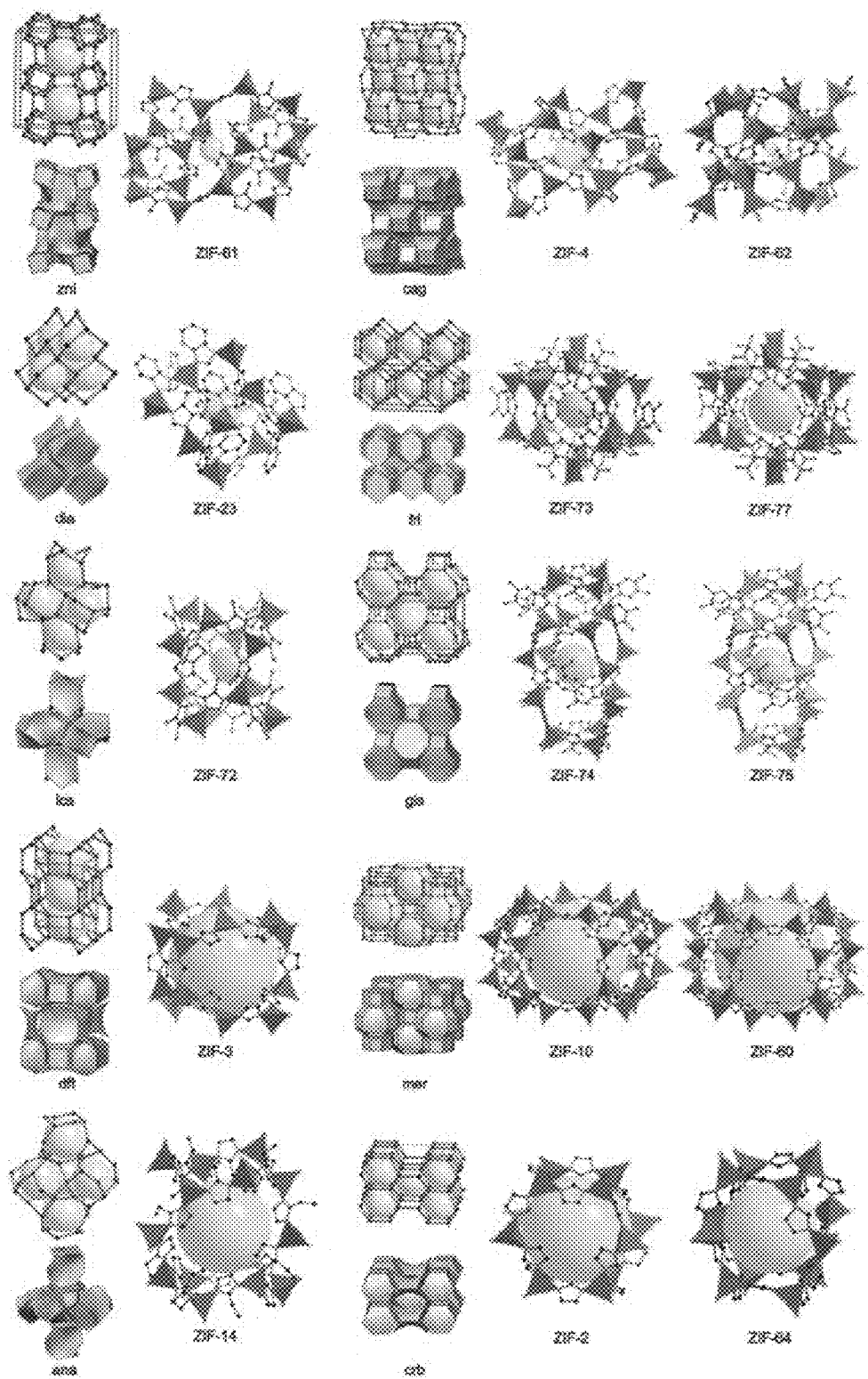
FIG. 1 shows the single crystal x-ray structures of ZIFs. Each row has the nets (line and black dot drawings) shown stacked on top of the tiles representing the subdivision of space (variously polyhedral shapes) in the net labeled with the three-letter net symbol, followed by the single crystal XRD structures of ZIFs corresponding to each of the nets. The largest cage in each ZIF is shown with $ZnN_4$ tetrahedra and $CoN_4$. The ball is placed in the structure for clarity and to indicate space in the cage. H atoms have been omitted (IM and IM-type links are shown in ball-and stick representation.

As used herein and in the appended claims, the singular forms "a," "and," and "the" include plural referents unless the context clearly dictates otherwise. Thus, for example, reference to "a pore" includes a plurality of such pore and reference to "the metal" includes reference to one or more metals known to those skilled in the art, and so forth.

Unless defined otherwise, all technical and scientific terms used herein have the same meaning as commonly understood to one of ordinary skill in the art to which this disclosure belongs. Although methods and materials similar or equivalent to those described herein can be used in the practice of the disclosed methods and compositions, the exemplary methods, devices and materials are described herein.

The publications discussed above and throughout the text are provided solely for their disclosure prior to the filing date of the present application. Nothing herein is to be construed as an admission that the inventors are not entitled to antedate such disclosure by virtue of prior disclosure.

Also, the use of "or" means "and/or" unless stated otherwise. Similarly, "comprise," "comprises," "comprising" "include," "includes," and "including" are interchangeable and not intended to be limiting.

It is to be further understood that where descriptions of various embodiments use the term "comprising," those skilled in the art would understand that in some specific instances, an embodiment can be alternatively described using language "consisting essentially of" or "consisting of."

Natural gas is an important fuel gas and it is used extensively as a basic raw material in the petrochemical and other chemical process industries. The composition of natural gas varies widely from field to field. Many natural gas reservoirs contain relatively low percentages of hydrocarbons (less than 40%, for example) and high percentages of acid gases, principally carbon dioxide, but also hydrogen sulfide, carbonyl sulfide, carbon disulfide and various mercaptans. Removal of acid gases from natural gas produced in remote locations is desirable to provide conditioned or sweet, dry natural gas either for delivery to a pipeline, natural gas liquids recovery, helium recovery, conversion to liquefied natural gas (LNG), or for subsequent nitrogen rejection. $CO_2$ is corrosive in the presence of water, and it can form dry ice, hydrates and can cause freeze-up problems in pipelines and in cryogenic equipment often used in processing natural gas. Also, by not contributing to the heating value, $CO_2$ merely adds to the cost of gas transmission.

An important aspect of any natural gas treating process is economics. Natural gas is typically treated in high volumes, making even slight differences in capital and operating costs of the treating unit significant factors in the selection of process technology. Some natural gas resources are now uneconomical to produce because of processing costs. There is a continuing need for improved natural gas treating processes that have high reliability and represent simplicity of operation.

In addition, removal of carbon dioxide from the flue exhaust of power plants, currently a major source of anthropogenic carbon dioxide, is commonly accomplished by chilling and pressurizing the exhaust or by passing the fumes through a fluidized bed of aqueous amine solution, both of which are costly and inefficient. Other methods based on chemisorption of carbon dioxide on oxide surfaces or adsorption within porous silicates, carbon, and membranes have been pursued as means for carbon dioxide uptake. However, in order for an effective adsorption medium to have long term viability in carbon dioxide removal it should combine two features: (i) a periodic structure for which carbon dioxide uptake and release is fully reversible, and (ii) a flexibility with which chemical functionalization and molecular level fine-tuning can be achieved for optimized uptake capacities.

A number of processes for the recovery or removal of carbon dioxide from gas steams have been proposed and practiced on a commercial scale. The processes vary widely, but generally involve some form of solvent absorption, adsorption on a porous adsorbent, distillation, or diffusion through a semipermeable membrane.

The disclosure provides a column filtration/separation column comprising a zeolitic imidazolate framework (ZIF) capable of separating $CO_2$ from other gaseous components in a multi-component gas. The retentate can be referred to as being "depleted" of $CO_2$ components. While the effluent stream can represent the desired product.

The disclosure provides an apparatus and method for separating one or more components from a multi-component gas using a separation system having a feed side and an effluent side separated by a zeolitic imidazolate framework (ZIFs) of the disclosure. The ZIFs may comprise a column separation format.

In one embodiment of the disclosure, a gas storage material comprising a zeolitic framework is provided. Gases that may be stored or separated by the methods, compositions and systems of the disclosure include gas molecules comprising available electron density for attachment to the one or more sites. Such electron density includes molecules having multiple bonds between two atoms contained therein or molecules having a lone pair of electrons. Suitable examples of such gases include, but are not limited to, the gases comprising a component selected from the group consisting of ammonia, argon, carbon dioxide, carbon monoxide, hydrogen, and combinations thereof. In particularly useful variation, the gas binding material is a carbon dioxide binding material that may be used to separate carbon dioxide from a gaseous mixture.

"Natural gas" refers to a multi-component gas obtained from a crude oil well (associated gas) or from a subterranean gas-bearing formation (non-associated gas). The composition and pressure of natural gas can vary significantly. A typical natural gas stream contains methane as a significant component. The natural gas will also typically contain ethane, higher molecular weight hydrocarbons, one or more acid gases (such as carbon dioxide, hydrogen sulfide, carbonyl sulfide, carbon disulfide, and mercaptans), and minor amounts of contaminants such as water, nitrogen, iron sulfide, wax, and crude oil.

The disclosure is particularly suitable for treatment of natural gas streams containing one or more contaminants such as carbon dioxide, hydrogen sulfide, and water vapor. However, the disclosure is not limited to treatment of natural gas. The inventive device and method can be used to separate multi-component gas.

Zeolitic frameworks are a class of porous materials that potentially have the advantages both of inorganic zeolites (e.g., high stability) and of MOFs (e.g., high porosity and organic functionality), which could be applied to highly efficient catalysis and separations. From a synthetic perspective, zeolitic framework topologies can be directed by the molecular structure of the organic linker and rationalized by examining the resulting linker-linker interactions in the zeolitic frameworks. The potential difficulty in predicting zeolitic structures, such as is always encountered in zeolite chemistry, can be overcome by further detailing the linker requirements for forming the basic secondary building units (cube in the case LTA) in the structure.

Existing zeolites are crystalline aluminosilicates having ordered channel and cage structures and containing micropores which are typically smaller than about 0.9 nm. The network of such zeolites is made up of $SiO_4$ and $AlO_4$ tetrahedra which are joined via shared oxygen bridges. An overview of the known structures may be found, for example, in W. M. Meier, D. H. Olson and Ch. Baerlocher, "Atlas of Zeolite Structure Types", Elsevier, 5th edition, Amsterdam 2001. Specific examples are zeolites having a pentasil structure, in particular the types assigned by X-ray analysis to the ABW, AGO, AEI, AEL, AEN, AET, AFG, AFI, AFN, AFO, AFR, AFS, AFT, AFX, AFY, AHT, ANA, APC, APD, AST, ATN, ATO, ATS, ATT, ATV, AWO, AWW, BEA, BIK, BOG, BPH, BRE, CAN, CAS, CFI, CGF, CGS, CHA, CHI, CLO, CON, CZP, DAC, DDR, DFO, DFT, DOH, DON, EAB, EDI, EMT, EPI, ERI, ESV, EUO, FAU, FER, GIS, GME, GOO, HEU, IFR, ISV, ITE, JBW, KFI, LAU, LEV, LIO, LOS, LOV, LTA, LTL, LTN, MAZ, MEI, MEL, MEP, MER, MFI, MFS, MON, MOR, MSO, MTF, MTN, MTT, MTW, MWW, NAT, NES, NON, OFF, OSI, PAR, PAU, PHI, RHO, RON, RSN, RTE, RTH, RUT, SAO, SAT, SBE, SBS, SBT, SFF, SGT, SOD, STF, STI, STT, TER, THO, TON, TSC, VET, VFI, VNI, VSV, WIE, WEN, YUG and ZON structure and to mixed structures of two or more of the above mentioned structures.

The concept of a default structure (a naturally preferred high-symmetry topology most often adopted by a solid-state material) does not apply directly either to silicates or imidazolate. The 145° angle makes it impossible for the highest symmetry 4-coordinated structure of Fd3m diamond to form; therefore, lower symmetries are invariably found for silicas. Nature prefers $P3_121$ quartz over the $P4_12_12$ cristobalite polymorph, but by only 1 or 2 kJ/mol, and >10 forms of silica are known to be of essentially equal energy (on the scale of bond energies). To reproducibly prepare these and related structures, one needs a structure-directing agent, and this agent is a key to zeolite synthesis. The disclosure shows that structure-directing agents (amide solvent media and linker functionalization) along with control of reaction conditions are effective in achieving a wide variety of zeolitic structures.

To date, no metal-organic analogues based on the important FAU or LTA topologies exist due to difficulty imposed by the presence of two types of large cages (super- and β-cages for FAU, α- and β-cages for LTA). The disclosure identifies a strategy to produce an LTA imidazolate framework in which both the link geometry and link-link interactions play a decisive structure-directing role. The disclosure provides, for example, the synthesis and crystal structures of porous zeolitic structures that are expanded analogues of zeolite A, their cage walls are functionalized, and their metal ions can be changed without changing the underlying LTA topology; these are attributes highly sought after in zeolite chemistry but not before combined in one material.

As used herein, a "core" refers to a repeating unit or units found in a framework. Such a framework can comprise a homogenous repeating core or a heterogenous repeating core structure. A core comprises a transition metal and a linking moiety. A plurality of cores linked together defines a framework.

A "linking moiety" refers to a mono-dentate or bidentate compound that bind a transition metal or a plurality of transition metals, respectively.

A "zeolitic framework," as used herein, refers to a framework of repeating cores having a zeolite-type structure.

A "zeolitic imidizolate framework" or "ZIF" refers to a zeolitic framework comprising a zeolitic structure having an imidizole, imidazolate-derivative, or imidazolate linking group.

The disclosure provides zeolitic frameworks comprising a network of homogenous transition metal or heterogeneous transition metals linked by a homogenous or heterogeneous linking moiety. The zeolitic frameworks of the disclosure can comprise any of the networks currently defined in the Atlas of Zeolite Structure Types known in the literature. The zeolitic frameworks of the disclosure provide nanoporous structure useful for filtration, gas storage and the like, as more fully described herein.

The disclosure also provide a general synthesis of structures having zeolite framework topologies in which all tetrahedral atoms are transition metals, and the linking moieties comprise organic linkers comprising nitrogen, sulfer or oxygen organic molecules (e.g., such as imidazolate (IM) units).

The compositions and methods of the disclosure comprise a zeolite tetrahedral net comprising a transition metal core and a linking moiety. Useful transition metal comprise any one or more of the following: Sc, Ti, V, Cr, Mn, Fe, Co, Ni, Cu, Zn, Y, Zr, Nb, Mo, Tc, Ru, Rh, Pd, Ag, Cd, Lu, Hf, Ta, W, Re, Os, Ir, Pt, Au, Hg, Lr, Rf, Db, Sg, Bh, Hs, Mt, Ds, Rg, and Uub. A linker useful in the zeolite compositions and methods of the disclosure can be selected from the group consisting of structure I, II, III, and any combination thereof:

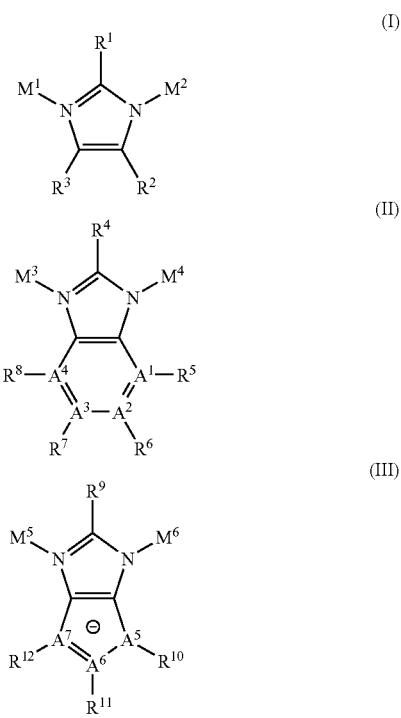

wherein A can be either C or N, wherein $R^5$-$R^8$ are present when $A^1$-$A^4$ comprise C, wherein $R^1$, $R^4$ or $R^9$ comprise a non-sterically hindering group that does not interfere with a transition metal (M) linked to the linking moiety, wherein $R^2$, $R^3$, $R^5$, $R^6$, $R^7$, $R^8$, $R^{10}$, $R^{11}$, $R^{12}$ are each individually an alkyl, aryl-, halo-, cyano- or nitro-, wherein when the linking group comprises structure III, $R^{10}$, $R^{11}$, and $R^{12}$ are each individually electron withdrawing groups. In one aspect, $R^1$, $R^4$ and $R^9$ are individually small group selected from the group consisting of H, methyl-, halo-, cyano-, and ethyl-. In another aspect, when the linking moiety is structure III, $R^{10}$, $R^{11}$ and $R^{12}$ are each individually selected from the group consisting of a nitro-, cyano-, fluoro- and chloro-group. An alkyl group can have from 1 to 10 carbon atoms, an aryl group can have from 1 to 5 phenyl rings. In another aspect, the linking moiety can be bidentate or monodentate. A zeolitic framework can comprise a combination of bidentate or monodentate linking moeities. As described more fully below, the linking group can comprise an imidizole or imidazolate moiety such as a member selected from the group consisting of IV, V, VI, VII. VIII, and IX:

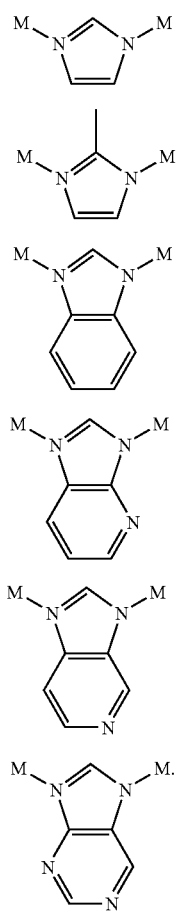

For example, heterocyclic rings including imidazolate compounds and derivative such as substituted imidazolate, benzimidazolate, methyl-, nitro-, cyano, or chloro-groups, azabenzimidazolate, azabenzimidazolte wherein one or two carbon atoms on the benzimidazolate are replaced by nitrogen and the like can be used.

The zeolitic framework (e.g., a ZIF) of the disclosure can take any framework/structure. For example, using the methods of the disclosure, ZIFs having any of the following framework codes can be obtained: ABW, ACO, AEI, AEL, AEN, AET, AFG, AFI, AFN, AFO, AFR, AFS, AFT, AFX, AFY, AHT, ANA, APC, APD, AST, ASV, ATN, ATO, ATS, ATT, ATV, AWO, AWW, BCT, BEA, BEC, BIK, BOG, BPH, BRE, CAN, CAS, CDO, CFI, CGF, CGS, CHA, CHI, CLO, CON, CZP, DAC, DDR, DFO, DFT, DOH, DON, EAB, EDI, EMT, EON, EPI, ERI, ESV, ETR, EUO, EZT, FAR, FAU, FER, FRA, GIS, GIU, GME, GON, GOO, HEU, IFR, IHW, ISV, ITE, ITH, ITW, IWR, IWV, IWW, JBW, KFI, LAU, LEV, LIO, LIT, LOS, LOV, LTA, LTL, LTN, MAR, MAZ, MEI, MEL, MEP, MER, MFI, MFS, MON, MOR, MOZ, MSE, MSO, MTF, MTN, MTT, MTW, MWW, NAB, NAT, NES, NON, NPO, NSI, OBW, OFF, OSI, OSO, OWE, PAR, PAU, PHI, PON, RHO, RON, RRO, RSN, RTE, RTH, RUT, RWR, RWY, SAO, SAS, SAT, SAV, SBE, SBS, SBT, SFE, SFF, SFG, SFH, SFN, SFO, SGT, SIV, SOD, SOS, SSY, STF, STI, STT, SZR, TER, THO, TON, TSC, TUN, UEI, UFI, UOZ, USI, UTL, VET, VFI, VNI, VSV, WEI, WEN, YUG, and ZON.

A transition metal and linking moiety core have been used to generate a plurality of zeolitic frameworks. For example, zeolitic imidazolate frameworks (ZIFs) have been synthesized as crystals by copolymerization of transition metals with imidazolate-type links. The ZIF crystal structures are based on the nets of a plurality of distinct aluminosilicate zeolites: tetrahedral Si(Al) and the bridging O are replaced with transition metal ion and an imidazolate link, respectively. Study of the gas adsorption and thermal and chemical stability of the ZIFs demonstrated their porosity (Langmuir surface area of about 1,810 m$^2$/g), high thermal stability (up to 550° C.), and remarkable chemical resistance to boiling alkaline water and organic solvents.

Imidazole, for example, can lose a proton to form IM. The core of such frameworks can be formulated T(Im)$_2$ (Im=imidazolate and its derivatives, T=tetrahedrally bonded metal ion) and are similar to the (Al)SiO$_2$ frameworks of (alumino)silicate zeolites; in particular the T-Im-T angle of about 145° is close to the Si—O—Si angle typically found in zeolites In examining the dense-phases Co(IM)2 and Zn(IM) 2, whose structures are based on nets of linked CoN$_4$ or ZnN$_4$ tetrahedra, the angle is as depicted in Scheme 1.

Scheme I

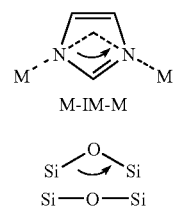

Accordingly, under the right conditions metal IMs adopt open-framework zeolite structures. Indeed, a number of new Fe(II) (5), Co(II), Cu(II), and Zn(II) IM compounds have structures that are based on zeolite-like tetrahedral nets.

The disclosure provides a general strategy that has led to zeolitic structures based on other zeolite nets. The disclosure confirms the porosity of ZIFs of the disclosure and unlike other metal-organic compounds, the zeolitic frameworks (ZIFs) have exceptional chemical stability in refluxing organic solvents, water, and aqueous alkaline solution, a finding that has not been described previously. These results point to the potential applications and rich structural diversity of this as-yet-undeveloped class of porous materials.

A zeolitic framework of the disclosure, such as a ZIF, can be synthesized by using solvothermal methods. Highly crystalline materials were obtained by combining the requisite hydrated metal salt (e.g., nitrate) and imidazole-type linker in an amide solvent such as N,N-diethylformamide (DEF). The resulting solutions were heated (85-150° C.) and zeolitic frameworks of the disclosure where precipitated after 48-96 h and were readily isolated. Single crystals suitable for x-ray structure analysis were selected from the precipitate. FIG. 1 illustrates examples of precipitated structures. In FIG. 1, the metal center of each structure is coordinated by the N atoms of IM to give overall neutral frameworks. The five-membered IM ring, as depicted in FIG. 1, serves as the bridging/linking unit between the transition metal centers and imparts angle 1 of ~145° throughout the frameworks via coordinating N atoms in the 1,3-positions of the ring. The organic components of the zeolitic framework provides organically lined cages and channels rather than a silicate oxide surface as in prior zeolites.

For example, a general ZIF reaction comprises one or two of formula I-IX, above, IM-type links, which are reacted with a metal (e.g., either zinc(II) nitrate or cobalt(II) nitrate in N,N'-dimethylformamide or N,N'-diethylformamide. The metal-to-linker mole ratio can range from about 1:1 to 1:12. These amounts can be dispensed with an automated dispensing unit charged with a stock solution whose concentration can also be varied from 0.075 to 0.20 M for both reactants. After loading the mixture of reactants into a reaction vessel, the reaction vessels were covered with a polytetrafluoroethylene sheet, sealed, and then heated to a temperature range of 65° to 150° C. for 48 to 100 hours. Crystalline products of ZIFs were obtained in this temperature range. Using data, the concentration, temperature and reaction time can be adjusted. For example, a concentration level of 0.20 M, a reaction time of 72 hours, and an isothermal temperature of 85° or 100° C. are optimal for some ZIF syntheses and crystallization.

Figure 1B:
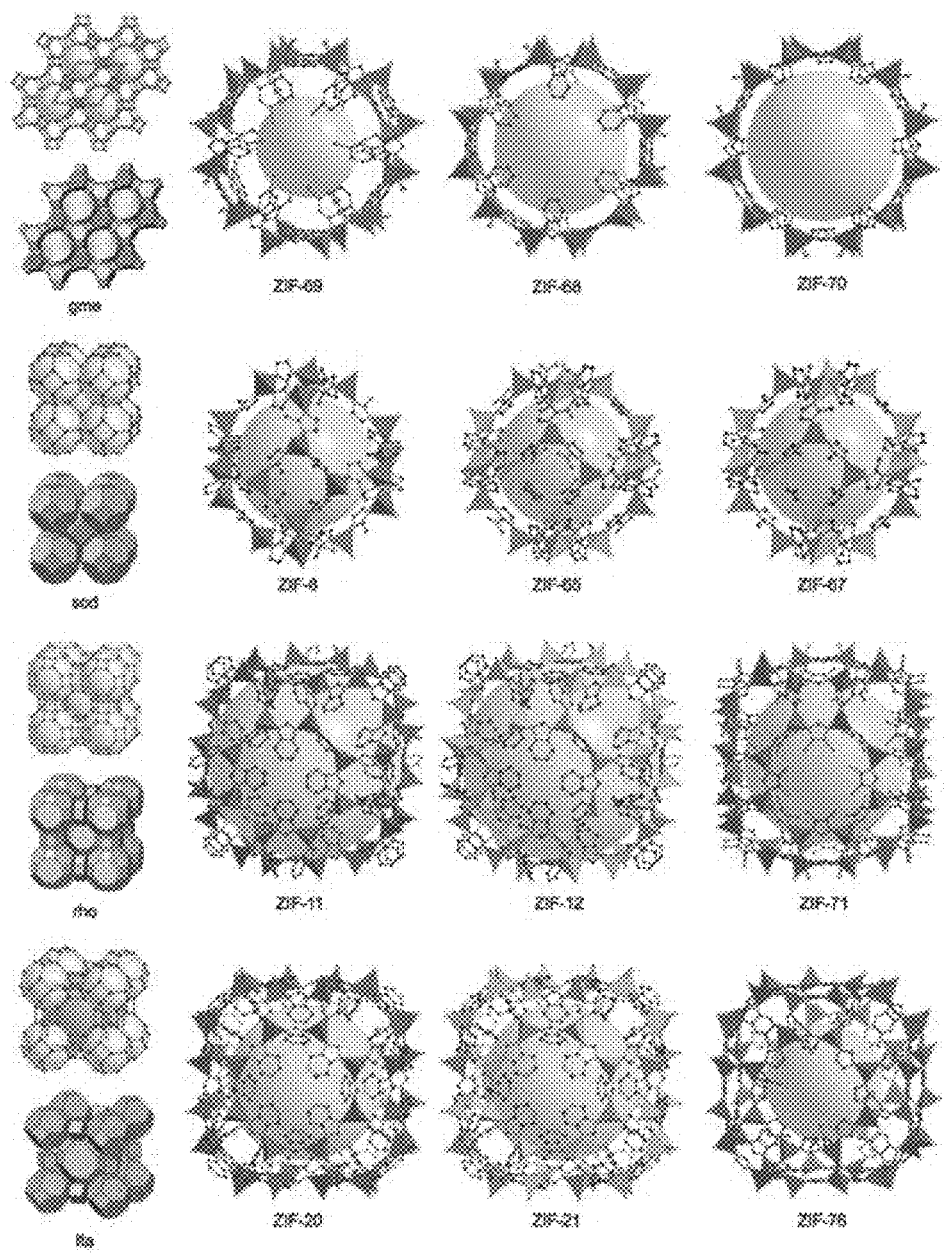

Twenty-five different crystals using this protocol for single-crystal structural characterization were obtained (see, e.g., FIG. 1A-B and the Table A).

the exception of ZIF-69, 71, 72, and 77, H atoms are nearest to the center of the cavity, and a van derWaals radius of 1.2 Å for H was used in determining the appropriate sphere size.

For ZIF-69, 71, 72, and 77, where the atoms nearest to the center of the cages are either Cl (69, 71, and 72) or O (77), van der Waals radii of 1.8 Å (Cl) and 1.5 Å (O) were used. The values of $d_a$ and $d_p$ provide a lower limit to the cage volume because, in some cases, the cages are ellipsoidal. The number of vertices of the largest cage in each structure ranges from 10 (dia) to 48 (lta). The cage face symbol (in which signifies that the cage has m faces that are n rings) and the transitivities of the nets are given in Table, above.

In some of the ZIFs described herein, a Zn or Co atom is connected to four IM or substituted IM linkers to create a corresponding tetrahedron (FIG. 1A-B). The tetrahedra are linked by corner-sharing into different three-dimensional zeolitic frameworks. However, these ZIFs differ in the nature of the functional groups decorating the pores and in the metrics of their pore structure (Table, above). Across the series, the metrics are systematically varied in increments of less

TABLE A

The ZIFs discovered by high-throughput synthesis. Dashes indicate no zeolite symbol.

| ZIF-n | Composition | Net (18) | Zeolite (15) | T/V (nm$^{-3}$) | $d_a$ (Å) | $d_p$ (Å) | N† | Transitivity | Cage |
|---|---|---|---|---|---|---|---|---|---|
| 2 | Zn(IM)$_2$ | crb | BCT | 2.80 | 6.4 | 6.9 | 12 | 1232 | [6$^2$, 8$^2$] |
| 3* | Zn(IM)$_2$ | dft | DFT | 2.66 | 4.6 | 6.0 | 16 | 1353 | [6$^2$, 8$^4$] |
| 4 | Zn(IM)$_2$ | cag | — | 2.04 | 2.0 | 2.1 | 20 | 1431 | [4$^2$, 6$^8$] |
| 8 | Zn(mIM)$_2$ | sod | SOD | 2.47 | 3.4 | 11.6 | 24 | 1121 | [4$^6$, 6$^8$] |
| 10 | Zn(IM)$_2$ | mer | MER | 2.25 | 8.2 | 12.1 | 24 | 1463 | [4$^{12}$, 8$^6$] |
| 11 | Zn(bIM)$_2$ | rho | RHO | 2.01 | 3.0 | 14.6 | 48 | 1242 | [4$^{12}$, 6$^8$, 8$^6$] |
| 12 | Co(bIM)$_2$ | rho | RHO | 2.01 | 3.0 | 14.6 | 48 | 1242 | [4$^{12}$, 6$^8$, 8$^6$] |
| 14 | Zn(eIM)$_2$ | ana | ANA | 2.47 | 2.2 | 2.2 | 24 | 1132 | [6$^2$, 8$^3$] |
| 20 | Zn(Pur)$_2$ | lta | LTA | 2.04 | 2.8 | 15.4 | 48 | 1343 | [4$^{12}$, 6$^8$, 8$^6$] |
| 21 | Co(Pur)$_2$ | lta | LTA | 2.03 | 2.8 | 15.4 | 48 | 1343 | [4$^{12}$, 6$^8$, 8$^6$] |
| 23* | Zn(abIM)$_2$ | dia | — | 3.31 | 1.1 | 4.2 | 10 | 1111 | [6$^4$] |
| 60 | Zn(IM)$_{1.5}$(mIM)$_{0.5}$ | mer | MER | 2.24 | 7.2 | 9.4 | 24 | 1463 | [4$^{12}$, 8$^6$] |
| 61 | Zn(IM)(mIM) | zni | — | 4.62 | 0.7 | 0.7 | 20 | 1342 | [6$^3$, 12$^2$] |
| 62 | Zn(IM)$_{1.75}$(bIM)$_{0.25}$ | cag | — | 3.52 | 1.4 | 1.3 | 20 | 1431 | [4$^2$, 6$^8$] |
| 64 | Zn(IM)$_2$ | crb | BCT | 3.62 | 2.5 | 7.9 | 12 | 1232 | [6$^2$, 8$^2$] |
| 65 | Co(nIM)$_2$ | sod | SOD | 2.32 | 3.4 | 10.4 | 24 | 1121 | [4$^6$, 6$^8$] |
| 67 | Co(mIM)$_2$ | sod | SOD | 2.46 | 3.4 | 11.6 | 24 | 1121 | [4$^6$, 6$^8$] |
| 68 | Zn(bIM)(nIM) | gme | GME | 2.12 | 7.5 | 10.3 | 24 | 1463 | [4$^6$, 8$^3$, 12$^2$] |
| 69 | Zn(cbIM)(nIM) | gme | GME | 2.09 | 4.4 | 7.8 | 24 | 1463 | [4$^6$, 8$^3$, 12$^2$] |
| 70 | Zn(Im)$_{1.23}$(nIM)$_{0.87}$ | gme | GME | 2.10 | 13.1 | 15.9 | 24 | 1463 | [4$^6$, 8$^3$, 12$^2$] |
| 71 | Zn(dcIM)$_2$ | rho | RHO | 2.06 | 4.2 | 16.5 | 48 | 1242 | [4$^{12}$, 6$^8$, 8$^6$] |
| 72 | Zn(dcIM)$_2$ | lcs | — | 3.16 | 1.9 | 1.9 | 12 | 1121 | [6$^5$] |
| 73 | Zn(nIM)$_{1.74}$(mbIM)$_{0.26}$ | frl | — | 3.20 | 1.0 | 1.0 | 16 | 2342 | [4$^4$, 6$^2$, 8$^2$] |
| 74 | Zn(nIM)(mbIM) | gis | GIS | 2.66 | 1.2 | 2.6 | 20 | 1231 | [4$^6$, 8$^4$] |
| 75 | Co(nIM)(mbIM) | gis | GIS | 2.66 | 1.2 | 2.62 | 20 | 1231 | [4$^6$, 8$^4$] |
| 76 | Zn(IM)(cbIM) | lta | LTA | 2.05 | 5.4 | 12.2 | 48 | 1343 | [4$^{12}$, 6$^8$, 8$^6$] |
| 77 | Zn(nIM) | frl | — | 3.22 | 2.9 | 3.6 | 16 | 2342 | [4$^4$, 6$^2$, 8$^2$] |

Three (ZIF-68 to 70) have structures based on a zeolite topology (gme), which heretofore has not been achieved in metal-organic compounds, and five have tetrahedral topologies (dia, cag, frl, lcs, and zni) not occurring in zeolites. The nets of the structures are denoted by a bold lowercase three-letter symbol that is often the same as that of the corresponding zeolite net (Table, above). Furthermore, 10 structures (ZIF-60 to 62, 68 to 70, and 73 to 76) contain two chemically different imidazolate links (i.e., heterolinks).

The existence of two different types of IMs with a side chain (e.g., an NO$_2$ or a CH$_3$ group) or an aromatic ring on the link makes the pore heterogeneously functionalized across the series (FIG. 1). Furthermore, the diameter of the sphere that will pass through that pore (da) ranges from as low as 0.7 Å to as high as 13.1 Å, whereas the diameter of the sphere that will fit into the cavities (dp) varies from 0.7 to 15.9 Å. With than 1 Å; such tunability is unusual and potentially useful in gas adsorption and separation.

Multigram scale synthesis is also provided by the disclosure. Using seven chosen ZIFs of heterolinks (ZIF-60, 61, 68 to 70, 74, and 76), microsynthesis conditions were scalable to 10-g scale and pure ZIF materials obtained.

The zeolitic frameworks of the disclosure are comparable with some of the very porous MOF compounds in surface area and pore volume, and they outperform traditional crystalline microporous materials such as zeolites and ordered mesoporous silicas. Although not required and not wanting to be bound by any theory, this performance may be due in part to the fully exposed edges and faces of the organic links; characteristics that have been proposed as key to creating exceptionally high surface areas.

The frameworks comprising a core, wherein the core comprises a plurality of transition metals linked by linking moiety having a structure selected from I-IX, comprises a plurality of pores having a surface area greater than about 2000 m²/g (e.g., about 3,000-18,000 m²/g or about 3,000-6,000 m²/g). The plurality of pores of a framework of the disclosure comprises a pore volume 0.1 to 0.99 cm³/cm³ (e.g., about 0.4-0.5 cm³/cm³). A framework of the disclosure comprises a density of about 0.17 g/cm³. A zeolitic framework of the disclosure can comprise a core comprising the atomic coordinates as set forth in any one of the tables herein.

In another aspect, the zeolitic framework set forth above may include an interpenetrating frameworks that increases the surface area of the framework. Although the frameworks of the disclosure may advantageously exclude such interpenetration, there are circumstances when the inclusion of an interpenetrating framework may be used to increase the surface area.

In one embodiment of the disclosure, a gas storage material comprising a zeolitic framework is provided. Advantageously, the zeolitic framework includes one or more sites for storing gas molecules. Gases that may be stored in the gas storage material of the disclosure include gas molecules comprising available electron density for attachment to the one or more sites on the surface are of a pore or interpenetrating porous network. Such electron density includes molecules having multiple bonds between two atoms contained therein or molecules having a lone pair of electrons. Suitable examples of such gases include, but are not limited to, the gases comprising a component selected from the group consisting of ammonia, argon, carbon dioxide, carbon monoxide, hydrogen, and combinations thereof. In a particularly useful variation the gas storage material is a hydrogen storage material that is used to store hydrogen ($H_2$). In another particularly useful variation, the gas storage material is a carbon dioxide storage material that may be used to separate carbon dioxide from a gaseous mixture.

In a variation of this embodiment, the gaseous storage site comprises a pore in a zeolitic framework. In a refinement, this activation involves removing one or more chemical moieties (guest molecules) from the zeolitic framework. Typically, such guest molecules include species such as water, solvent molecules contained within the zeolitic framework, and other chemical moieties having electron density available for attachment.

The zeolitic framework used in the embodiments of the disclosure include a plurality of pores for gas adsorption. In one variation, the plurality of pores has a unimodal size distribution. In another variation, the plurality of pores have a multimodal (e.g., bimodal) size distribution.

For example, ZIF-68, 69, and 70 demonstrated gas adsorption. ZIF-68, 69, and 70 all have the same topology (gme) and large pores (7.2, 10.2, and 15.9 Å in diameter for ZIF-69, 68, and 70, respectively) connected through tunable apertures (4.4, 7.5, and 13.1 Å). These ZIFs are permanently porous metal-organic frameworks in which the pore walls contain heterogeneous link functionality. ZIFs-68 to 70, revealed a thermal stability range of up to 390° C. Specifically, the TGA trace for these ZIFs showed a gradual weight-loss step between 25° and 168° C. A plateau between 150° and 390° C. indicates that the evacuated framework has high thermal stability. These heterolinked ZIF frameworks have high structural and thermal stability. Examination of their chemical stability was performed by heating the samples in boiling benzene, methanol, and water for 7 days: conditions that reflect potential extreme industrial requirements. Notably, all of the ZIFs retained their structures under these conditions. The permanent porosity of these ZIFs was also demonstrated by $N_2$ adsorption measurements, which showed that they exhibit type I adsorption isotherm behavior typical of materials of permanent porosity.

The Langmuir surface areas were 1220, 1070, and 1970 m² g$^{-1}$ for ZIF-68, 69, and 70, respectively; these surface areas are more than double those of the most porous zeolites and significantly higher than those of other reported ZIFs. The exceptional stability and metric attributes of these ZIFs is useful for particularly difficult gas separation: $CO_2$ from CO. The adsorption isotherms for all three ZIFs show high affinity and capacity for $CO_2$, with ZIF-69 outperforming ZIF-68 and ZIF-70, as well as the state-of-the-art material BPL carbon (Table B). Adsorption is completely reversible, and it was calculated that 1 liter of ZIF-69 can store 82.6 liters (162 g) of $CO_2$ at 273 K. The selectivity is further supported by preliminary breakthrough experiments, which show complete retention of $CO_2$ and passage of CO through the pores of ZIF-68, 69, and 70 when they are exposed to streams containing a binary mixture of $CO_2$/CO (50:50 v/v) at room temperature. In comparison with that of BPL carbon, ZIFs have higher selectivity (Table B). In terms of storage capacity and selectivity to $CO_2$, ZIFs of the disclosure (including ZIF-69 and 70) outperform BPL carbon.

TABLE B

Comparison of gas separation selectivity of ZIFs and BPL carbon

| Material | Gas pairs | ZIFs selectivity | BPL carbon selectivity (23) | Ratio ZIFs/BPL carbon |
|---|---|---|---|---|
| ZIF-68 | $CO_2$/CO | 19.2 | 7.5 | 2.6 |
| ZIF-69 | $CO_2$/CO | 20.9 | 7.5 | 2.8 |
| ZIF-70 | $CO_2$/CO | 37.8 | 7.5 | 5.0 |

The disclosure also provides chemical sensors (e.g. resistometric sensors) capable of sensing the presence of an analyte of interest. There is considerable interest in developing sensors that act as analogs of the mammalian olfactory system. However, may such sensor systems are easily contaminated. The porous structures of the disclosure provide a defined interaction area that limits the ability of contaminate to contact a sensor material the passes through the porous structure of the zeolitic framework of the disclosure. For example, various polymers are used in sensor systems including conductive polymers (e.g., poly(anilines) and polythiophenes), composites of conductive polymers and non-conductive polymers and composites of conductive materials and non-conductive materials. In resistometric systems conductive leads are separated by the conductive material such that a current traverse between the leads and through the sensor material. Upon binding to an analyte, the resistance in the material changes and detectable signal is thus generated. Using the zeolitic framework of the disclosure, the area surrounding the sensor material is limited and serves as a "filter" to limit contaminants from contacting the sensor material, thus increasing sensor specificity by, for example, adsorbing gaseous components or contaminants.

The disclosure further provides zeolitic catalyst comprising a zeolitic framework of the disclosure. The zeolitic material of the disclosure, as crystalline material or as molding, can be used in the catalytic conversion of organic molecules. Reactions of this type are, for example, oxidations, the epoxidation of olefins, e.g. the preparation of propylene oxide from propylene and $H_2O_2$ the hydroxylation of aromatics, e.g. the preparation of hydroquinone from phenol and $H_2O_2$ or the conversion of toluene into cresol, the conversion of alkanes into alcohols, aldehydes and acids, isomerization, reactions, for example the conversion of epoxides into aldehydes.

The disclosure is illustrated in the following examples, which are provided by way of illustration and are not intended to be limiting.

EXAMPLES

To illustrate the potential for synthetic diversity of the disclosure, Table 1 demonstrates zeolite topologies DFT, GIS, and MER resulting from the methods of the disclosure. Furthermore, the disclosure demonstrates that the ZIFs of the disclosure are not restricted to purely tetrahedral nets. The first example of an IM based on a mixed-coordination net, $In_2Zn_3(IM)_{12}$ with In(III) in octahedral coordination environment, is also reported. This structure has the topology of the $Al_2Si_3O_{12}$ part of a garnet, such as grossularite $Ca_3Al_2Si_3O_{12}$. The synthesis of this structure hints at the extraordinarily rich chemistry using linking moieties of the disclosure, such as IMs.

TABLE 1

Composition, structure, and net parameters of ZIF series of compounds

| ZIF-n | Composition | Net* | Zeolite† | T/V,‡ nm$^{-3}$ | d,§ Å | N¶ |
|---|---|---|---|---|---|---|
| ZIF-1 | Zn(IM)2 | crb | BCT | 3.64 | 6.94 | 12 |
| ZIF-2 | Zn(IM)2 | crb | BCT | 2.80 | 6.00 | 12 |
| ZIF-3 | Zn(IM)2 | dft | DFT | 2.66 | 8.02 | 16 |
| ZIF-4 | Zn(IM)2 | cag | — | 3.68 | 2.04 | 20 |
| ZIF-5 | In2Zn3(IM)12 | gar | — | 3.80 | 3.03 | 20 |
| ZIF-6 | Zn(IM)2 | gis | GIS | 2.31 | 8.80 | 20 |
| ZIF-7 | Zn(PhIM)2 | sod | SOD | 2.50 | 4.31 | 24 |
| ZIF-8 | Zn(MeIM)2 | sod | SOD | 2.47 | 11.60 | 24 |
| ZIF-9 | Co(PhIM)2 | sod | SOD | 2.51 | 4.31 | 24 |
| ZIF-10 | Zn(IM)2 | mer | MER | 2.25 | 12.12 | 24 |
| ZIF-11 | Zn(PhIM)2 | rho | RHO | 2.01 | 14.64 | 48 |
| ZIF-12 | Co(PhIM)2 | rho | RHO | 2.01 | 14.64 | 48 |

*For definitions of three-letter abbreviations, see Reticular Chemistry Structure Resource (http:~~okeeffe-ws1.la.asu.edu/RCSR/home.htm).
‡T/V is the density of metal atoms per unit volume.
§d is the diameter of the largest sphere that will fit into the framework.
¶N is the number of vertices of the largest cage.

Table 1 summarizes topology, density, and pore size data for some of the ZIFs of the disclosure. The nets of the structures are denoted by a three-letter symbol that is often the same as that of the corresponding zeolite net. The density of ZIFs are denoted by using the traditional zeolite measure of number of tetrahedral vertices per unit volume (T/V). In an IM framework containing, for example, Zn(II), the Zn . . . Zn distance is ~6.0 Å, whereas the corresponding Si . . . Si distance in a silicate is ~3.0 Å; accordingly, the density (T/V) of an IM analog (i.e., ZIF) of a silicate zeolite is eight times less. For the structures reported here, T/V is in the range 2.0-3.7 nm$^{-3}$ (Table 1). For comparison, the density for oxide zeolites is 12-20 nm$^{-3}$, and for the lowest-density known oxide framework it is 7.1 nm$^{-3}$. Also provided are examples of the size of the sphere that will fit into the cavities without contacting the van der Waals internal surface of the framework. The atom nearest to the center of the cavity is H, a van der Waals radius of 1.2 Å was used for H in determining the fitting sphere size. Note that this value is an approximate indicator of the cage volume because in some cases the cages are elliptical. The table also gives the number of vertices of the largest cage in each structure; this value ranges from 12 (crb) to 48(rho).

In FIG. 1, eight nets of the ZIF structures of the disclosure are depicted in three ways. First, as stick diagrams of the nets; next, the same structures decomposed into tiles (generalized polyhedra or cages that combine to completely fill space). For some structures (i.e., cag, gis, and sod) there is just one kind of tile. Finally, the largest cage in the real structure of representative IMs is shown on the right. Replacement of Zn(II) by Co(II) makes essentially no metrical difference to the structure; thus, ZIF-7 and -11 are virtually identical to ZIF-9 and -12, respectively.

Porosity and Stability of ZIFs.

Certain ZiFs were prepared at the gram scale to allow detailed investigation of the their properties. A structural feature of these ZIFs is that they possess large pores (11.6 and 14.6 Å in diameter for ZIF-8 and -11, respectively) connected through small apertures (3.4 and 3.0 Å across for ZIF-8 and -11, respectively). The pore sizes are approximately twice as large as those of their zeolite counterparts by virtue of the longer IM linking units; however, the existence of side chain or ring on the link renders the aperture sizes to the lower limit for molecular sieves (Table 2).

TABLE 2

Structural characteristics of ZIF-8 and -11 calculated from single crystal x-ray analysis

| | Pore aperture diameter, Å | | | Pore diameter, Å | Surface area, m$^2$/g | Pore volume, cm$^3$/g |
|---|---|---|---|---|---|---|
| ZIF-n | 8-ring | 6-ring | 4-ring | | | |
| ZIF-8 | — | 3.4 | * | 11.6 | 1,947 | 0.663 |
| ZIF-11 | 3.0 | 3.0 | * | 14.6 | 1,676 | 0.582 |

All calculations were based on the Free Volume routine of CERIUS$^2$ software (Version 4.2; MatSci; Analysis, Inc., San Diego; probe radius 1.4 Å, medium grid) and on the single crystal x-ray structures of ZIF-8 and -11 with guests removed and disorder effects averaged.
* The aperture sizes of the 4-rings in both ZIF-8 and -11 are negligible.

Thermal gravimetric analysis (TGA) performed on as-synthesized ZIF-8 and -11 revealed these compounds' thermal stability. The TGA trace for ZIF-8 showed a gradual weight-loss step of 28.3% (25-450° C.), corresponding to partial loss of guest species [1 N,N-dimethylformamide (DMF) and $3H_2O$; calcd. 35.9%], followed by a plateau (450-550° C.). More impressively, the TGA trace for ZIF-11 revealed a sharp weight-loss step of 22.8% (25-250° C.), corresponding to the escape of all N,N-diethylformamide (DEF) solvent molecules trapped in the pores (0.9 DEF; calcd. 23.3%), despite the fact that DEF is actually much larger than the aperture of ZIF-11 in size. The TGA trace of ZIF-11 also showed a long plateau in the temperature range 250-550° C., indicating its high thermal stability in the absence of guest molecules. The guests in ZIF-8 and -11 were released without damaging the frameworks, as evidenced by the coincidence of the powder x-ray diffraction (PXRD) patterns of a ZIF-8 sample and a ZIF-11 sample heated to and held at 500 and 300° C., respectively, in $N_2$ atmosphere with the PXRD patterns simulated from single crystal structures. Such high thermal stability of ZIFs (up to 550° C. in $N_2$) is well beyond that of the permanently porous cubic structure of MOF-5 (decomposes at 450° C. in $N_2$), only matched by very few MOFs having relatively dense structures.

The amide guests included in as-synthesized ZIF-8 and -11 could be more readily removed by solvent-exchange. The thermogravimetric behavior of ZIF-8 and -11 were significantly simplified after they were immersed in organic solvents, such as methanol. To remove the guest species from the frameworks and prepare the evacuated forms of ZIF-8 and -11 for gas-sorption analysis, the as-synthesized ZIF samples were immersed in methanol at ambient temperature for 48 h, and evacuated at ambient temperature for 5 h, then at an elevated temperature (300° C. for ZIF-8; 180° C. for ZIF-11)

for 2 h. ZIF samples thus obtained were optimally evacuated, as evidenced by their well maintained PXRD patterns and the long plateau (25-550° C.) in their TGA traces.

Figure 2:
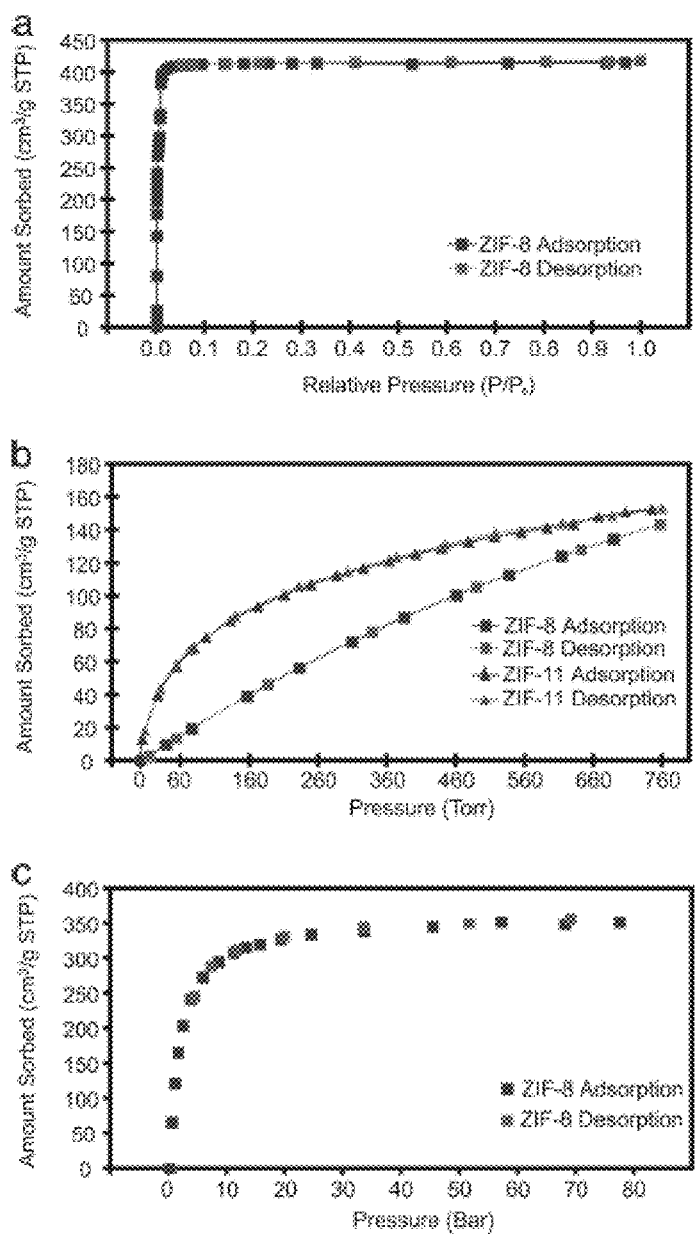
FIG. 2A-C shows the gas-sorption isotherms for prototypical ZIFs. (a) Nitrogen isotherm at 77 K for ZIF-8 sod.(b) Hydrogen isotherms at 77 K for ZIF-8 sod and ZIF-11 rho.(c) High-pressure hydrogen isotherm at 77 K for ZIF-8 sod.

The architectural rigidity and consequently the permanent porosity of evacuated ZIF-8 and -11 were unequivocally proven by gas-sorption analysis. Type I nitrogen sorption isotherm behavior was observed for ZIF-8 (FIG. 2a), which reveals its microporous nature. Apparent surface areas of 1,810 m$^2$/g (Langmuir model) and 1,630 m$^2$/g [Brunauer-Emmett-Teller (BET) model] for ZIF-8 were obtained by using the data points on the adsorption branch in the range of $P/P_0$=0.01-0.10, and a micropore volume of 0.636 cm$^3$/g for ZIF-8 was obtained based on a single data point at $P/P_0$=0.10. The experimental surface area and micropore volume values of ZIF-8 fit well with the predictions based on its single crystal structure (Table 2). These surface areas surpass the highest values reported for zeolites and ordered mesoporous silica-type materials. Conversely, ZIF-11 was nonporous to nitrogen because its aperture size (3.0 Å) was smaller than the kinetic diameter of nitrogen (3.6 Å); however, it was able to take up hydrogen. Both ZIF-8 and -11 showed reversible hydrogen sorption behavior (FIG. 2b). Interestingly, the initial hydrogen uptake of ZIF-11 was much higher than that of ZIF-8, because of its unique cage interior, which is composed of protruding benzene side rings of the PhIM links around which favorable hydrogen sorption sites may be generated. However, ZIF-8 was similar to ZIF-11 in hydrogen uptake when the adsorbate pressure approached 1 atm [145 cm$^3$/g at standard temperature and pressure (STP)] or 12.9 mg/g for ZIF-8; 154 cm$^3$/g STP or 13.7 mg/g for ZIF-11). This result is expected because ZIF-8 has higher surface area and pore volume (Table 2). The ultimate hydrogen capacity of ZIF-8 was uncovered in a high-pressure (up to 80 bar) hydrogen sorption measurement at 77 K on a large batch of evacuated ZIF-8 (0.724 g), which showed 350 cm$^3$/g STP (31 mg/g) at 55 bar. The hydrogen uptake of ZIF-8 and its Langmuir surface area (1,810 m$^2$/g) fit well in a linear relationship proposed recently based on the high-pressure hydrogen sorption measurements on a series of MOFs with high surface areas.

Figure 3:
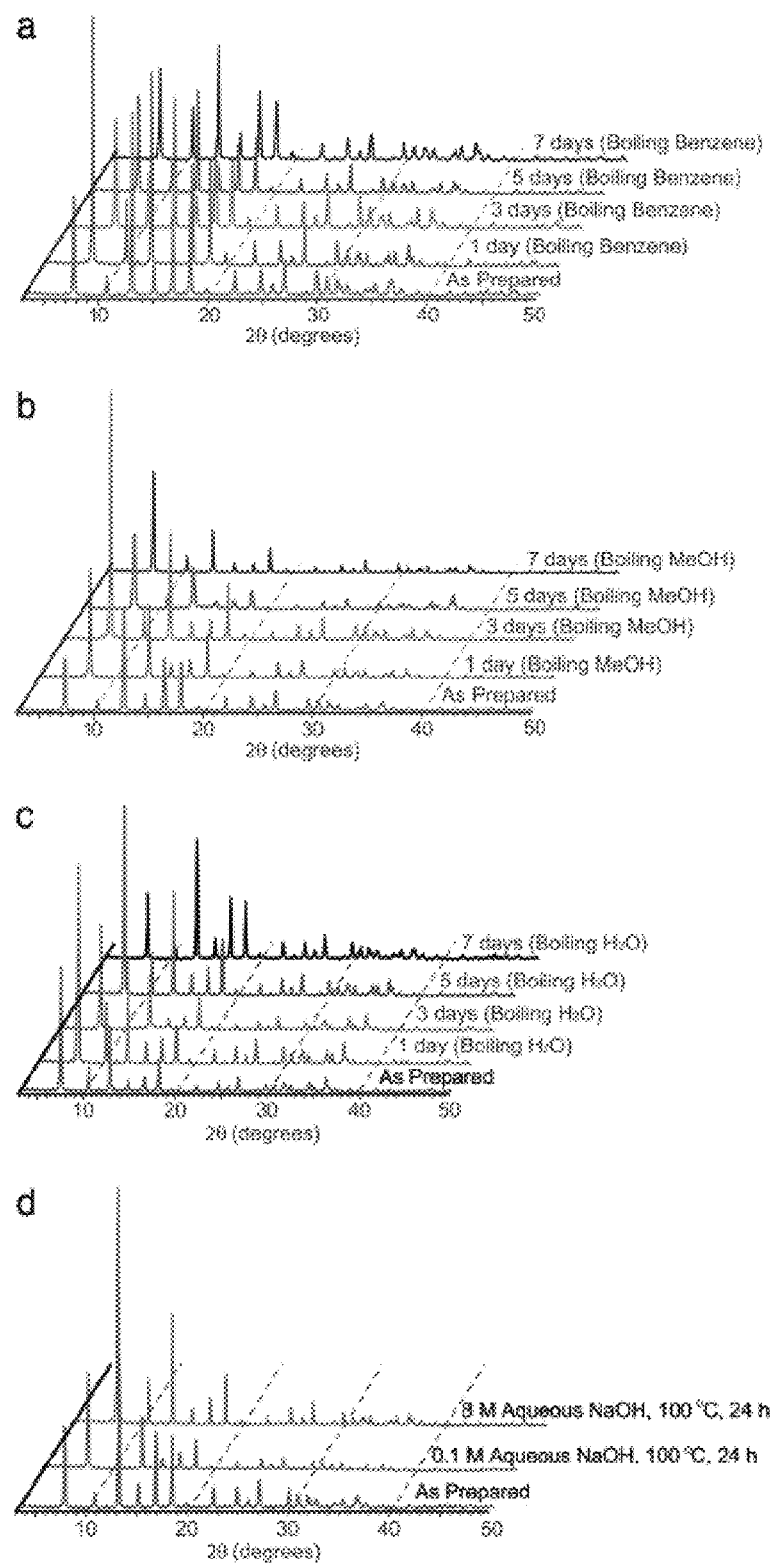
FIG. 3A-D shows the PXRD patterns for ZIF-8 samples measured during chemical stability tests. (a) In refluxing benzene at 80° C. for up to 7 days. (b) In refluxing methanol at 65° C. for up to 7 days. (c) In refluxing water at 100° C. for up to 7 days. (d) In refluxing aqueous NaOH solution for up to 1 day.

The chemical stability of ZIFs was examined by suspending samples of ZIF-8 and -11 in boiling benzene, methanol, water, and aqueous sodiumhydroxide (FIG. 3), conditions that reflect extreme operational parameters of typical industrial chemical processes. ZIF samples were immersed in the desired solvent for 1-7 days at ambient temperature, 50° C., and at the boiling point of each medium. During this process, samples were periodically observed under an optical microscope and found to be insoluble under each of these conditions. PXRD patterns collected for each sample at designated intervals showed that the solid samples of ZIF-8 and -11 maintained their full crystallinity and were impervious to the boiling organic solvents for 7 days. Both ZIFs sustained their structures in water at 50° C. for 7 days. ZIF-8 thus was further probed and shown to be unchanged for up to 24 h in 0.1 and 8 M aqueous sodium hydroxide at 100° C. The hydrothermal stability of ZIF-8 is superior to those of original MCM and SBA types of ordered mesoporous silica, even rivaling the ultrastable derivatives of these materials.

Typical ZIF Synthesis.

Benzimidazole, 2-methylimidazole, Indium nitrate pentahydrate and cobalt nitrate hexahydrate were purchased from the Aldrich Chemical Co. and imidazole, N,N-dimethylformamaide (DMF), N-methylpyrrolidinone (NMP) were purchased from the Fisher Scientific International Inc. N,N-diethylformamide (DEF) was obtained from BASF Corporation. Zinc nitrate tetrahydrate was purchased from the EM Science. All starting materials were used without further purifications. All experimental operations were performed in air. (ZIF syntheses are exemplified here by the synthesis of ZIF-8) A solid mixture of zinc nitrate tetrahydrate $Zn(NO_3)_2 \cdot 4H_2O$ (0.210 g, 8.03×10$^{-4}$ mol) and 2-methylimidazole (H-MeIM) (0.060 g, 7.31×10$^{-4}$ mol) was dissolved in 18 ml of DMF in a 20-ml vial. The vial was capped and heated at a rate of 5° C./min to 140° C. in a programmable oven and held at this temperature for 24 h, then cooled at a rate of 0.4° C./min to room temperature. After removal of mother liquor from the mixture, chloroform (20 ml) was added to the vial. Colorless polyhedral crystals were collected from the upper layer, washed with DMF (10 ml×3), and dried in air for 10 min (yield: 0.032 g, 25% based on H-MeIM). The product was formulated by using elemental microanalysis as $Zn(MeIM)_2 \cdot (DMF) \cdot (H_2O)_3$ ($C_{11}H_{23}N_5O_4Zn$; Calcd. C, 37.25; H, 6.54; N, 19.74. Found. C, 37.69; H, 5.22; N, 19.58). The purity of ZIF-8 product has also been confirmed by PXRD analysis.

Single Crystal X-Ray Diffraction Studies.

All of the intensity data were collected on a SMART APEX CCD diffractometer (Bruker-AXS, Madison, Wis.) with graphite monochromated MoKα ($\lambda$=0.71073 Å) radiation. Structures were solved by direct methods, and successive difference Fourier syntheses were made with the SHELXTL software package (Bruker-AXS). Crystal data are as follows: ZIF-1 (crb, monoclinc form): monoclinic, space group $P2_1/n$; a=9.740, b=15.266, c=14.936 Å, β=98.62°; V=2195.8 Å$^3$, R1=0.0423. ZIF-2 (crb, orthorhombic form): orthorhombic, space group Pbca; a=9.679, b=c=24.114 Å; V=5707 Å$^3$, R=0.0591. ZIF-3 (dft): tetragonal, space group $P4_2/mnm$; a=b=18.970, c=16.740 Å; V=6024.3 (1) Å$^3$, R1=0.0610. ZIF-4 (cag): orthorhombic, space group Pbca; a=b=15.395, c=18.426 Å; V=4342.2 Å$^3$, R1=0.0406. ZIF-5 (gar): cubic, space group Ia3d; $a_o$=21.9619 Å; V=0592.8 Å$^3$, R1=0.0191. ZIF-6 (gis): tetragonal, space group $I4_1/amd$; a=b=18.515, c=20.245 Å; V=6940.2 Å$^3$, R1=0.0642. ZIF-7: [sod-Zn(II)-PhIM form]: hexagonal, space group R3; a=b=22.989, c=15.763 Å; V=7214 Å$^3$, R1=0.0707. ZIF-8: [sod-Zn(II) MeIM form]: cubic, space group I4/3m; $a_o$=16.9910 Å; V=4905.2 Å$^3$, R1=0.0314. ZIF-9 [sod-Co(II)-PhIM form]: hexagonal, space group R3; a=b=22.9437, c=15.747 Å; V=7178.8 Å$^3$, R1=0.0979. ZIF-10 (mer): tetragonal, space group I4/mmm; a=b=27.0608, c=19.406 Å; V=14211 Å$^3$, R1=0.0636. ZIF-11 [rho-Zn(II)-PhIM form]: cubic, space group Pm3m; $a_o$=28.7595 Å; V=23787.2 Å$^3$, R1=0.0787. ZIF-12 [rho-Co(II)-PhIM form]: cubic, space group Pm3m; $a_o$=28.7595 Å; V=23787.2 Å$^3$, R1=0.1064. Atomic coordinates are available for download from the Cambridge Crystallographic Data Centre by citing deposition numbers 602535 (ZIF-1), 602536 (ZIF-2), 602537 (ZIF-3), 602538 (ZIF-4), 602539 (ZIF-5), 602540 (ZIF-6), 602541 (ZIF-7), 602542 (ZIF-8), 602543 (ZIF-9), 602544 (ZIF-10), 602545 (ZIF-11), 602546 (ZIF-12).

PXRD Studies.

Powder x-ray data were collected by using a D8-Advance 0-20 diffractometer (Bruker) in reflectance Bragg-Brentano geometry employing Ni-filtered CuKα line focused radiation at 1,600 W (40 kV, 40 mA) power and equipped with a Na(Tl) scintillation detector fitted with a 0.2-mm radiation entrance slit. Samples were mounted on zero background sample holders by dropping powders from a wide-blade spatula and then leveling the sample surface with a razor blade. All samples were ground before PXRD experiment.

TGA.

All samples were run on a Q-500 series thermal gravimetric analyzer (TA Instruments, New Castle, Del.) with samples held in platinum pans in a continuous-flow nitrogen atmosphere. Samples were heated at a constant rate of 5° C./min during all TGA experiments.

Gas-Sorption Measurements.

All low-pressure gas-sorption experiments (up to 1 atm) were performed on a Autosorb-1C automatic volumetric instrument (Quantachrome, Boynton Beach, Fla.). High-pressure hydrogen sorption experiments (up to 80 bar) were performed on a HPA-100 volumetric instrument (VTI, Hialeah, Fla.) equipped with a home-made liquid nitrogen cooling system to sustain a constant coolant bath level. The compressibility factors of high-pressure gases were determined by using the REFPROP program [Version 7.0; National Institute of Standards and Technology (NIST), Gaithersburg, Md.] and the NIST Standard Reference Data Base 23. Before gas-sorption analysis, ZIF-8 and -11 samples were immersed in methanol at ambient temperature for 48 h and evacuated at ambient temperature for 5 h, then at an elevated temperature (300° C. for ZIF-8, 180° C. for ZIF-11) for 2 h.

(ZIF-1 crb): $Zn(IM)_2 \cdot (Me_2NH)$.

A solid mixture of zinc nitrate tetrahydrate $Zn(NO_3)_2 \cdot 4H_2O$ (0.09 g, $3.44 \times 10^{-4}$ mol) and imidazole (H-IM) (0.15 g, $2.20 \times 10^{-3}$ mol) was dissolved in 18 mL DMF in a 20-mL vial. The vial was capped and heated for 24 h in a 85° C. isothermal oven. The vial was then removed from the oven and allowed to cool to room temperature naturally. Colorless cubic crystals of ZIF-1 thus produced were washed with DMF (3 mL×3) and dried in air (10 min) (yield: 0.014 g, 17% based on zinc nitrate tetrahydrate). Elemental analysis $C_8H_{13}N_5Zn=Zn(IM)_2 \cdot (Me_2NH)$: Calcd. C, 39.28; H, 5.36; N, 28.65. Found C, 39.47; H, 4.39; N, 27.13. FT-IR: (KBr 4000-400 $cm^{-1}$): 3445 (br), 3103 (w), 2935 (w), 2385 (w), 2355 (w), 1647 (s), 1499 (m), 1418 (w), 1403 (w), 1321 (w), 1291 (w), 1245 (w), 1184 (w), 1087 (s), 1026 (w), 985 (w), 960 (m), 837 (w), 761 (m), 680 (m), 603 (w).

Experimental and Refinement Details for ZIF-1 (crb).

A colorless cubic crystal ($0.15 \times 0.10 \times 0.10$ mm$^3$) of ZIF-1 was placed in a 0.3 mm diameter borosilicate capillary along with a small amount of mother liquor, which was flame sealed, and mounted on a Bruker SMART APEX CCD diffractometer while being flash frozen to 223(2) K in a liquid N2 cooled stream of nitrogen gas. Using 951 reflections chosen from the full data set, it was determined that the crystal was twinned by a rotation of 180° about the real axis [0.234-0.935 1.000]. Using the orientation matrices produced by this program, the data were reduced to $F^2$ values using the two-component version of SAINT-Plus (v. 7.0). Integration of the data in the orthorhombic cell yielded a total of 41904 reflections of which 20536 were greater than $4\sigma(I)$. The range of θ was from 1.92 to 29.63°. The structure was solved in the monoclinic P21/n space group with Z=4 using direct methods. All non-hydrogen atoms were refined anisotropically with hydrogen atoms generated as spheres riding the coordinates of their parent atoms. Final full matrix least-squares refinement on $F^2$ converged to R1=0.0423 (F>2σF)) and $wR_2$=0.0632 (all data) with GOF=1.053. Most residual electron density in the final F-map was closely associated with the guest dimethylacetamide molecule within the pore of ZIF-1. However, the largest peak lies directly on Zn1, and is an artifact of refinement of structure with a twinned dataset. Crystal data and structure refinement for ZIF-1: Empirical formula, $C_{16}H_{21}N_9O$ $Zn_2$; Formula weight, 486.16; Temperature, 223(2) K; Wavelength, 0.71073 Å; Crystal system, Monoclinic; Space group, P21/n; Unit cell dimensions, a=9.7405(19) Å; α=90°, b=15.266(3) Å, β=98.62(3)°, c=14.936(3) Å; γ=90°; Volume, 2195.8 Å$^3$; Z, 4; Density (calculated), 1.471 Mg/m3; Absorption coefficient, 2.209 mm-1; F(000), 992; Crystal size, $0.15 \times 0.10 \times 0.10$ mm3; Theta range for data collection, 1.92 to 29.63°. Index ranges −13<=h<=13, −21<=k<=21, −20<=1<=20 Reflections collected 41776 Independent reflections 41904 [R(int)=0.0000] Completeness to theta=29.63° 99.2% Absorption correction Semi-empirical from equivalents Max. and min. transmission 0.8093 and 0.7329 Refinement method Full-matrix least-squares on $F^2$ Data/restraints/parameters 41904/0/257 Goodness-of-fit on $F^2$ 1.053 Final R indices [I>2sigma(I)] R1=0.0423, $wR_2$=0.0603 R indices (all data) R1=0.0985, $wR_2$=0.0632 Largest diff. peak and hole 1.437 and −0.583 e.E$^{-3}$.

Atomic coordinates ($\times 10^4$) and equivalent isotropic displacement parameters (Å$^2 \times 10^3$) for ZIF-1. U(eq) is defined as one third of the trace of the orthogonalized U$^{ij}$ tensor.

| | x | y | z | U(eq) |
|---|---|---|---|---|
| C(1S) | 1733(3) | 8647(2) | 9015(2) | 228(2) |
| C(2S) | 1364(5) | 9681(3) | 9105(3) | 155(2) |
| C(4S) | −808(2) | 9302(2) | 8364(2) | 180(1) |
| C(3S) | 80(4) | 10828(2) | 8893(2) | 226(2) |
| N(1S) | 320(3) | 9815(3) | 8816(2) | 191(2) |
| O(1S) | 2360(2) | 10096(2) | 9471(1) | 177(1) |
| C(1) | 5301(2) | 9080(1) | 8433(1) | 49(1) |
| C(2) | 5492(2) | 8987(1) | 7055(1) | 70(1) |
| C(3) | 5737(2) | 8193(1) | 7443(1) | 72(1) |
| C(4) | 8893(2) | 6816(1) | 9818(1) | 72(1) |
| C(5) | 8137(2) | 6361(1) | 8521(1) | 52(1) |
| C(6) | 4565(2) | 5453(1) | 8838(1) | 62(1) |
| C(7) | 4441(2) | 7184(1) | 10838(1) | 67(1) |
| C(8) | 1680(2) | 10102(1) | 6505(1) | 65(1) |
| C(9) | 1756(2) | 11462(1) | 6762(1) | 48(1) |
| C(10) | 5040(2) | 11479(1) | 5566(1) | 68(1) |
| C(11) | 4271(2) | 11705(1) | 9101(1) | 47(1) |
| C(12) | 5691(2) | 12362(1) | 8402(1) | 69(1) |
| N(1) | 5608(1) | 8250(1) | 8336(1) | 46(1) |
| N(2) | 5194(1) | 9558(1) | 7686(1) | 46(1) |
| N(3) | 7723(1) | 6753(1) | 9222(1) | 44(1) |
| N(4) | 4522(1) | 6328(1) | 8680(1) | 45(1) |
| N(5) | 5345(1) | 7599(1) | 10387(1) | 45(1) |
| N(6) | 2511(1) | 10755(1) | 6902(1) | 46(1) |
| N(7) | 4871(1) | 11644(1) | 8368(1) | 44(1) |
| N(8) | 5533(1) | 11177(1) | 6399(1) | 44(1) |
| Zn(1) | 4532(1) | 10761(1) | 7390(1) | 45(1) |
| Zn(2) | 5845(1) | 7261(1) | 9205(1) | 46(1) |

(ZIF-2 crb): $Zn(IM)_2$.

0.265 mL imidazole stock solution (0.150 M, $3.98 \times 10^{-4}$ mol) and 0.035 mL $Zn(NO_3)_2 \cdot 4H_2O$ stock solution (0.075 M, $2.63 \times 10^{-6}$ mol). The product was in the form of small rod-shaped single crystals.

Experimental and Refinement Details for ZIF2 CRB—Orthorhombic.

A colorless rod-shaped crystal ($0.15 \times 0.05 \times 0.03$ mm$^3$) of ZIF-2 was placed in a 0.3 mm diameter borosilicate capillary along with a small amount of mother liquor, which was flame sealed, and mounted on a Bruker SMART APEX CCD diffractometer while being flash frozen to 153(2) K in a liquid N2 cooled stream of nitrogen gas. Integration of the data in the orthorhombic cell yielded a total of 12384 reflections of which 4094 were unique and 1936 were greater than $4\sigma(1)$. The range of 0 was from 1.67 to 23.25°. Analysis of the data showed negligible decay during collection. The structure was solved in the monoclinic Pbca space group with Z=8 using direct methods. All non-hydrogen atoms were refined anisotropically with hydrogen atoms generated as spheres riding the coordinates of their parent atoms. Final full matrix least-squares refinement on $F^2$ converged to R1=0.0591 (F>2σF))

and $wR_2$=0.1523 (all data) with GOF=0.924. All residual electron density in the final F-map was closely associated with the guest dimethylformamide molecule within the pore of ZIF-2. Crystal data and structure for ZIF2: Empirical formula, C21H12N11O3 Zn2; Formula weight, 597.16; Temperature, 153 K; Wavelength, 0.71073 Å; Crystal system, Orthorhombic; Space group, P b c a; Unit cell dimensions, a=9.679(3) Å, α=90°, b=24.114(6) Å, β=90°, c=24.450(6) Å, γ=90'; Volume, 5707 Å$^3$, Z, 8; Density (calculated) 1.390 Mg/m$^3$; Absorption coefficient, 1.722 mm$^{-1}$; F(000), 2392; Crystal size, 0.15×0.05×0.03 mm$^3$; Theta range for data collection, 1.67 to 23.25°. Index ranges −10<=h<=10, −26<=k<=19, −13<=l<=27 Reflections collected 12384 Independent reflections 4094 [R(int)=0.0809] Completeness to theta=23.25° 99.9% Absorption correction Semi-empirical from equivalents Max. and min. transmission 0.950 and 0.902 Refinement method Full-matrix least-squares on F$^2$ Data/restraints/parameters 4094/0/334 Goodness-of-fit on F$^2$ 0.924 Final R indices [I>2sigma(I)] R1=0.0591, $wR_2$=0.1299 R indices (all data) R1=0.1317, $wR_2$=0.1523 Largest diff. peak and hole 0.600 and −0.447 e.E$^{-3}$ Atomic coordinates (×10$^4$) and equivalent isotropic displacement parameters (Å$^2$×10$^3$) for ZIF-2. U(eq) is defined as one third of the trace of the orthogonalized U$^{ij}$ tensor.

|        | x        | y       | z       | U(eq)   |
|--------|----------|---------|---------|---------|
| Zn(1)  | −151(1)  | 1747(1) | 5012(1) | 21(1)   |
| Zn(2)  | −20(1)   | 18(1)   | 3239(1) | 21(1)   |
| N(4)   | 1184(7)  | 2346(3) | 4819(3) | 21(2)   |
| N(3)   | −1968(6) | 2106(3) | 5213(3) | 19(2)   |
| C(1)   | −172(8)  | 810(4)  | 4181(4) | 23(2)   |
| C(7)   | −2534(9) | 124(3)  | 2492(4) | 19(2)   |
| C(4)   | 1034(9)  | 2722(4) | 4402(4) | 34(3)   |
| N(5)   | −1215(6) | −51(3)  | 2572(3) | 20(2)   |
| C(9)   | −919(8)  | −340(4) | 2116(4) | 25(2)   |
| C(5)   | 2416(8)  | 2463(4) | 5033(4) | 24(2)   |
| N(6)   | 1941(6)  | −55(3)  | 2982(3) | 15(2)   |
| C(8)   | −2016(8) | −341(4) | 1779(4) | 27(2)   |
| C(10)  | −78(8)   | 818(4)  | 5818(4) | 23(2)   |
| C(6)   | −2847(8) | 1943(4) | 5618(4) | 26(2)   |
| N(1)   | −500(7)  | 1313(3) | 4336(3) | 20(2)   |
| C(2)   | −1026(10)| 1548(4) | 3873(4) | 40(3)   |
| C(11)  | 1358(9)  | 1058(4) | 6445(4) | 32(2)   |
| N(2)   | −433(7)  | 702(3)  | 3654(3) | 19(2)   |
| C(3)   | −995(10) | 1172(4) | 3457(4) | 37(3)   |
| C(12)  | 1351(10) | 1457(4) | 6055(4) | 38(3)   |
| N(8)   | 451(7)   | 1309(3) | 5646(3) | 22(2)   |
| N(7)   | 432(7)   | 651(3)  | 6307(3) | 21(2)   |
| O(1S)  | 7587(7)  | −43(4)  | 5355(3) | 62(2)   |
| N(1S)  | 6465(9)  | 225(5)  | 4596(4) | 74(4)   |
| C(11S) | 7204(12) | −109(7) | 4880(6) | 88(5)   |
| C(12S) | 6097(16) | 806(6)  | 4852(7) | 104(6)  |
| C(13S) | 6066(12) | 176(6)  | 4022(4) | 76(4)   |
| O(2S)  | 5735(9)  | 1399(4) | 2944(3) | 81(3)   |
| N(2S)  | 4192(8)  | 1504(3) | 3619(4) | 38(2)   |
| C(21S) | 4593(11) | 1225(5) | 3172(5) | 56(4)   |
| C(22S) | 4968(10) | 1941(5) | 3893(5) | 61(4)   |
| C(23S) | 2875(10) | 1302(5) | 3872(5) | 60(4)   |
| O(3S)  | 3673(8)  | 2156(4) | 6660(3) | 66(3)   |
| N(3S)  | 2886(9)  | 2179(4) | 7527(4) | 52(3)   |
| C(31S) | 2976(11) | 2383(5) | 7019(5) | 57(4)   |
| C(32S) | 1992(12) | 2496(6) | 7918(5) | 79(4)   |
| C(33S) | 3664(15) | 1688(5) | 7707(5) | 86(5)   |

(ZIF-3 dft): Zn(IM)2.

A solid mixture of zinc nitrate tetrahydrate Zn(NO3) 2.4H2O (0.010 g, 3.82×10$^{-5}$ mol) and imidazole (H-IM) (0.030 g, 4.41×10$^{-4}$ mol) was added in a 4-mL vial and dissolved in a mixed solvent of DMF (2 mL) and NMP (1 mL). The vial was capped and heated for 4 d in a 85° C. isothermal oven. The vial was then removed from the oven and allowed to cool to room temperature naturally. Several prism-shaped crystals formed at the bottom of the vial along with some white powder-like precipitate. The crystals of ZIF-3 were collected manually for single crystal X-ray structure determination.

Experimental and Refinement Details for ZIF-3.

A colorless prismatic crystal (0.20×0.20×0.15 mm$^3$) of ZIF-3 was placed in a 0.3 mm diameter borosilicate capillary along with a small amount of mother liquor, which was flame sealed, and mounted on a Bruker SMART APEX CCD diffractometer while being flash frozen to 258(2) K in a liquid N2 cooled stream of nitrogen gas. Integration of the data in a primitive tetragonal cell yielded a total of 50492 reflections of which 3091 were unique and 1349 were greater than 4σ(I). The range of θ was from 1.62 to 25.72°. Analysis of the data showed negligible decay during collection. The structure was solved in the monoclinic P42/mnm space group with Z=16 using direct methods. All non-hydrogen atoms were refined anisotropically except for electron density within the pores which were modeled as isotropic oxygen atoms, hydrogen atoms were generated as spheres riding the coordinates of their parent atoms. Final full matrix least-squares refinement on F$^2$ converged to R1=0.0610 (F>2σF)) and $wR_2$=0.1878 (all data) with GOF=1.012. All residual electron density in the final F-map was closely associated with the guest molecules within the pore of ZIF-3. Crystal data and structure refinement for ZIF-3: Empirical formula, C6H6N4O3 Zn; Formula weight, 247.52; Temperature, 258 K; Wavelength, 0.71073 Å; Crystal system, Tetragonal; Space group, P42/mnm; Unit cell dimensions, a=18.9701 Å, α=90°, b=18.9701 Å, β=90°, c=16.740 Å, γ=90°; Volume, 6024.3 Å$^3$, Z, 16; density (calculated), 1.092 Mg/m$^3$; Absorption coefficient, 1.622 mm$^{-1}$; F(000), 1984; Crystal size, 0.20×0.20×0.15 mm$^3$; Theta range for data collection, 1.62 to 25.72°. Index ranges −23<=h<=23, −23<=k<=23, −20<=l<=20 Reflections collected 50942 Independent reflections 3091 [R(int)=0.1647] Completeness to theta=25.72° 99.3% Max. and min. transmission 0.7929 and 0.7373 Refinement method Full-matrix least-squares on F$^2$ Data/restraints/parameters 3091/0/146 Goodness-of-fit on F$^2$ 1.012 Final R indices [I>2sigma(1)] R1=0.0610, $wR_2$=0.1736 R indices (all data) R1=0.1293, $wR_2$=0.1878 Largest diff. peak and hole 0.963 and −0.485 e.E$^{-3}$.

Atomic coordinates (×10$^4$) and equivalent isotropic displacement parameters (Å$^2$×10$^3$) for ZIF-3. U(eq) is defined as one third of the trace of the orthogonalized U$^{ij}$ tensor.

|       | x        | y        | z        | U(eq)    |
|-------|----------|----------|----------|----------|
| O(1S) | 4194(19) | 630(20)  | 0        | 240(20)  |
| O(2S) | 4590(40) | 190(50)  | 0        | 500(50)  |
| O(3S) | 5240(20) | 4090(30) | 0        | 780(110) |
| O(4S) | 5000     | 0        | 0        | 470(100) |
| O(5S) | 5000     | 0        | 1113(17) | 252(12)  |
| O(6S) | 5815(12) | 4185(12) | 0        | 330(30)  |
| O(7S) | 9005(10) | 995(10)  | 1863(16) | 408(16)  |
| O(8S) | 5480(30) | 3610(20) | 0        | 630(50)  |
| Zn(1) | 6055(1)  | 1734(1)  | 1792(1)  | 58(1)    |
| C(1)  | 7107(4)  | 2893(4)  | 1727(6)  | 66(3)    |
| C(2)  | 6398(4)  | 3092(4)  | 2656(6)  | 110(3)   |
| C(3)  | 6382(4)  | 326(4)   | 2505(4)  | 59(2)    |
| C(4)  | 6992(5)  | 1093(4)  | 3066(5)  | 91(4)    |
| C(5)  | 6812(4)  | 1088(5)  | 422(5)   | 101(3)   |
| C(6)  | 5971(5)  | 1711(5)  | 0        | 65(3)    |
| C(7)  | 4527(4)  | 2173(4)  | 1623(5)  | 87(3)    |
| N(1)  | 6522(3)  | 2646(3)  | 2044(3)  | 57(1)    |
| N(2)  | 6492(3)  | 1006(3)  | 2488(3)  | 59(2)    |
| N(3)  | 6280(3)  | 1499(3)  | 671(3)   | 57(1)    |
| N(4)  | 5021(3)  | 1779(3)  | 1992(3)  | 61(2)    |

(ZIF-4 cag): Zn(IM)2.(DMF)(H2O)

A solid mixture of zinc nitrate tetrahydrate Zn(NO3)2.4H2O (0.040 g, 1.53×10$^{-4}$ mol) and imidazole (H-IM) (0.030 g, 4.41×10$^{-4}$ mol) was dissolved in 3 mL DMF in a 4-mL vial. The vial was capped and heated at a rate 5° C./min to 130° C. in a programmable oven, held at this temperature for 48 h, then cooled at a rate of 0.4° C./min to room temperature. Colorless rhombohedral crystals of ZIF-4 thus produced were washed with DMF (3 mL×3) and dried in the air (10 min) (yield: 0.021 g, 47% based on zinc nitrate tetrahydrate). Elemental analysis: C9H15N5O2Zn=Zn(IM)2.(DMF)(H2O): Calcd. C, 37.19; H, 5.20; N, 24.10. Found C, 38.02; H, 4.14; N, 26.74. FT-IR: (KBr 4000-400 cm$^{-1}$): 3427 (br), 3111 (w), 2926 (w), 2856 (w), 1688 (m), 1612 (br), 1502 (m), 1392 (w), 1282 (w), 1247 (w), 1176 (w), 1091 (s), 986 (w), 961 (m), 846 (w), 770 (m), 680 (m), 490 (br).

Experimental and Refinement Details for ZIF-4 (CAG).

A colorless prismatic crystal (0.20×0.15×0.15 mm$^3$) of ZIF-4 was placed in a 0.3 mm diameter borosilicate capillary along with a small amount of mother liquor, which was flame sealed, and mounted on a Bruker SMART APEX CCD diffractometer while being flash frozen to 233(2) K in a liquid N2 cooled stream of nitrogen gas. Integration of the data in the orthorhombic cell yielded a total of 45791 reflections of which 6074 were unique and 3960 were greater than 4σ(I). The range of θ was from 2.18 to 29.63°. Analysis of the data showed negligible decay during collection. The structure was solved in the monoclinic Pbca space group with Z=8 using direct methods. Atoms C4 and C9 were found to be disordered and with each group modeled as its own independent free variable. All non-hydrogen atoms were refined anisotropically with hydrogen atoms generated as spheres riding the coordinates of their parent atoms. Final full matrix least-squares refinement on F$^2$ converged to R1=0.0406 (F>2σF)) and wR$_2$=0.1109 (all data) with GOF=1.020. All residual electron density in the final F-map was closely associated with the guest dimethylformamide molecule within the pore of ZIF-4. Crystal data and structure refinement for ZIF-4: Empirical formula, C15H19N9 O Zn2; Formula weight, 472.13; Temperature, 233 K; Wavelength, 0.71073 Å; Crystal system, Orthorhombic; Space group, Pbca; Unit cell dimensions, a=15.3950 Å, α=90°, b=15.3073 Å, β=90°, c=18.426 Å, γ=90°; Volume, 4342.2 Å$^3$, Z, 8; Density (calculated), 1.444 Mg/m$^3$; Absorption coefficient, 2.232 mm−1; F(000), 1920; Crystal size, 0.20×0.15×0.15 mm$^3$; Theta range for data collection, 2.18 to 29.63°. Index ranges −21<=h<=21, −20<=k<=20, −25<=l<=25 Reflections collected 45791 Independent reflections 6074 [R(int)=0.1045] Completeness to theta=29.63° 99.2% Absorption correction Semi-empirical from equivalents Max. and min. transmission 0.7307 and 0.6638 Refinement method Full-matrix least-squares on F$^2$ Data/restraints/parameters 6074/0/243 Goodness-of-fit on F$^2$ 1.020 Final R indices [I>2sigma(I)] R1=0.0406, wR$_2$=0.1041 R indices (all data) R1=0.0682, wR$_2$=0.1109 Largest diff. peak and hole 0.575 and −0.483 e.E$^{-3}$.

Atomic coordinates (×10$^4$) and equivalent isotropic displacement parameters (Å$^2$×10$^3$) for ZIF-4. U(eq) is defined as one third of the trace of the orthogonalized U$^{ij}$ tensor.

| | x | y | z | U(eq) |
|---|---|---|---|---|
| C(1) | 8577(2) | 7339(2) | 8602(1) | 46(1) |
| C(2) | 8991(2) | 6132(2) | 9057(2) | 66(1) |
| C(3) | 9708(2) | 6582(2) | 8837(2) | 64(1) |
| C(5) | 6911(2) | 5137(2) | 7830(2) | 84(1) |

-continued

| | x | y | z | U(eq) |
|---|---|---|---|---|
| C(6) | 6198(2) | 8224(2) | 8907(2) | 68(1) |
| C(7) | 5982(2) | 7372(2) | 8018(1) | 49(1) |
| C(8) | 11059(2) | 8460(2) | 9536(1) | 47(1) |
| C(10) | 10760(2) | 8659(2) | 6609(2) | 68(1) |
| C(11) | 9053(2) | 9871(2) | 8616(1) | 47(1) |
| C(12) | 8628(3) | 9499(2) | 7571(2) | 79(1) |
| C(4A) | −2725(2) | 5951(6) | 10703(4) | 50(2) |
| C(9B) | 1830(5) | 8976(6) | 8675(4) | 48(2) |
| C(9A) | 1651(4) | 9323(5) | 8788(3) | 54(2) |
| C(4B) | −2920(4) | 5619(5) | 10570(3) | 56(2) |
| C(1S) | 2528(6) | 3362(5) | 4095(8) | 304(9) |
| C(2S) | 1571(12) | 2932(9) | 3358(6) | 368(9) |
| C(3S) | 1240(9) | 3195(15) | 4567(7) | 541(17) |
| N(1) | 8270(2) | 6615(2) | 8901(1) | 48(1) |
| N(2) | 9438(1) | 7351(1) | 8540(1) | 48(1) |
| N(3) | 6742(2) | 6226(2) | 10115(1) | 48(1) |
| N(4) | 6637(1) | 5369(2) | 8501(1) | 49(1) |
| N(5) | 6349(1) | 7393(1) | 8668(1) | 46(1) |
| N(6) | 11009(1) | 8676(2) | 8847(1) | 48(1) |
| N(7) | 10621(2) | 8120(2) | 7181(1) | 48(1) |
| N(8) | 9245(2) | 9329(1) | 8077(1) | 48(1) |
| N(1S) | 1799(3) | 3208(3) | 4021(2) | 113(1) |
| O(1S) | 3116(2) | 3661(3) | 4296(3) | 143(2) |
| Zn(1) | 7021(1) | 6395(1) | 9083(1) | 44(1) |
| Zn(2) | 10096(1) | 8360(1) | 8137(1) | 44(1) |

(ZIF-5 gar): In2Zn3(IM)12

Indium nitrate pentahydrate, In(NO3)3.5H2O (0.156 g, 4.0×10$^{-4}$ mol), zinc nitrate tetrahydrate Zn(NO3)2.4H2O (0.026 g, 1.0×10$^{-4}$ mmol) and imidazole (H-IM) (0.136 g, 2×10$^{-3}$ mol) were dissolved in a mixed solvent of DEF/nb-utanol (4 mL/2 mL). After the addition of small amount of tetraethylammonium hydroxide (35% aqueous solution), the mixture was transferred into a Teflon-lined Parr stainless steel vessel (23 mL) and heated at 150° C. for 72 hours under autogenous pressure. Pale-yellow crystals thus produced were washed with ethanol and dried in air (yield: 70%, based on zinc nitrate tetrahydrate). Elemental analysis: C36H36N24Zn3In2=In2Zn3(IM)12: Calcd. C, 35.14; H, 2.95; N, 27.32. Found C, 33.97; H, 2.82; N, 26.22. Zn/In molar ratio: Calcd, 1.50. Found, 1.52. FT-IR (KBr 4000-400 cm$^{-1}$): 3433 (br), 3132 (m), 3112 (m), 2601 (w), 2524 (w), 1697 (m), 1605 (m).

ZIF-5 was formulated as In2Zn3(IM)12 based on single crystal X-ray structure. It was found that the high In/Zn ratio employed in the synthesis was useful to the formation of ZIF-5. However, high Indium content also resulted in small amount of amorphous In-rich impurities (indium oxide or indium hydroxide) as evidenced by the electron microprobe analysis (EMPA) result of the "bright spots" on crystal surfaces. The content of such impurities was calculated to be 3.3%-4.4% based on the elemental analysis results of C, H, N for the bulk product. Nevertheless, the elemental analysis result of Zn/In molar ratio for a small number of the clearest crystals manually separated from the bulk product match the proposed formula well.

Experimental and Refinement Details for ZIF-5 (GARNET).

A colorless prism (0.15×0.12×0.10 mm$^3$) of ZIF-5 was placed in a 0.3 mm diameter borosilicate capillary along with a small amount of mother liquor, which was flame sealed, and mounted on a Bruker SMART APEX CCD diffractometer while being flash frozen to 196(2) K in a liquid N2 cooled stream of nitrogen. A total of 35102 reflections were collected of which 1107 were unique and 997 were greater than 4σ(I). The range of θ was from 2.27 to 28.26°. Analysis of the data showed negligible decay during collection. The structure was solved in the cubic Ia-3d space group with Z=8 using direct methods. All non-hydrogen atoms were refined anisotropically with hydrogen atoms generated as spheres riding the coordinates of their parent atoms. Final full matrix least-squares refinement on $F^2$ converged to R1=0.0191 (F>2σF)) and wR$_2$=0.0553 (all data) with GOF=1.121. Crystal data and structure refinement for ZIF-5: Empirical formula, C36H36 In2 N24 Zn3; Formula weight, 1230.64; Temperature, 153 K; Wavelength, 0.71073 Å; Crystal system, Cubic Space group, I a −3 d; Unit cell dimensions, a=21.9619 Å, α=90°, b=21.9619(6) Å, β=90°; c=21.9619 Å, γ=90°; Volume, 10592.8 Å$^3$, Z, 8; Density (calculated), 1.543 Mg/m$^3$; Absorption coefficient, 2.247 mm$^{-1}$; F(000), 4864; Crystal size, 0.15×0.12×0.10 mm$^3$; Theta range for data collection, 2.27 to 28.26°. Index ranges −29<=h<=27, −29<=k<=21, −29<=l<=25 Reflections collected 35102 Independent reflections 1107 [R(int)=0.0245] Completeness to theta=28.26° 100.0% Absorption correction Semi-empirical from equivalents Max. and min. transmission 0.799 and 0.703 Refinement method Full-matrix least-squares on $F^2$ Data/restraints/parameters 1107/0/62 Goodness-of-fit on $F^2$ 1.121 Final R indices [I>2sigma(I)] R1=0.0191, wR$_2$=0.0531 R indices (all data) R1=0.0221, wR$_2$=0.0553 Largest diff. peak and hole 0.762 and −0.155 e.E$^{-3}$.

Atomic coordinates (×10$^4$) and equivalent isotropic displacement parameters (Å$^2$×10$^3$) for ZIF-5. U(eq) is defined as one third of the trace of the orthogonalized U$^{ij}$ tensor.

|      | x       | y      | z        | U(eq)  |
|------|---------|--------|----------|--------|
| In(1)| 10000   | 0      | 10000    | 20(1)  |
| Zn(1)| 7500    | 1250   | 10000    | 21(1)  |
| N(2) | 8182(1) | 748(1) | 9684(1)  | 25(1)  |
| N(1) | 9065(1) | 243(1) | 9695(1)  | 24(1)  |
| C(1) | 8677(1) | 595(1) | 10003(1) | 24(1)  |
| C(2) | 8797(1) | 164(1) | 9135(1)  | 31(1)  |
| C(3) | 8261(1) | 469(1) | 9128(1)  | 33(1)  |

(ZIF-6 gis): Zn(IM)2.

Figure 4:
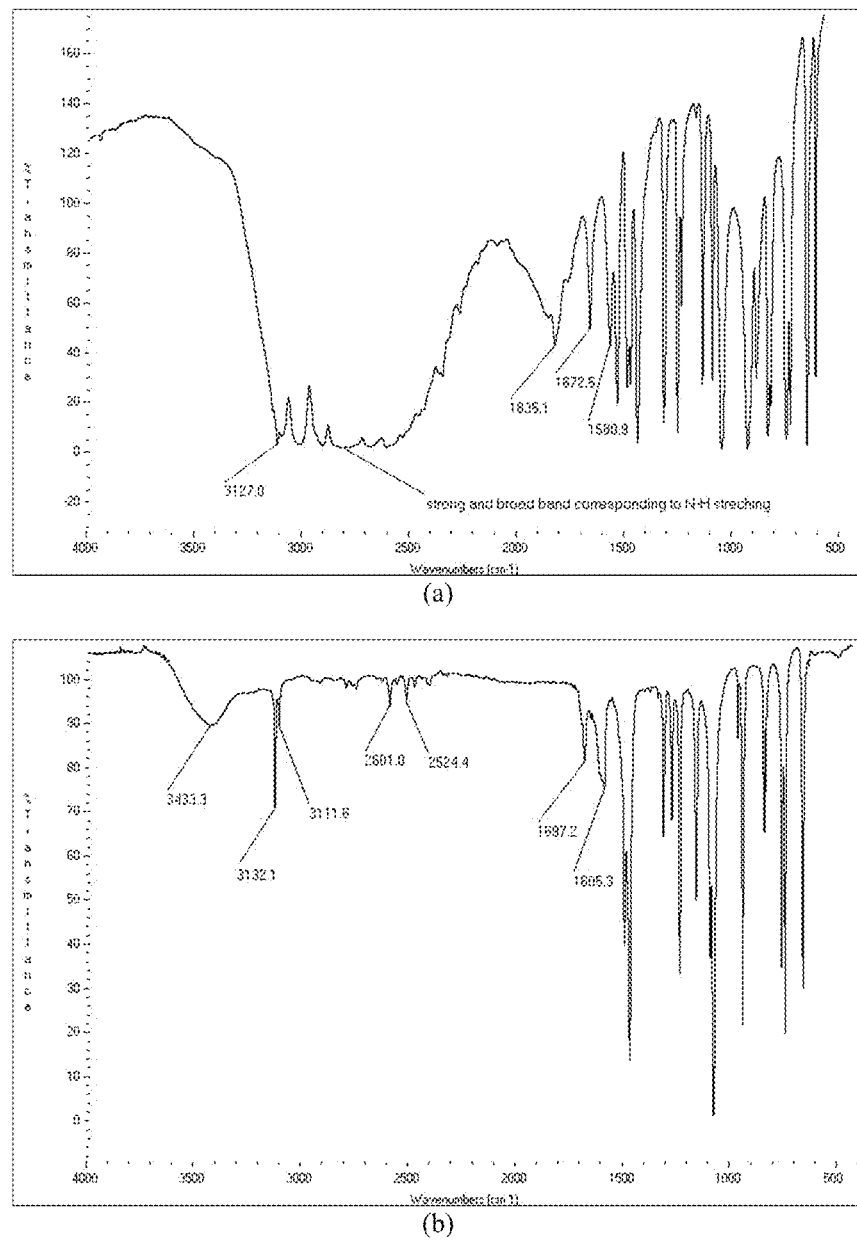
FIG. 4A-B provides the FT-IR spectra of (a) imidazole and (b) ZIF-5 (gar), $In2Zn3(IM)12$.
Figure 5:
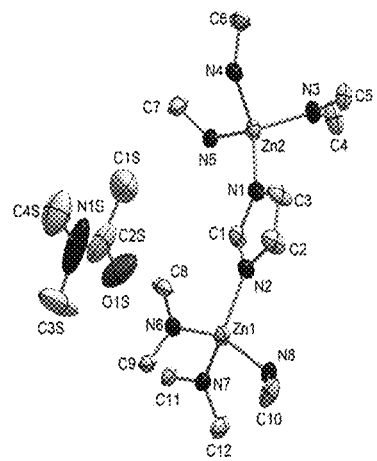
FIG. 5 is an ORTEP diagram of the Asymmetric Unit of ZIF-1 including dimethyl acetamide guest molecule.
Figure 6:
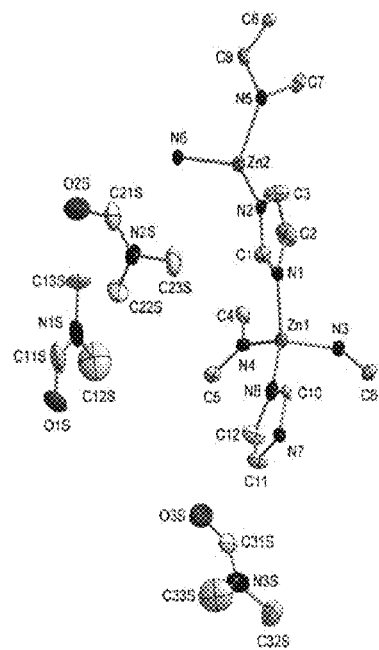
FIG. 6 is an ORTEP diagram of the asymmetric unit of ZIF-2 including guest dimethylformamide molecules. Ellipsoids are displayed at the 50% probability level.
Figure 7:
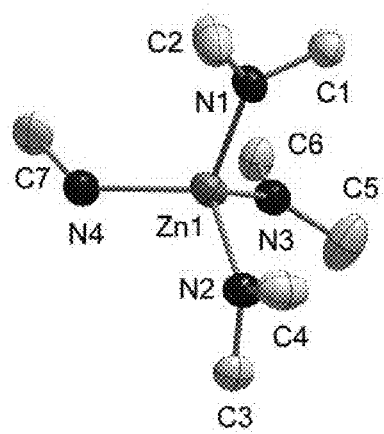
FIG. 7 is an ORTEP diagram of the asymmetric unit of ZIF-3 framework.
Figure 8:
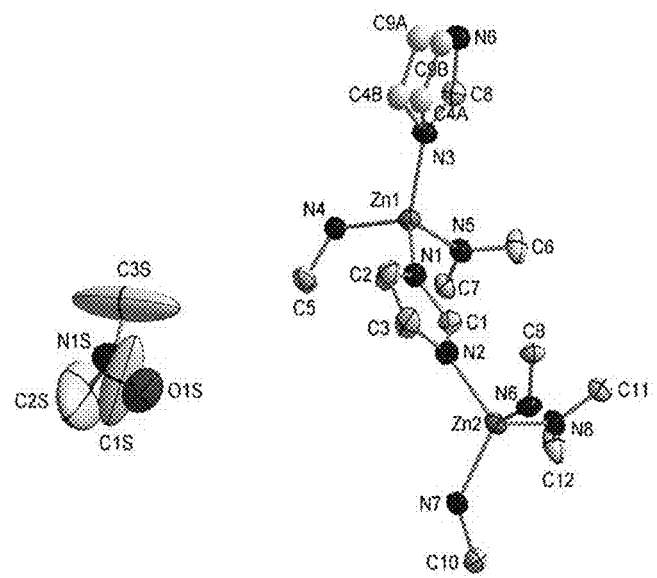
FIG. 8 is an ORTEP diagram of the asymmetric unit of ZIF-4 including guest dimethylformamide molecule.
Figure 9:
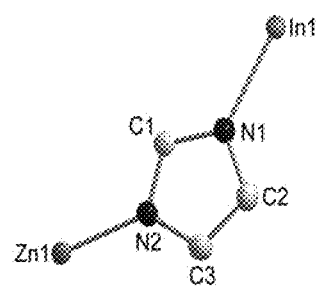
FIG. 9 is an ORTEP diagram of the asymmetric unit of the ZIF-5 framework. Ellipsoids are displayed at the 50% probability level.
Figure 10:
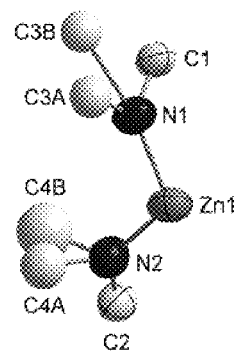
FIG. 10 is an ORTEP diagram for the asymmetric unit of the ZIF-6 framework.
Figure 11:
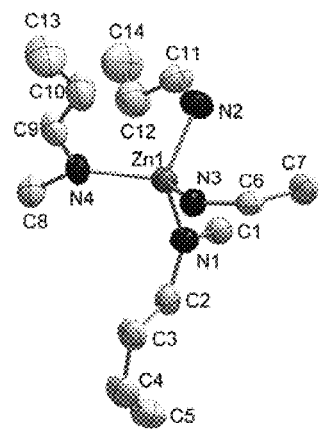
FIG. 11 is an ORTEP representative of the asymmetric unit of the ZIF-7 framework.
Figure 12:
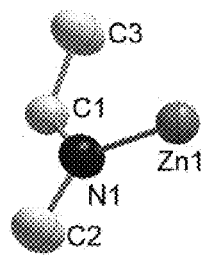
FIG. 12 is an ORTEP diagram of the asymmetric unit of the ZIF-8 framework.
Figure 13:
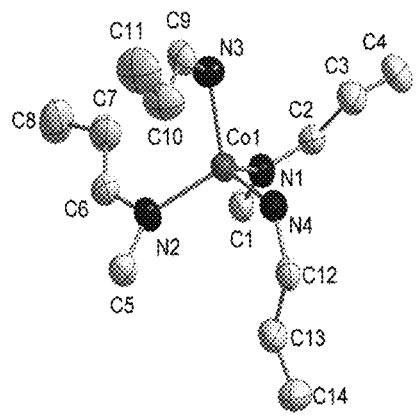
FIG. 13 is an ORTEP diagram of the asymmetric unit of the ZIF-9 framework.
Figure 14:
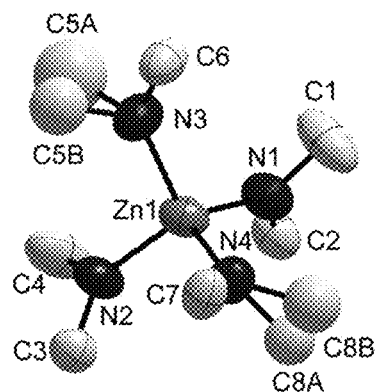
FIG. 14 is an ORTEP diagram of the asymmetric unit of ZIF-10 framework.
Figure 15:
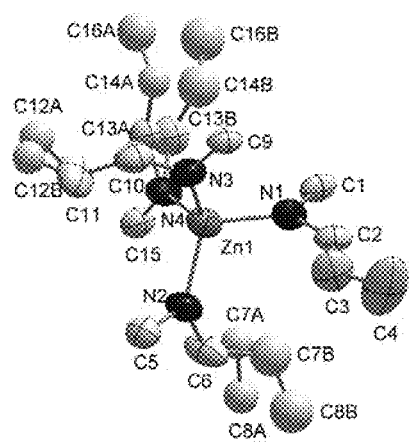
FIG. 15 is an ORTEP diagram of the asymmetric unit of the ZIF-11 framework.
Figure 16:
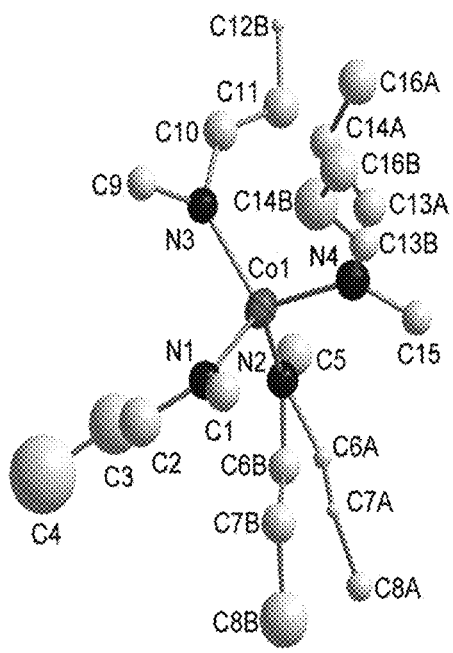
FIG. 16 is an ORTEP diagram of the asymmetric unit of ZIF-12 framework.
Figure 17:
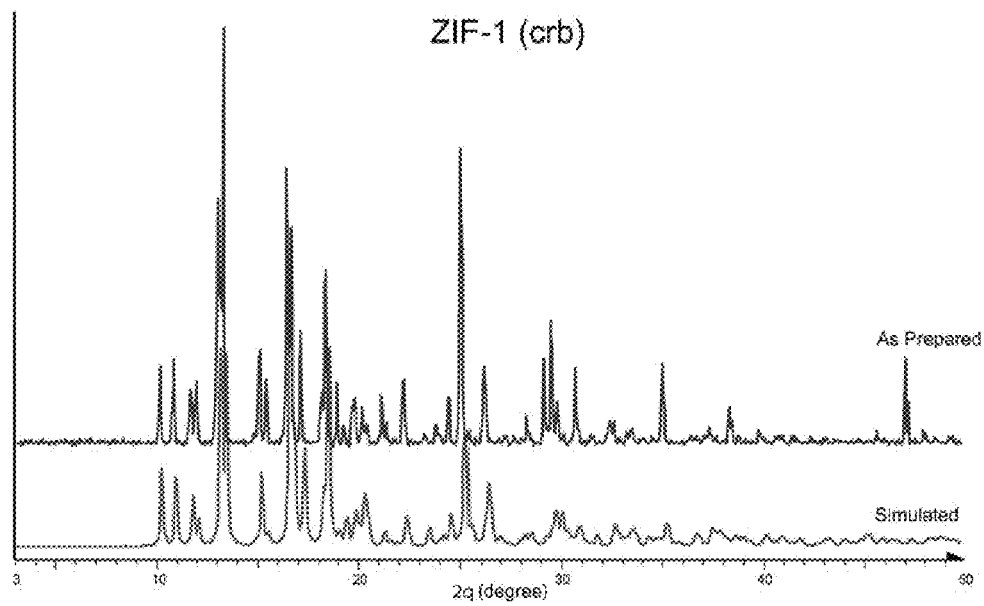
FIG. 17 shows a comparison of the experimental PXRD pattern of as-prepared ZIF-1 (top) with the one simulated from its single crystal structure (bottom). The very high degree of correspondence between the patterns indicates that the bulk material has the same structure as the single crystal.
Figure 18:
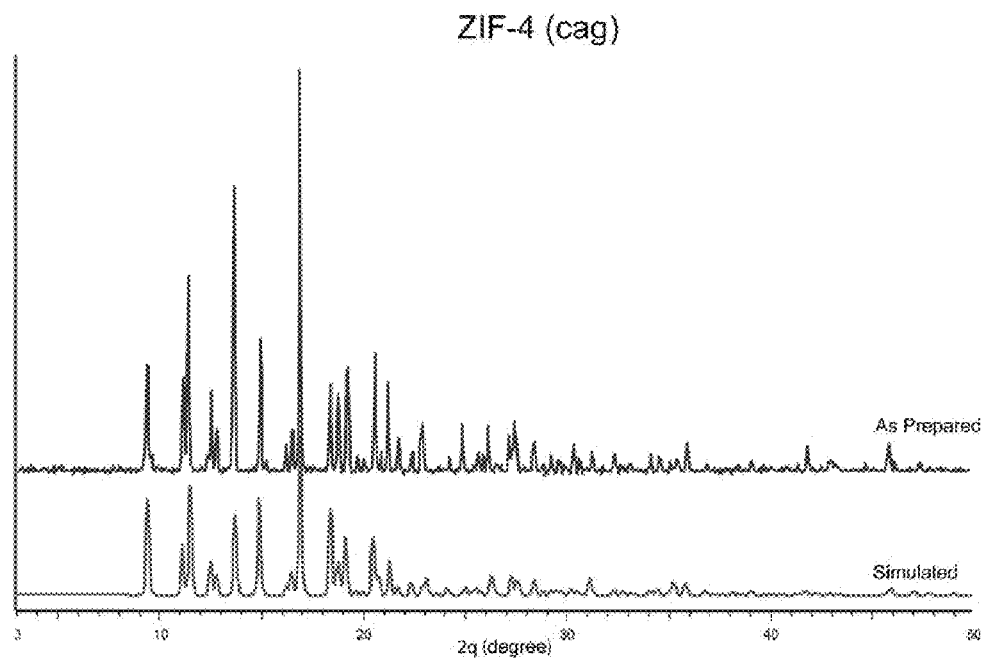
FIG. 18 shows a comparison of the experimental PXRD pattern of as-prepared ZIF-4 (top) with the one simulated from its single crystal structure (bottom). The very high degree of correspondence between the patterns indicates that the bulk material has the same structure as the single crystal.
Figure 19:
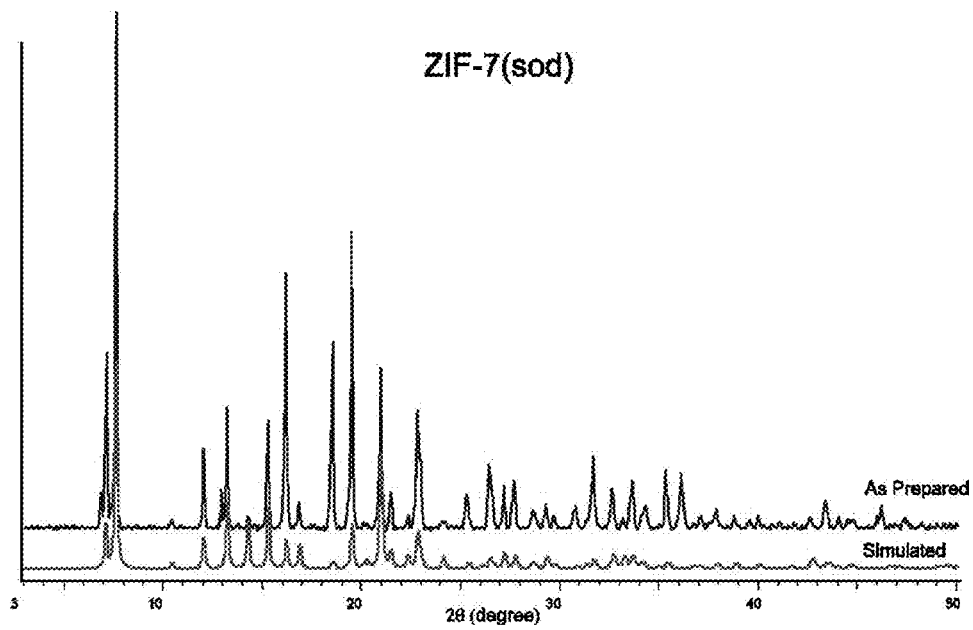
FIG. 19 shows a comparison of the experimental PXRD pattern of as-prepared ZIF-7 (top) with the one simulated from its single crystal structure (bottom). The very high degree of correspondence between the patterns indicates that the bulk material has the same structure as the single crystal.
Figure 20:
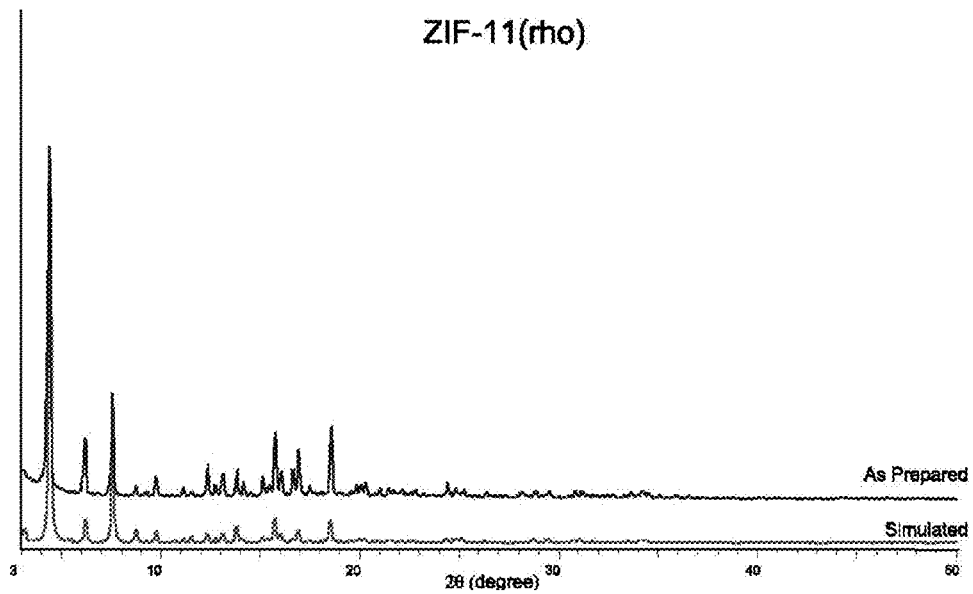
FIG. 20 shows a comparison of the experimental PXRD pattern of as-prepared ZIF-11 (top) with the one simulated from its single crystal structure (bottom). The very high degree of correspondence between the patterns indicates that the bulk material has the same structure as the single crystal.
Figure 21:
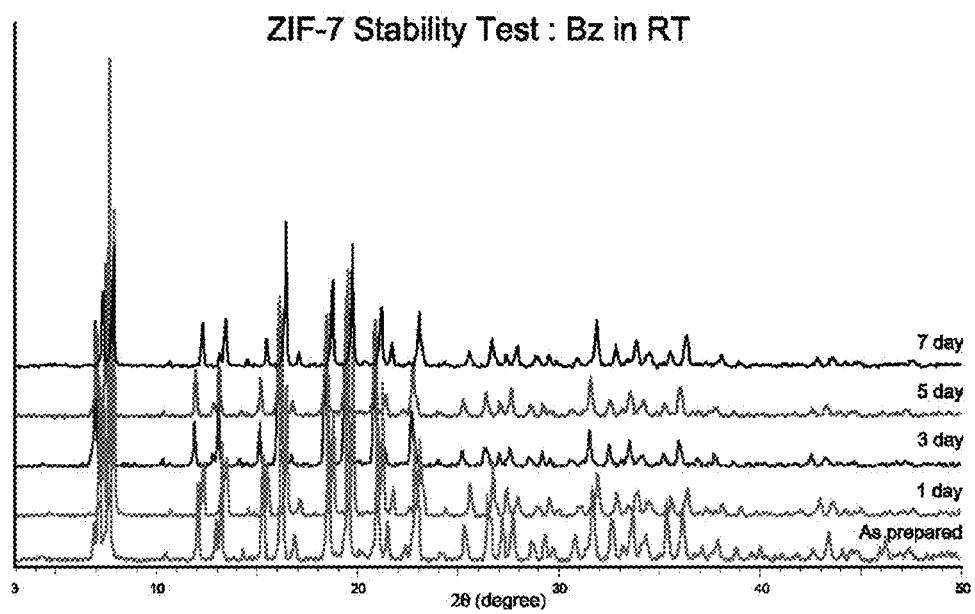
FIG. 21 shows PXRD patterns of ZIF-7 collected during stability test in benzene at room temperature. The framework structure of ZIF-7 was unchanged after 7 days.
Figure 22:
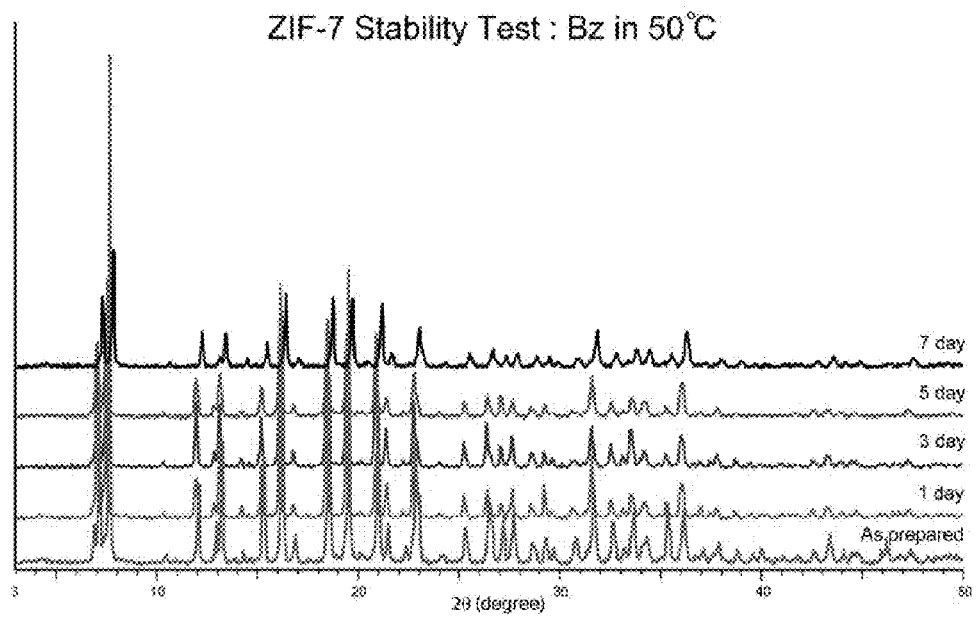
FIG. 22 shows PXRD patterns of ZIF-7 collected during stability test in benzene at 50° C. The framework structure of ZIF-7 was unchanged after 7 days.
Figure 23:
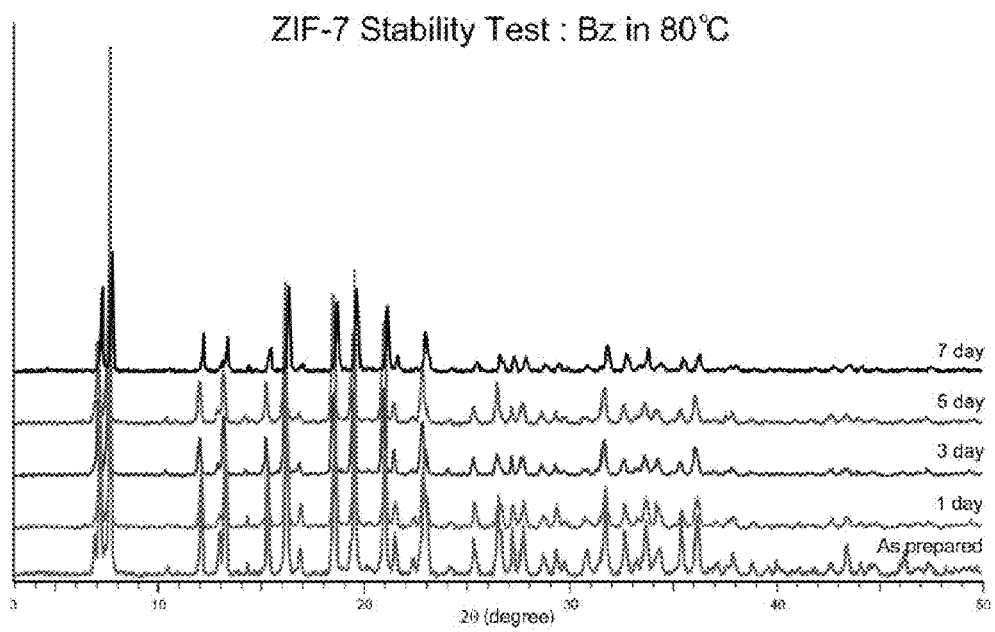
FIG. 23 shows PXRD patterns of ZIF-7 collected during stability test in benzene at 80° C. The framework structure of ZIF-7 was unchanged after 7 days.
Figure 24:
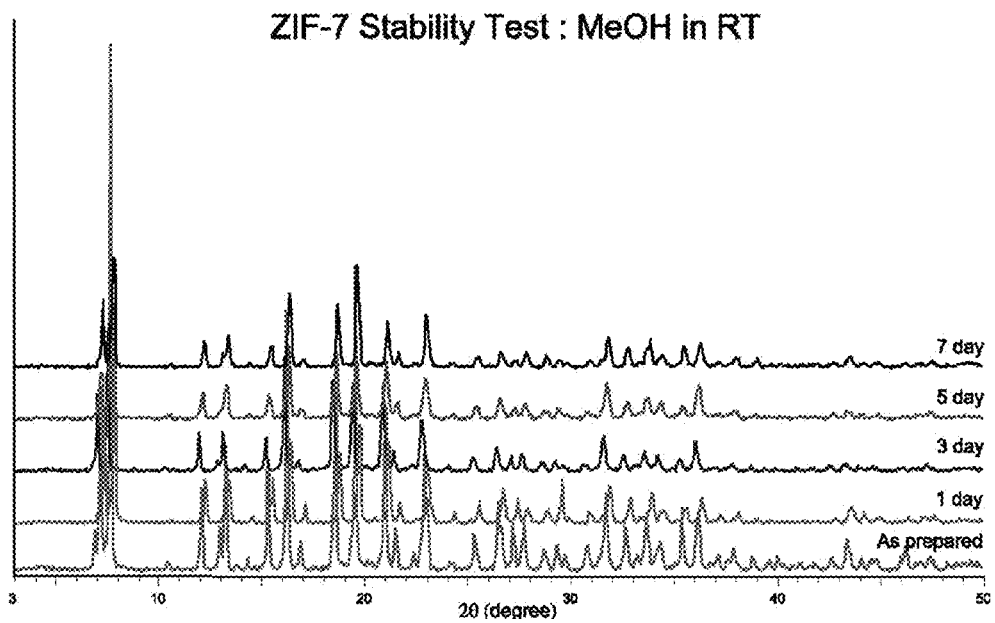
FIG. 24 shows PXRD patterns of ZIF-7 collected during stability test in methanol at room temperature. The framework structure of ZIF-7 was unchanged after 7 days.
Figure 25:
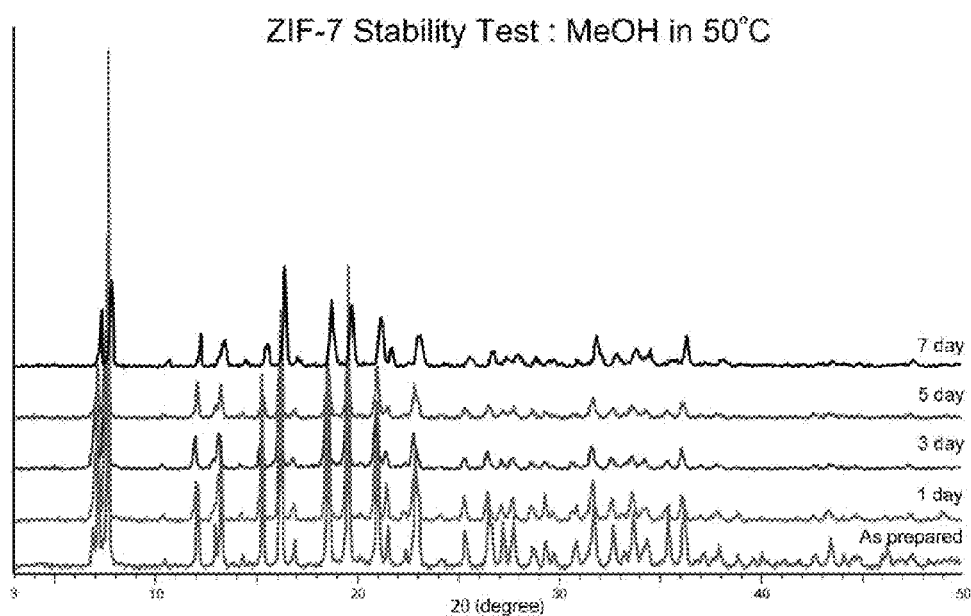
FIG. 25 shows PXRD patterns of ZIF-7 collected during stability test in methanol at 50° C. The framework structure of ZIF-7 was unchanged after 7 days.
Figure 26:
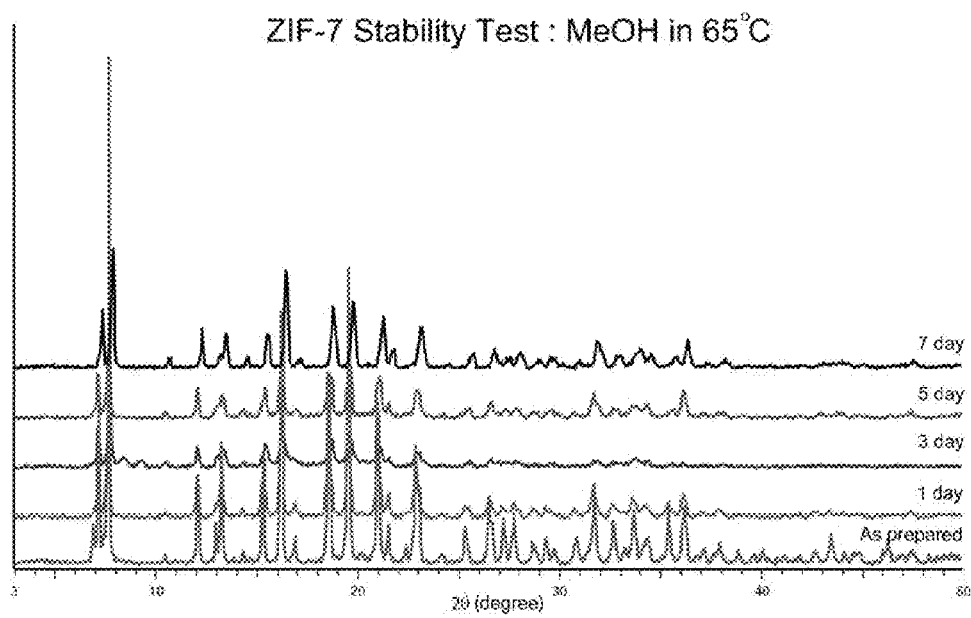
FIG. 26 shows PXRD patterns of ZIF-7 collected during stability test in refluxing methanol. The framework structure of ZIF-7 was unchanged after 7 days.
Figure 27:
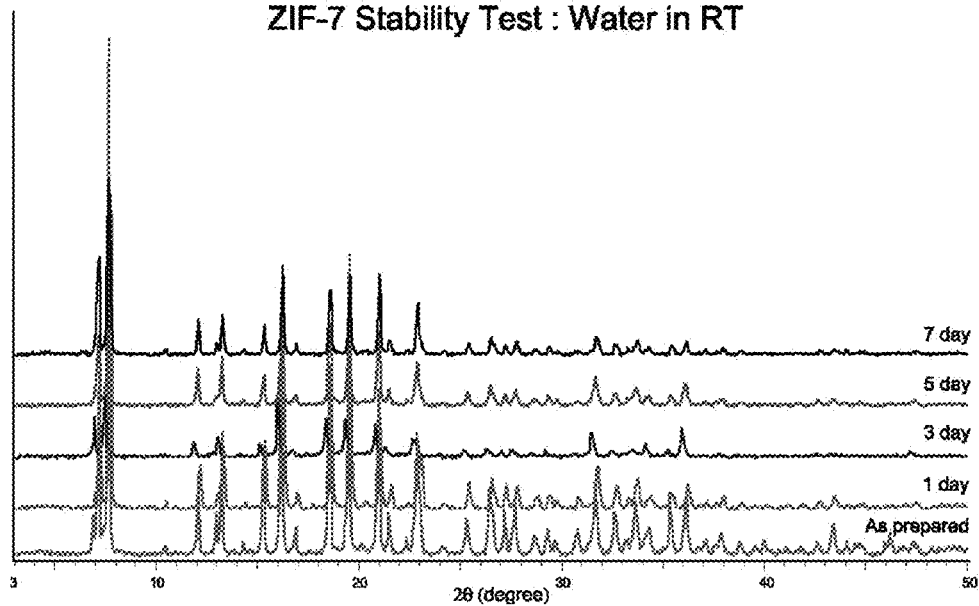
FIG. 27 shows PXRD patterns of ZIF-7 collected during stability test in water at room temperature. The framework structure of ZIF-7 was unchanged after 7 days.
Figure 28:
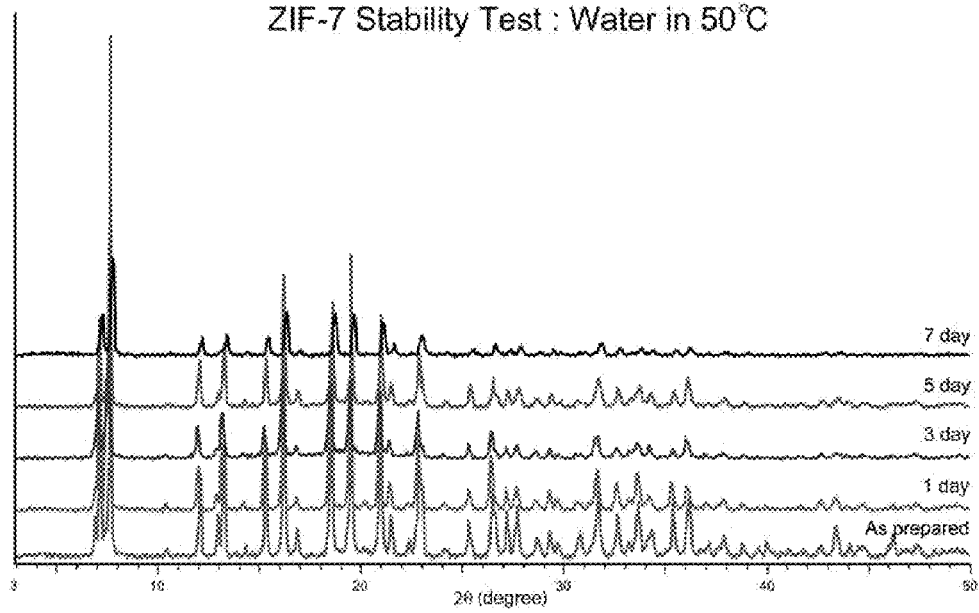
FIG. 28 shows PXRD patterns of ZIF-7 collected during stability test in water at 50° C. The framework structure of ZIF-7 was unchanged after 7 days.
Figure 29:
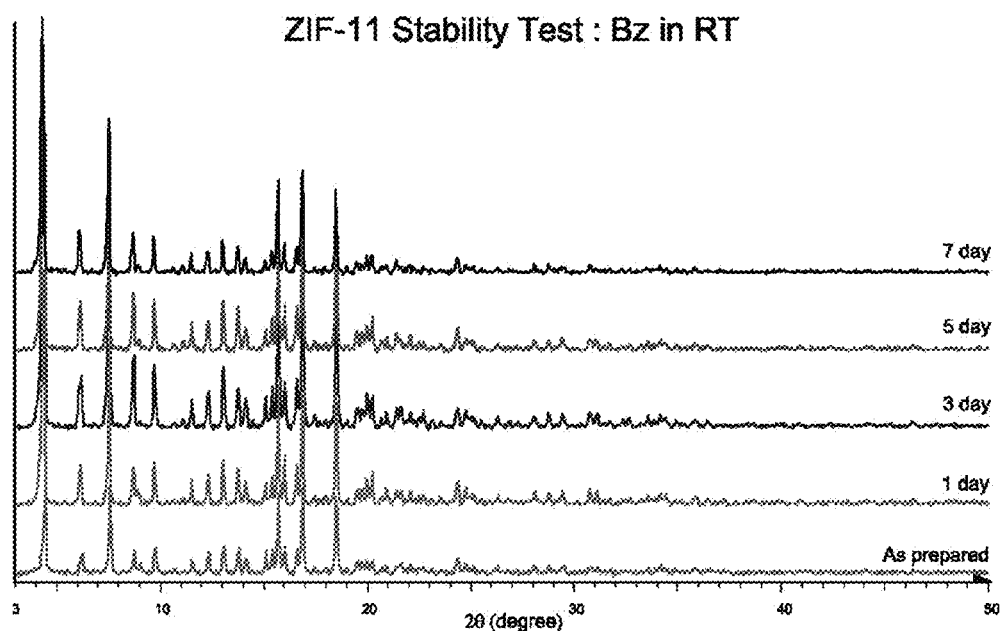
FIG. 29 shows PXRD patterns of ZIF-11 collected during stability test in benzene at room temperature. The framework structure of ZIF-11 was unchanged after 7 days.
Figure 30:
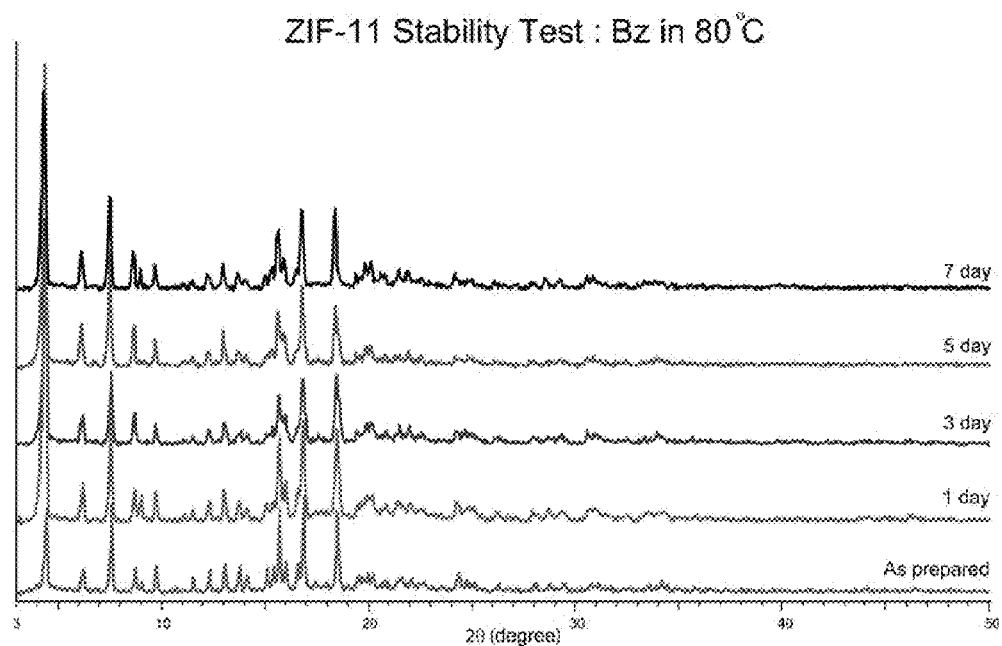
FIG. 30 shows PXRD patterns of ZIF-11 collected during stability test in refluxing benzene. The framework structure of ZIF-11 was unchanged after 7 days.
Figure 31:
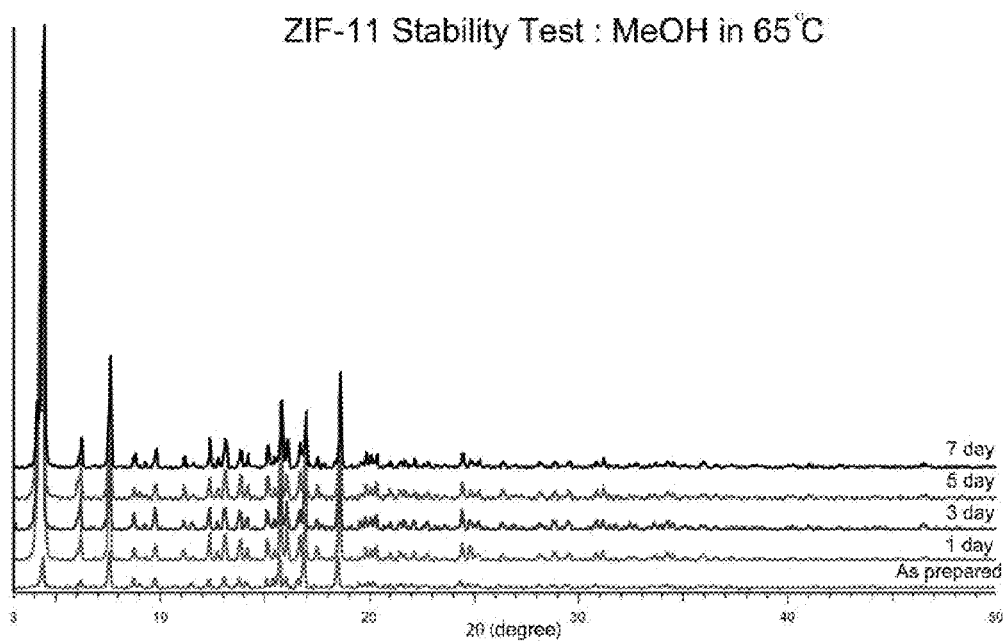
FIG. 31 shows PXRD patterns of ZIF-11 collected during stability test in refluxing methanol. The framework structure of ZIF-11 was unchanged after 7 days.
Figure 32:
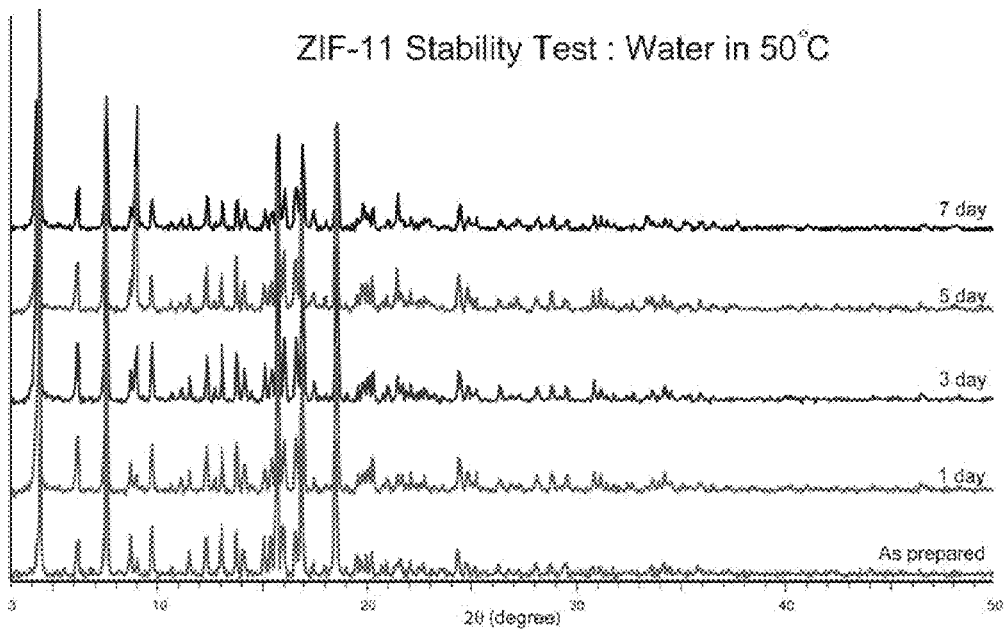
FIG. 32 shows PXRD patterns of ZIF-11 collected during stability test in water at 50° C. The framework structure of ZIF-11 was unchanged after 7 days.
Figure 33:
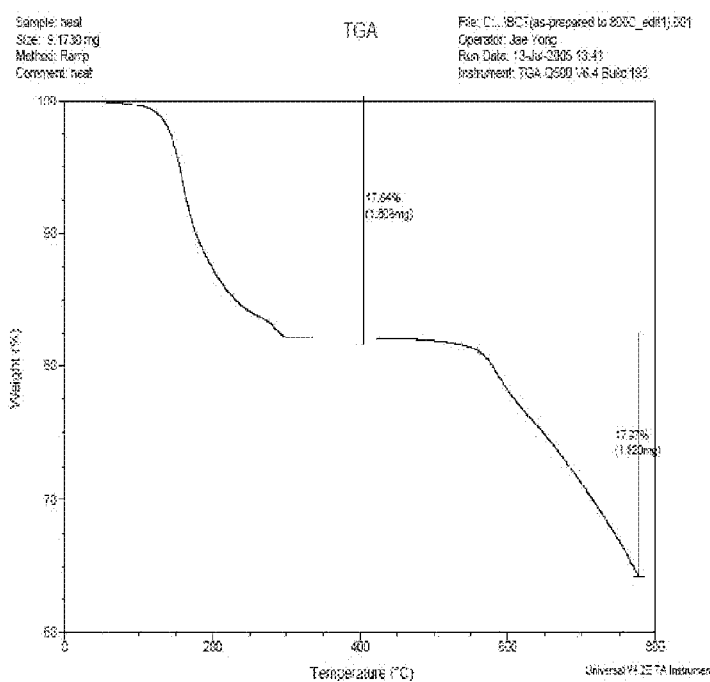
FIG. 33 shows TGA trace of as-synthesized ZIF-1 (crb).
Figure 34:
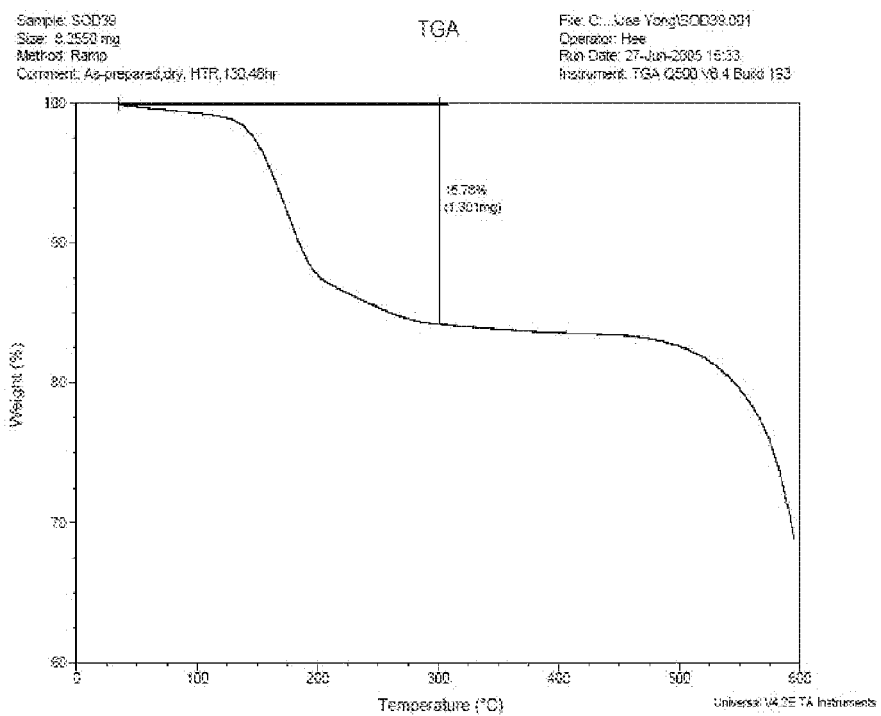
FIG. 34 shows TGA trace of as-synthesized ZIF-7 (sod).

0.257 mL imidazole stock solution (0.150 M, 3.86×10$^{-5}$ mol) and 0.043 mL Zn(NO3)2.4H2O stock solution (0.075 M, 3.23×10$^{-6}$ mol). The product was in the form of large inter-grown blocks, which could be cut into small single crystals under an optical microscope. The FT-IR spectrum of imidazole shows many characteristics of nitrogen-containing heterocycle. For pyrazoles, imidazoles, triazoles and tetrazoles, the C—H stretch absorbs near 3125 cm$^{-1}$. The double bonds on the ring absorb with several bands between 1665-1430 cm$^{-1}$ when the ring system is not substituted so as to allow the formation of tautomers. The NH group absorbs strongly between 3335-2500 cm$^{-1}$, and in many cases is very similar in shape to the OH stretch of the carboxylic acid dimmer. In the imidazoles, this band is accompanied by a weak band near 1820 cm$^{-1}$. As shown in FIG. 4(b), the complete disappearance of the strong and broad NH band between 3350-2500 cm$^{-1}$ and the associated weak band near 1820 cm$^{-1}$ indicates that the imidazole links in ZIF-5 In2Zn3(IM) 12 has been fully deprotonated.

Experimental and Refinement Details for ZIF-6 (GIS).

A colorless block-shaped crystal (0.12×0.10×0.08 mm$^3$) of ZIF-6 was placed in a 0.3 mm diameter borosilicate capillary along with a small amount of mother liquor, which was flame sealed, and mounted on a Bruker SMART APEX CCD diffractometer while being flash frozen to 258(2) K in a liquid N2 cooled stream of nitrogen 8840 reflections of which 1582 were unique and 821 were greater than 4σ(I). The range of θ was from 1.49 to 24.71°. Analysis of the data showed negligible decay during collection. The structure was solved in the monoclinic I41/amd (origin choice No. 2) space group with Z=16 using direct methods. Atoms C4A and C4B were the two components of a disordered carbon atom. The sof of C4A was refined as a free variable to converge at 0.53. Atoms C3A and C3B were two independent carbon atoms in an imidazole ring. This portion of the ring was disordered over two sites related by a two-fold axis. Therefore, the sofs of both C3A and C3B were fixed at 0.50. To treat the diffuse electron density, a protein diffuse scattering correction (SWAT) command was applied. The two variables g and U were refined to converge at 1.1 and 2.9, respectively. All non-hydrogen atoms were refined anisotropically with hydrogen atoms generated as spheres riding the coordinates of their parent atoms. Final full matrix least-squares refinement on $F^2$ converged to R1=0.0642 (F>2σF)) and wR$_2$=0.2394 (all data) with GOF=1.013. All residual electron density in the final F-map was closely associated with the guest molecules within the pore of ZIF-6. Absorption corrections did not improve the quality of the data and was not applied. Crystal data and structure refinement for ZIF-6: Empirical formula, C6H6N4O0.50 Zn; Formula weight, 207.52; Temperature, 258 K; Wavelength, 0.71073 Å; Crystal system, Tetragonal; Space group, I4(1)/amd; Unit cell dimensions, a=18.515 Å, α=90°, b=18.515 Å, β=90°, c=20.245 Å, γ=90°; Volume, 6940.2 Å$^3$, Z, 16; Density (calculated), 0.794 Mg/m$^3$; Absorption coefficient, 1.390 mm−1; F(000), 1664; Crystal size, 0.12×0.10×0.08 mm$^3$; Theta range for data collection, 1.49 to 24.71°. Index ranges −6<=h21, −21<=k<=20, −23<=l<=21 Reflections collected 8840 Independent reflections 1582 [R(int)=0.0826] Completeness to theta=24.71° 99.4% Refinement method Full-matrix least-squares on $F^2$ Data/restraints/parameters 1582/0/58 Goodness-of-fit on $F^2$ 1.013 Final R indices [I>2 sigma(I)] R1=0.0642, wR$_2$=0.2260 R indices (all data) R1=0.1037, wR$_2$=0.2394 Largest diff. peak and hole 0.735 and −0.318 e.E$^{-3}$.

Atomic coordinates (×10$^4$) and equivalent isotropic displacement parameters (Å$^2$×10$^3$) for ZIF-6. U(eq) is defined as one third of the trace of the orthogonalized U$^{ij}$ tensor.

|       | x        | y        | z        | U(eq)   |
|-------|----------|----------|----------|---------|
| C(1)  | 3409(5)  | 5000     | 0        | 70(3)   |
| C(2)  | 3477(6)  | 2500     | 1276(4)  | 75(3)   |
| C(3A) | 2317(9)  | 4963(9)  | 396(8)   | 82(5)   |
| C(3B) | 2316(9)  | 5323(8)  | −183(8)  | 79(4)   |
| C(4A) | 2410(10) | 2869(8)  | 1020(9)  | 95(7)   |
| C(4B) | 2660(13) | 2882(11) | 590(17)  | 144(11) |
| N(1)  | 3019(3)  | 4683(3)  | 470(3)   | 81(2)   |
| N(2)  | 3138(4)  | 3101(3)  | 1127(3)  | 86(2)   |
| Zn(1) | 3365(1)  | 4135(1)  | 1250     | 72(1)   |
| O(1)  | 5000     | 2500     | 2250(20) | 363(18) |

(ZIF-7 sod): Zn(PhIM)2.(H2O)3.

A solid mixture of zinc nitrate tetrahydrate Zn(NO3) 2.4H2O (0.030 g, 1.15×10$^{-4}$ mol) and benzimidazole (H-PhIM) (0.010 g, 8.46×10$^{-5}$ mol) was dissolved in 3 mL DMF in a 4-mL vial. The vial was capped and heated at a rate of 5° C./min to 130° C. in a programmable oven, held at this temperature for 48 h, then cooled at a rate of 0.4° C./min to room temperature. After removal of mother liquor from the mixture, chloroform (3 mL) was added to the vial. Colorless cubic crystals of ZIF-7 were collected from the upper layer, washed with DMF (3 mL×3) and dried in air (10 min) (yield: 0.015 g, 37% based on H-PhIM). Elemental analysis C14H16N4O3Zn=Zn(IM)$_2$.(H2O)$_3$: Calcd. C, 47.54; H, 4.56; N, 15.84. Found. C, 46.95; H, 3.57; N, 16.40. FT-IR: (KBr 4000-400 cm$^{-1}$): 3450 (br), 3063 (w), 2930 (w), 1678 (s), 1622 (w), 1479 (s), 1387 (m), 1306 (m), 1286 (m), 1245 (s), 1209 (w), 1189 (m), 1123 (m), 1097 (m), 1011 (m), 914 (m), 781 (m), 746 (s), 654 (m), 476 (m), 435 (m).

Experimental and Refinement Details for ZIF-7 (SOD).

A colorless prismatic crystal (0.10×0.07×0.05 mm$^3$) of ZIF-7 was placed in a 0.3 mm diameter borosilicate capillary along with a small amount of mother liquor, which was flame sealed, and mounted on a Bruker SMART APEX CCD diffractometer while being flash frozen to 233 K in a liquid N2 cooled stream of nitrogen. A total of 8134 reflections were collected of which 4035 were unique and 1782 were greater than 4σ(I). The range of θ was from 1.65 to 29.55°. Analysis of the data showed negligible decay during collection. The structure was solved in the rhombohedral R-3 space group with Z=18 using direct methods. All non-hydrogen atoms were refined anisotropically with hydrogen atoms generated as spheres riding the coordinates of their parent atoms. Final full matrix least-squares refinement on F$^2$ converged to R1=0.0707 (F>2σF)) and wR$_2$=0.1270 (all data) with GOF=1.038. All residual electron density in the final F-map was closely associated with the guest molecules within the pore of ZIF-7. Crystal data and structure refinement for ZIF-7: Empirical formula, C14H10N4O2.24 Zn; Formula weight, 335.47; Temperature, 258 K; Wavelength, 0.71073 Å; Crystal system, Hexagonal; Space group, R-3; Unit cell dimensions, a=22.989 Å, α=90°, b=22.989 Å, β=90°, c=15.763 Å, γ=120°; Volume, 7214 Å$^3$, Z, 18; Density (calculated), 1.390 Mg/m$^3$; Absorption coefficient, 1.542 mm−1; F(000), 3059; Crystal size, 0.10×0.07×0.05 mm$^3$; Theta range for data collection, 1.65 to 29.55°. Index ranges −28<=h<=26, −26<=k<=14, −21<=l<=17 Reflections collected 8134 Independent reflections 4035 [R(int)=0.0998] Completeness to theta=29.55° 89.8% Absorption correction Semi-empirical from equivalents Max. and min. transmission 0.9269 and 0.8611 Refinement method Full-matrix least-squares on F$^2$ Data/restraints/parameters 4035/0/195 Goodness-of-fit on F$^2$ 1.038 Final R indices [I>2sigma(I)] R1=0.0707, wR$_2$=0.1157 R indices (all data) R1=0.1711, wR$_2$=0.1270 Largest diff. peak and hole 0.623 and −0.549 e.E$^{-3}$.

Atomic coordinates (×10$^4$) and equivalent isotropic displacement parameters (Å$^2$×10$^3$) for ZIF-7. U(eq) is defined as one third of the trace of the orthogonalized U$^{ij}$ tensor.

| | x | y | z | U(eq) |
|---|---|---|---|---|
| C(1) | 6995(3) | 285(3) | 1763(3) | 42(1) |
| C(2) | 6088(3) | −548(3) | 2264(3) | 44(1) |
| C(3) | 5529(3) | −986(3) | 2722(3) | 55(2) |
| C(4) | 5117(3) | −1604(3) | 2370(4) | 72(2) |
| C(5) | 5251(3) | −1785(3) | 1563(4) | 75(2) |
| C(6) | 7393(3) | 282(3) | 4796(3) | 43(1) |
| C(7) | 8013(3) | 480(3) | 4434(4) | 59(2) |
| C(8) | 5345(3) | 596(3) | 3269(3) | 47(1) |
| C(9) | 5903(3) | 1202(3) | 4306(3) | 52(2) |
| C(10) | 6372(3) | 1565(3) | 4966(4) | 72(2) |
| C(11) | 7443(3) | 1972(3) | 2400(3) | 54(2) |
| C(12) | 6905(4) | 1797(3) | 1802(4) | 74(2) |
| C(13) | 6219(4) | 1915(4) | 5529(4) | 94(2) |
| C(14) | 7017(4) | 2271(4) | 1175(4) | 91(2) |
| N(1) | 6589(2) | 113(2) | 2433(2) | 40(1) |
| N(2) | 7480(2) | 1604(2) | 3092(2) | 46(1) |
| N(3) | 6848(2) | 327(2) | 4485(2) | 44(1) |
| N(4) | 5923(2) | 811(2) | 3661(2) | 46(1) |
| O(1S) | 0 | 0 | 6420(20) | 530(50) |
| O(2S) | 8416 | 1646 | 6568 | 75 |
| O(3S) | 6667 | 3333 | 3333 | 169(15) |
| O(4S) | 7832(7) | 1794(8) | 6104(17) | 512(15) |
| O(5S) | 8167(13) | 1389(6) | 7535(12) | 273(14) |
| Zn(1) | 6719(1) | 705(1) | 3416(1) | 40(1) |

(ZIF-8 sod): Zn(MeIM)$_2$.(DMF)(H2O)3.

A solid mixture of zinc nitrate tetrahydrate Zn(NO3) 2.4H2O (0.210 g, 8.03×10$^{-4}$ mol) and 2-methylimidazole (H-MeIM) (0.060 g, 7.31×10$^{-4}$ mol) was dissolved in 18 mL DMF in a 20-mL vial. The vial was capped and heated at a rate of 5° C./min to 140° C. in a programmable oven, held at this temperature for 24 h, then cooled at a rate of 0.4° C./min to room temperature. After removal of mother liquid from the mixture, chloroform (20 mL) was added to the vial. Colorless polyhedral crystals of the product were collected from the upper layer, washed with DMF (10 mL×3) and dried in air (10 min) (yield: 0.032 g, 25% based on H-MeIM). Elemental analysis. C11H23N5O4Zn=Zn(MeIM)$_2$.(DMF).(H2O)3 Calcd. C, 37.25; H, 6.54; N, 19.74. Found. C, 37.69; H, 5.22; N, 19.58. FT-IR: (KBr 4000-400 cm$^{-1}$): 3460 (w), 3134 (w), 2930 (m), 2854 (w), 2767 (w), 2487 (w), 2457 (w), 1693 (s), 1591 (w), 1459 (s), 1428 (s), 1392 (m), 1311 (s), 1265 (w), 1189 (m), 1148 (s), 1091 (m), 1000 (m), 960 (w), 766 (s), 695 (m), 664 (m), 425 (s).

Experimental and Refinement Details for ZIF-8 (SOD-Methyl Derivative).

A colorless block crystal (0.16×0.10×0.10 mm$^3$) of ZIF-8 was placed in a 0.3 mm diameter borosilicate capillary along with a small amount of mother liquor, which was flame sealed, and mounted on a Bruker SMART APEX CCD diffractometer while being flash frozen to 258(2) K in a liquid N2 cooled stream of nitrogen. A total of 27202 reflections were collected of which 1302 were unique and 1009 were greater than 4σ(I). The range of θ was from 2.94 to 29.61°. Analysis of the data showed negligible decay during collection. The structure was solved in the cubic I-43m space group with Z=4 using direct methods. All non-hydrogen atoms were refined anisotropically with hydrogen atoms generated as spheres riding the coordinates of their parent atoms. Final full matrix least-squares refinement on F$^2$ converged to R1=0.0314 (F>2σF)) and wR$_2$=0.0840 (all data) with GOF=0.546. All residual electron density in the final F-map was closely associated with the guest molecules within the pore of ZIF-8. Crystal data and structure refinement for ZIF-8: Empirical formula, C24H30N12O10 Zn3; Formula weight, 842.71; Temperature, 258 K; Wavelength, 0.71073 Å; Crystal system, Cubic; Space group, I-43m; unit cell dimensions, a=16.9910 Å, α=90°; b=16.9910 Å, β=90°, c=16.9910 Å, γ=90°; Volume, 4905.2 Å$^3$, Z, 4; Density (calculated), 1.141 Mg/m$^3$; Absorption coefficient, 1.503 mm$^{-1}$; F(000), 1712; Crystal size, 0.16×0.10×0.10 mm$^3$; Theta range for data collection, 2.94 to 29.61°. Index ranges −23<=h<=23, −23<=k<=23, −23<=l<=23 Reflections collected 27202 Independent reflections 1302 [R(int)=0.0922] Completeness to theta=29.61° 98.9% Refinement method Full-matrix least-squares on F$^2$ Data/restraints/parameters 1302/0/46 Goodness-of-fit on F$^2$ 0.546 Final R indices [I>2sigma(I)] R1=0.0314, wR$_2$=0.0758 R indices (all data) R1=0.0418, wR$_2$=0.0840 Absolute structure parameter −0.01 (2) Largest diff. peak and hole 0.428 and −0.216 e.E$^{-3}$.

Atomic coordinates (×10$^4$) and equivalent isotropic displacement parameters (Å$^2$×10$^3$) for ZIF-8. U(eq) is defined as one third of the trace of the orthogonalized U$^{ij}$ tensor.

| | x | y | z | U(eq) |
|---|---|---|---|---|
| C(1) | 3771(1) | 10079(3) | 6230(1) | 50(1) |
| C(2) | 3685(2) | 8991(2) | 6875(2) | 71(1) |
| C(3) | 4061(2) | 10855(2) | 5939(2) | 73(1) |
| N(1) | 4097(1) | 9683(1) | 6828(1) | 55(1) |
| O(1S) | 3043(13) | 6957(13) | 6957(13) | 315(16) |

|      | x       | y       | z       | U(eq)  |
|------|---------|---------|---------|--------|
| O(2S) | 1845(8) | −410(30) | 8155(8) | 620(40) |
| O(3S) | 1763(17) | 8237(17) | 8237(17) | 480(30) |
| Zn(1) | 5000 | 10000 | 7500 | 50(1) |

(ZIF-9 sod): Co(PhIM)2.(DMF)(H2O).

A solid mixture of cobalt nitrate hexahydrate Co(NO3) 2.6H2O (0.210 g, $7.21 \times 10^{-4}$ mol) and benzimidazole (H-PhIM) (0.060 g, $5.08 \times 10^{-4}$ mol) was dissolved in 18 mL DMF in a 20-mL vial. The vial was capped and heated at a rate of 5° C./min to 130° C. in a programmable oven, held at this temperature for 48 h, then cooled at a rate of 0.4° C./min to room temperature. Purple cubic crystals thus produced were washed with DMF (3 mL×3) and dried in air (10 min) (yield: 0.030 g, 30% based on H-PhIM). Elemental analysis C17H19N5O2Co=Co(PhIM)2.(DMF)(H2O) Calcd. C, 53.13; H, 4.98; N, 18.22. Found. C, 52.82; H, 4.25; N, 18.23. FT-IR: (KBr 4000-400 $cm^{-1}$): 3442 (br), 3071 (w), 2926 (w), 1678 (s), 1612 (w), 1467 (s), 1387 (w), 1302 (w), 1287 (m), 1242 (s), 1206 (w), 1186 (w), 1126 (w), 1096 (w), 1011 (w), 916 (w), 780 (w), 750 (s), 660 (w), 600 (br), 560 (w), 475 (w).

Experimental and Refinement Details for ZIF-9 (SOD-Cobalt Form).

A purple cubic crystal ($0.17 \times 0.17 \times 0.17$ mm$^3$) of ZIF-9 was placed in a 0.3 mm diameter borosilicate capillary along with a small amount of mother liquor, which was flame sealed, and mounted on a Bruker SMART APEX CCD diffractometer while being flash frozen to 233(2) K in a liquid N2 cooled stream of nitrogen. A total of 24864 reflections were collected of which 3953 were unique and 2221 were greater than 4σ(I). The range of θ was from 2.42 to 28.35°. Analysis of the data showed negligible decay during collection. The structure was solved in the rhombohedral R-3 space group with Z=18 using direct methods. All non-hydrogen atoms were refined anisotropically with hydrogen atoms generated as spheres riding the coordinates of their parent atoms. Final full matrix least-squares refinement on F$^2$ converged to R1=0.0979 (F>2σF)) and wR$_2$=0.2784 (all data) with GOF=1.032. All residual electron density in the final F-map was closely associated with the guest molecules within the pore of ZIF-9. Crystal data and structure refinement for ZIF-9: Empirical formula, C14H10 N4 O2.24 Co; Formula weight, 251.89; Temperature, 258 K; Wavelength, 0.71073 Å; Crystal system, Hexagonal; Space group, R-3; Unit cell dimensions, a=22.9437 Å, α=90°, b=22.9437 Å, β=90°, c=15.747 Å, γ=120°; Volume, 7178.8 Å$^3$, Z, 18; Density (calculated), 1.398 Mg/m$^3$; Absorption coefficient, 1.089 mm$^{-1}$; F(000), 3066; Crystal size, $0.17 \times 0.17 \times 0.17$ mm$^3$; Theta range for data collection, 2.42 to 28.35°. Index ranges −30<=h<=4, −16<=k<=25, −20<=l<=21 Reflections collected 24864 Independent reflections 3953 [R(int)=0.1010] Completeness to theta=28.35° 99.1% Max. and min. transmission 0.8365 and 0.8365 Refinement method Full-matrix least-squares on F$^2$ Data/restraints/parameters 3953/0/198 Goodness-of-fit on F$^2$ 1.032 Final R indices [I>sigma(I)] R1=0.0979, wR$_2$=0.2321 R indices (all data) R1=0.1700, wR$_2$=0.2784 Largest diff. peak and hole 0.726 and −0.727 e.E$^{-3}$.

Atomic coordinates ($\times 10^4$) and equivalent isotropic displacement parameters (Å$^2 \times 10^3$) for ZIF-9. U(eq) is defined as one third of the trace of the orthogonalized U$^{ij}$ tensor.

|       | x        | y        | z        | U(eq)  |
|-------|----------|----------|----------|--------|
| C(1)  | 3294(4)  | 288(4)   | 1756(4)  | 44(2)  |
| C(2)  | 3367(3)  | −544(3)  | 2234(5)  | 45(2)  |
| C(3)  | 3476(4)  | −994(3)  | 2714(5)  | 53(2)  |
| C(4)  | 3270(5)  | −1606(4) | 2345(7)  | 69(2)  |
| C(5)  | 3926(4)  | 2006(4)  | 3394(4)  | 45(2)  |
| C(6)  | 4522(4)  | 1957(4)  | 2377(5)  | 47(2)  |
| C(7)  | 4870(4)  | 1794(4)  | 1800(5)  | 61(2)  |
| C(8)  | 5228(6)  | 2258(5)  | 1181(7)  | 82(3)  |
| C(9)  | 5291(4)  | 1191(4)  | 4339(4)  | 48(2)  |
| C(10) | 5183(5)  | 1554(5)  | 4965(6)  | 70(3)  |
| C(11) | 5696(6)  | 1893(6)  | 5538(7)  | 90(3)  |
| C(12) | 2903(4)  | 293(3)   | 4787(5)  | 44(2)  |
| C(13) | 2481(4)  | 496(4)   | 4439(6)  | 57(2)  |
| C(14) | 1923(4)  | 381(5)   | 4897(7)  | 69(2)  |
| Co(1) | 3988(1)  | 701(1)   | 3408(1)  | 39(1)  |
| N(1)  | 3526(3)  | 112(3)   | 2427(4)  | 43(1)  |
| N(2)  | 4124(3)  | 1597(3)  | 3063(4)  | 47(1)  |
| N(3)  | 4880(3)  | 796(3)   | 3668(4)  | 46(1)  |
| N(4)  | 3487(3)  | 329(3)   | 4482(3)  | 42(1)  |
| O(1)  | 1667     | 8333     | 3333     | 90(3)  |
| O(2)  | 1775(15) | 7817(13) | 3890(40) | 480(30) |
| O(3)  | 1965(9)  | 8550(20) | 4160(30) | 500(30) |
| O(4)  | 6667     | 3333     | 3333     | 260(20) |

(ZIF-10 mer): Zn(IM)$_2$.

A solid mixture of zinc nitrate tetrahydrate Zn(NO3) 2.4H2O (0.010 g, $3.82 \times 10^{-5}$ mol) and imidazole (H-IM) (0.030 g, $4.41 \times 10^{-4}$ mol) was dissolved in 3 mL DMF in a 4-mL vial. The vial was capped and heated for 4 d in an isothermal oven at 85° C. The reaction mixture was then allowed to cool to room temperature naturally. Several block-shape crystals of ZIF-10 formed on the wall and bottom, and were separated by hand and collected for single crystal X-ray structure determination.

Experimental and Refinement Details for ZIF-10 (MER).

A colorless prismatic crystal ($0.20 \times 0.10 \times 0.10$ mm$^3$) of ZIF-10 was placed in a 0.3 mm diameter borosilicate capillary along with a small amount of mother liquor, which was flame sealed, and mounted on a Bruker SMART APEX CCD diffractometer while being flash frozen to 233(2) K in a liquid N2 cooled stream of nitrogen. At total of 66076 reflections were collected of which 3376 were unique and 1771 were greater than 4σ(I). The range of θ was from 1.06 to 26.37°. Analysis of the data showed negligible decay during collection. The structure was solved in the monoclinic I4/mmm space group with Z=32 using direct methods. Atoms C5 and C8 were found to be disordered and with each group modeled as its own independent free variable. All non-hydrogen atoms were refined anisotropically with hydrogen atoms generated as spheres riding the coordinates of their parent atoms. Final full matrix least-squares refinement on F$^2$ converged to R1=0.0636 (F>2σF)) and wR$_2$=0.2457 (all data) with GOF=1.059. All residual electron density in the final F-map was closely associated with the guest molecules within the pore of ZIF-10. Crystal data and structure refinement for ZIF-10: Empirical formula, C6H6N4O0.69 Zn; Formula weight, 210.52; Temperature, 223 K; Wavelength, 0.71073 Å; Crystal system, Tetragonal; Space group, I4/mmm; Unit cell dimensions, a=27.0608(18) Å, α=90°, b=27.0608 Å, β=90°, c=19.406 Å, γ=90°; Volume, 14211 Å$^3$, Z, 32; Density (calculated), 0.787 Mg/m$^3$; Absorption coefficient, 1.359 mm$^{-1}$; F(000), 3376; Crystal size, $0.2 \times 0.1 \times 0.1$ mm$^3$; Theta range for data collection, 1.06 to 26.37°. Index ranges −33<=h<=33, −33<=k<=33, −24<=l<=24 Reflections collected 66076 Independent reflections 3998 [R(int)=0.1371] Completeness to theta=26.37° 99.2% Absorption correction Semi-empirical from equivalents Max. and min. transmission 0.873 and 0.850 Refinement method Full-matrix least-squares on $F^2$ Data/restraints/parameters 3998/0/118 Goodness-of-fit on $F^2$ 1.059 Final R indices [I>2sigma(I)] R1=0.0636, $wR_2$=0.2183 R indices (all data) R1=0.1291, $wR_2$=0.2457 Largest diff. peak and hole 0.557 and −0.501 e.E$^{-3}$.

Atomic coordinates (×10$^4$) and equivalent isotropic displacement parameters (Å$^2$×10$^3$) for ZIF-10. U(eq) is defined as one third of the trace of the orthogonalized U$^{ij}$ tensor.

| | x | y | z | U(eq) |
|---|---|---|---|---|
| C(1) | 3671(3) | 1045(3) | 2279(5) | 109(3) |
| C(2) | 3282(3) | 1718(3) | 2500 | 72(3) |
| C(3) | 1874(2) | 1874(2) | 1477(5) | 64(2) |
| C(4) | 1918(3) | 1576(3) | 2479(4) | 103(3) |
| C(5A) | 2136(10) | 255(8) | 2226(19) | 166(14) |
| C(5B) | 2009(8) | 250(6) | 1709(11) | 103(8) |
| C(8A) | 3158(8) | 1635(10) | 354(8) | 80(7) |
| C(8B) | 3327(10) | 1419(10) | 358(8) | 103(8) |
| C(6) | 2684(4) | 0 | 1521(5) | 76(3) |
| C(7) | 2654(4) | 1075(4) | 0 | 68(3) |
| N(1) | 3242(2) | 1300(2) | 2134(3) | 69(2) |
| N(2) | 2114(2) | 1538(2) | 1832(3) | 67(2) |
| N(3) | 2488(2) | 409(2) | 1668(3) | 81(2) |
| N(4) | 2861(2) | 1233(2) | 571(3) | 68(2) |
| Zn(1) | 2679(1) | 1110(1) | 1546(1) | 61(1) |
| O(1) | 3917(15) | 0 | 0 | 224(18) |
| O(2) | 3924(9) | 0 | 1341(13) | 183(10) |
| O(3) | 5000 | 0 | 2500 | 240(50) |
| O(4) | 3060(20) | 0 | 3800(30) | 200(20) |
| O(5) | 3030(20) | 3030(20) | 0 | 200(30) |
| O(6) | 1270(18) | 1270(18) | 0 | 180(20) |

(ZIF-11 rho) Zn(PhIM)2.(DEF)0.9.

A solid mixture of zinc nitrate tetrahydrate Zn(NO3) 2.4H2O (0.60 g, 2.3×10$^{-3}$ mol) and benzimidazole (H-PhIM) (4.2 g, 3.5×10$^{-2}$ mol) was dissolved in 360 mL DEF in a 500-mL wide-mouth glass jar. The capped jar was heated for 4 d in an isothermal oven at 100° C. The jar was then removed from the oven, and allowed to cool to room temperature naturally. Cubic colorless crystals formed on the walls of the jar along with a crystalline powder at the bottom. Although the powder and crystals were proven to be the same phase by powder X-ray diffraction, only the crystals on the wall were used for bulk characterizations. The powder and mother liquor was removed by repeating the cycle of decanting, washing with DMF and sonicating several times. Colorless crystals of ZIF-11 were collected by filtration, washed with DMF (200 mL×2) and dried in the air (30 min) (yield: 0.21 g, 23% based on Zn(NO3)2.4H2O). Elemental analysis C18H21N5O1Zn1=Zn(PhIM)2.(DEF)0.9 Calcd. C, 56.94; H, 5.10; N, 17.59. Found: C, 55.69; H, 4.64; N, 17.58. FT-1R (KBr, 4000-400 cm$^{-1}$): 3452 (br), 3091 (w), 3056 (w), 2981 (w), 2941 (w), 2876 (w), 2781 (w), 2525 (w), 1939 (w), 1903 (w), 1783 (w), 1668 (s), 1618 (m), 1467 (s), 1397 (w), 1367 (w), 1307 (m), 1282 (m), 1247 (m), 1212 (w), 1187 (m), 1121 (m), 1001 (m), 911 (m), 826 (w), 771 (m), 751 (s), 645 (m), 553 (m), 520 (w), 475 (m).

Experimental and Refinement Details for ZIF-11 (RHO).

A colorless cubic crystal (0.08×0.08×0.08 mm$^3$) of ZIF-11 was placed in a 0.3 mm diameter borosilicate capillary along with a small amount of mother liquor, which was flame sealed, and mounted on a Bruker SMART APEX CCD diffractometer while being flash frozen to 233(2) K in a liquid N2 cooled stream of nitrogen. A total of 119088 reflections were collected of which 2415 were unique and 1300 were greater than 4σ(I). The range of θ was from 0.71 to 20.81°. Analysis of the data showed negligible decay during collection. The structure was solved in the cubic Pm-3m space group with Z=12 using direct methods. Atoms C7, C8, C12, C13, C14, and C16 were found to be disordered and with each group modeled as its own independent free variable. All non-hydrogen atoms were refined anisotropically with hydrogen atoms generated as spheres riding the coordinates of their parent atoms. To treat the diffuse electron density, a protein diffuse scattering correction (SWAT) command was applied. The two variables g and U were refined to converge at 1.1 and 3.6, respectively. Final full matrix least-squares refinement on $F^2$ converged to R1=0.0778 (F>2σF)) and $wR_2$=0.2382 (all data) with GOF=1.006. All residual electron density in the final F-map was closely associated with the guest molecules within the pore of ZIF-11. Crystal data and structure refinement for ZIF-11: Empirical formula, C56H40N16 O3.77 Zn4; Formula weight, 1258.84; Temperature, 258 K; Wavelength, 0.71073 Å; Crystal system, Cubic; Space group, Pm-3m; Unit cell dimensions, a=28.7595 Å, α=90°, b=28.7595 Å, β=90°, c=28.7595 Å, γ=90'; Volume, 23787.2 Å$^3$; Z, 12; Density (calculated), 1.055 Mg/m$^3$; Absorption coefficient, 1.238 mm$^{-1}$; F(000), 7658; Crystal size, 0.08× 0.08×0.08 mm$^3$; Theta range for data collection, 0.71 to 20.81°. Index ranges −28<=h<=28, −28<=k<=28, −28<=l<=28 Reflections collected 119088 Independent reflections 2415 [R(int)=0.1688] Completeness to theta=20.81° 96.8% Max. and min. transmission 0.9074 and 0.9074 Refinement method Full-matrix least-squares on $F^2$ Data/restraints/parameters 2415/3/195 Goodness-of-fit on $F^2$ 1.056 Final R indices [I>2sigma(I)] R1=0.0787, $wR_2$=0.2246 R indices (all data) R1=0.1322, $wR_2$=0.2498 Largest duff. peak and hole 0.579 and −0.395 e.E$^{-3}$.

Atomic coordinates (×10$^4$) and equivalent isotropic displacement parameters (Å$^2$×10$^3$) for ZIF-11. U(eq) is defined as one third of the trace of the orthogonalized U$^{ij}$ tensor.

| | x | y | z | U(eq) |
|---|---|---|---|---|
| Zn(1) | 3962(1) | 1043(1) | 2520(1) | 95(1) |
| C(1) | 3950(4) | 0 | 2560(4) | 94(4) |
| C(2) | 3356(3) | 256(3) | 2215(3) | 96(3) |
| C(3) | 2991(4) | 500(4) | 1998(4) | 144(4) |
| C(4) | 2652(5) | 247(5) | 1803(6) | 235(9) |
| C(5) | 3908(4) | 1793(3) | 1793(3) | 98(4) |
| C(6A) | 4230(8) | 1201(7) | 1563(8) | 73(7) |
| C(7A) | 4423(7) | 744(6) | 1466(6) | 65(6) |
| C(8A) | 4611(6) | 703(6) | 1038(6) | 91(8) |
| C(6B) | 4071(8) | 1096(7) | 1447(7) | 104(8) |
| C(7B) | 4120(7) | 632(7) | 1331(7) | 102(7) |
| C(8B) | 4150(7) | 533(6) | 867(6) | 122(8) |
| C(9) | 3189(3) | 1113(5) | 3189(3) | 89(4) |
| C(10) | 3554(4) | 1738(4) | 3197(3) | 116(3) |
| C(11) | 3825(5) | 2137(5) | 3139(5) | 161(5) |
| C(12A) | 3877(15) | 2389(18) | 3503(16) | 122(19) |
| C(12B) | 3723(14) | 2564(16) | 3374(11) | 145(14) |
| C(13A) | 4747(8) | 1015(10) | 3231(4) | 64(8) |
| C(14A) | 4499(7) | 957(8) | 3647(7) | 59(7) |
| C(16A) | 4762(8) | 913(9) | 4054(9) | 96(11) |
| C(13B) | 4770(5) | 808(7) | 3169(5) | 111(7) |
| C(14B) | 4501(6) | 584(7) | 3529(6) | 134(7) |
| O(16B) | 4769(5) | 334(6) | 3857(6) | 147(8) |
| C(15) | 5000 | 1106(5) | 2533(5) | 102(4) |
| N(1) | 3751(3) | 394(3) | 2440(3) | 92(2) |
| N(2) | 3992(2) | 1358(3) | 1906(3) | 96(2) |
| N(3) | 3529(3) | 1312(3) | 2975(3) | 95(2) |
| N(4) | 4607(2) | 1022(3) | 2768(3) | 99(2) |
| O(1S) | 5000 | 2563(19) | 2563(19) | 210(20) |
| O(2S) | 4320(40) | 4320(40) | 4320(40) | 220(80) |
| O(3S) | 5000 | 2329(14) | 2329(14) | 174(18) |
| O(4S) | 5000 | 2630(30) | 3960(30) | 200(40) |
| O(5S) | 2090(30) | 535(19) | 535(19) | 200(30) |
| O(6S) | 2351(18) | 2351(18) | 2351(18) | 110(20) |

-continued

| | x | y | z | U(eq) |
|---|---|---|---|---|
| O(7S) | 1550(40) | 1550(40) | 1550(40) | 140(60) |
| O(8S) | 5000 | 2592(7) | 3028(8) | 309(11) |

(ZIF-12 rho):Co(PhIM)2.

A solid mixture of cobalt nitrate hexahydrate Co(NO3)2.6H2O (0.010 g, 3.44×10$^{-5}$ mol) and benzimidazole (H-PhIM) (0.030 g, 2.54×10$^{-5}$ mol) was dissolved in 3 mL DEF in a 4-mL vial. The capped vial was heated for 2 d in an isothermal oven at 130° C. The reaction mixture was then allowed to cool to room temperature naturally. Several cubic crystals of ZIF-12 formed at the bottom and on the wall of the vial, and they were collected for single crystal X-ray structure determination.

ZIF-2 and ZIF-6 were discovered by combinatorial experimentation utilizing a 96-well glass plate (Zinsser, maximum 0.300 mL reaction mixture per well) as reaction vessel. A 0.150 M solution of imidazole in DMF and a 0.075M solution of Zn(NO3)2.4H2O in DMF were used as stock solutions. After the 96-well glass plate was loaded with mixtures of stock solutions dispensed by a programmed liquid handler (Gilson, model 215), it was covered with a PTFE sheet, sealed by fastening the sheet with a metal clamp, then heated in a 85° C. isothermal oven for 3 days. After reaction, the products were examined under an optical microscope and characterized by single-crystal X-ray diffraction.

Experimental and Refinement Details for ZIF-12(RHO-Cobalt Form).

A purple cubic crystal (0.08×0.08×0.08 mm$^3$) of ZIF-12 was placed in a 0.3 mm diameter borosilicate capillary along with a small amount of mother liquor, which was flame sealed, and mounted on a Bruker SMART APEX CCD diffractometer while being flash frozen to 233(2) K in a liquid N2 cooled stream of nitrogen. A total of 21631 reflections were collected of which 1204 were unique and 398 were greater than 4σ(I). The range of θ was from 0.71 to 15.94°. Analysis of the data showed negligible decay during collection, however the amount of reliable data which could be collected was very limited due to the small crystal size of this sample and its lowered crystallinity. The structure was solved in the cubic Pm-3m space group with Z=12 using direct methods. Atoms C7, C8, C13, C14, and C16 were found to be disordered and with each group modeled as its own independent free variable. All non-hydrogen (except Co) and hydrogen atoms were refined isotropically with hydrogen atoms generated as spheres riding the coordinates of their parent atoms. Cobalt atoms was refined anisotropically. It should be noted that the precision of this model is low, and is reported to demonstrate that ZIF-12 can be isolated in crystalline form. Other supporting characterization data (vide infra Materials and Methods) also support this conclusion. Final full matrix least-squares refinement on F$^2$ converged to R1=0.1064 (F>2σF)) and wR$_2$=0.23712 (all data) with GOF=1.202. All residual electron density in the final F-map was closely associated with the guest molecules within the pore of ZIF-12. Crystal data and structure refinement for ZIF-12: Empirical formula, C, 13.58; H9.58 Co N4 O0.92; Formula weight, 280.176; Temperature, 258 K; Wavelength, 0.71073 Å; Crystal system, Cubic Space group, Pm-3m; Unit cell dimensions, a=28.7595 Å, α=90°, b=28.7595 Å, β=90°, c=28.7595 Å, γ=90°; Volume, 23787.2 Å$^3$, Z, 12; Density (calculated), 1.014 Mg/m$^3$; Absorption coefficient, 0.864 mm$^{-1}$; F(000), 7366; Crystal size, 0.08×0.08×0.08 mm$^3$; Theta range for data collection, 1.00 to 15.94°. Index ranges −16<=h<=22, −211(<=21, −22<=1<=16 Reflections collected 21631 Independent reflections 1204 [R(int)=0.4632] Completeness to theta=15.94° 99.0% Absorption correction Semi-empirical from equivalents Max. and min. transmission 0.9341 and 0.9341 Refinement method Full-matrix least-squares on F$^2$ Data/restraints/parameters 1204/8/124 Goodness-of-fit on F$^2$ 1.202 Final R indices [I>2sigma(I)] R1=0.1064, wR$_2$=0.3393 R indices (all data) R1=0.2328, wR$_2$=0.3712 Largest diff. peak and hole 0.907 and −0.439 e.E$^{-3}$.

Atomic coordinates (×10$^4$) and equivalent isotropic displacement parameters (Å$^2$×10$^3$) for ZIF-12. U(eq) is defined as one third of the trace of the orthogonalized U$^{ij}$ tensor.

| | x | y | z | U(eq) |
|---|---|---|---|---|
| Co(1) | 3965(2) | 1044(2) | 2515(2) | 65(3) |
| C(1) | 4001(14) | 0 | 2599(16) | 70(20) |
| C(2) | 3359(9) | 232(12) | 2221(13) | 110(20) |
| C(3) | 3090(20) | 535(18) | 2010(20) | 160(20) |
| C(4) | 2663(14) | 290(20) | 1800(20) | 270(40) |
| C(5) | 3930(20) | 1793(15) | 1793(15) | 80(20) |
| C(6A) | 4270(40) | 1180(30) | 1530(30) | 20(30) |
| C(7A) | 4450(40) | 760(30) | 1460(30) | 10(30) |
| C(8A) | 4610(30) | 710(20) | 1030(30) | 40(40) |
| C(6B) | 4020(30) | 1140(30) | 1480(20) | 60(30) |
| C(7B) | 4100(30) | 690(30) | 1390(20) | 70(30) |
| C(8B) | 4140(30) | 540(20) | 880(30) | 140(50) |
| C(9) | 3203(12) | 1090(18) | 3203(12) | 52(19) |
| C(10) | 3554(12) | 1729(11) | 3194(11) | 71(14) |
| C(11) | 3848(13) | 2117(15) | 3144(14) | 78(14) |
| C(12B) | 3747(13) | 2499(16) | 3428(14) | 10(30) |
| C(13A) | 4747 | 1015 | 3231 | 64 |
| C(14A) | 4499 | 957 | 3647 | 59 |
| C(16A) | 4750(20) | 930(30) | 4060(30) | 90(40) |
| C(13B) | 4770(18) | 770(20) | 3140(20) | 50(30) |
| C(14B) | 4530(30) | 580(30) | 3480(30) | 120(40) |
| C(16B) | 4780(20) | 320(20) | 3870(20) | 90(30) |
| C(15) | 5000 | 1065(18) | 2534(18) | 54(18) |
| N(1) | 3767(8) | 385(14) | 2427(10) | 66(10) |
| N(2) | 3986(10) | 1339(10) | 1903(11) | 60(10) |
| N(3) | 3536(9) | 1301(10) | 2972(10) | 57(10) |
| N(4) | 4606(10) | 1006(11) | 2768(4) | 71(11) |
| O(1S) | 5000 | 2480(60) | 2480(60) | 110(100) |
| O(2S) | 5000 | 2340(50) | 2340(50) | 150(100) |
| O(3S) | 5000 | 2100(50) | 4190(50) | 10(50) |
| O(4S) | 2860(80) | 560(60) | 560(60) | 130(100) |
| O(5S) | 1730(60) | 1730(60) | 1730(60) | 70(120) |
| O(6S) | 24900(200) | 24900(200) | 24900(200) | 0(600) |
| O(7S) | 5000 | 2620(20) | 3060(30) | 320(40) |

ZIF-20: Zn(Pur)$_2$.(DMF)$_{0.75}$(H$_2$O)$_{1.5}$.

A solid mixture of zinc nitrate tetrahydrate Zn(NO$_3$)$_2$.4H$_2$O (65 mg, 0.25 mmol, EM Science) and purine (150 mg, 1.25 mmol, Fluka or Sigma) was dissolved in 5 mL DMF (Fisher) in a 20-mL vial to obtain a slightly suspended solution. The vial was tightly capped and heated in a 65° C. isothermal oven for 3 days to yield pale yellow octahedral crystals along with small amount of powder. After cooling the vial to room temperature naturally, the powder product was removed by decanting with mother liquor and DMF (5 mL×3). The crystals were dried in air for 30 min [yield: 48 mg, 50% based on Zn(NO$_3$)$_2$.4H$_2$O]. Elemental analysis: Calcd for Zn(Pur)$_2$.(DMF)$_{0.75}$(H$_2$O)$_{1.5}$: C, 38.17; H, 3.73; N, 31.80. Found C, 37.93; H, 3.52; N, 31.85%. FT-IR (KBr, 4000-400 cm$^{-1}$): 3433 (br), 3098 (w), 3065 (w), 3036 (w), 2930 (w), 2856 (w), 1670 (s), 1589 (s), 1568 (m), 1477 (s), 1398 (s), 1310 (s), 1221 (s), 1192 (m), 1094 (m), 1020 (w), 924 (m), 804 (m), 791 (m), 683 (w), 644 (m), 621 (w), 575 (w), 498 (w), 403 (w).

ZIF-21: Co(Pur)$_2$.(DMF)(H$_2$O).

A solid mixture of cobalt(II) nitrate hexahydrate Co(NO$_3$)$_2$.6H$_2$O (146 mg, 0.502 mmol, Aldrich) and purine (300 mg, 2.50 mmol) were dissolved in DMF (5 mL) in a 20-mL vial. To the solution, 2.0 M dimethylamine solution in MeOH (1.25 mL, 2.50 mmol, Aldrich) was added. The vial was tightly capped and heated in a 85° C. isothermal oven for 24 h to yield purple octrahedral crystals. After cooling the vial to room temperature naturally, the crystals were rinsed with DMF (5 mL×3) and dried in air for 1 h [yield: 92 mg, 47% based on $Co(NO_3)_2 \cdot 6H_2O$]. Elemental analysis: Calcd for $Co(Pur)_2 \cdot (DMF)(H_2O)$: C, 40.22; H, 3.89; N, 32.47. Found C, 40.36; H, 3.93; N, 32.16%. FT-IR (KBr, 4000-400 $cm^{-1}$): 3418 (br), 3086 (w), 2924 (w), 2855 (w), 1665 (s), 1589 (s), 1560 (m), 1468 (s), 1443 (w), 1396 (s), 1308 (s), 1234 (w), 1207 (s), 1188 (s), 1109 (m), 916 (m), 804 (m), 791 (w), 677 (w), 648 (m), 623 (w), 573 (w), 500 (w).

Experimental and Refinement Details for ZIF-20 and -21.

For ZIF-21 all non-hydrogen (except Co) and hydrogen atoms were refined isotropically. Cobalt atoms were refined anisotropically. ZIF-20 can be isolated in crystalline form. Note that the same solvent disorder model was employed for this structure as was for ZIF-20. Crystal data and structure refinement for ZIF-20: Empirical formula C20H12N16O8.88 Zn2; Formula weight 749.20; Temperature 153 K; Wavelength 1.54178 Å; Crystal system, Cubic; Space group, Fm-3m; Unit cell dimensions, a=45.4725 Å, α=90°, b=45.4725 Å, β=90°, c=45.4725 Å, γ=90°; Volume 94025.7 $Å^3$, Z, 96; Density (calculated), 1.270 $Mg/m^3$; absorption coefficient 2.027 $mm^{-1}$; F(000) 36000; Crystal size, 0.20×0.20×0.15 $mm^3$; Theta range for data collection 1.68 to 50.37°. Index ranges −45<=h<=36, −40<=k<=33, −43<=l<=41; Reflections collected 34673; Independent reflections 2446 [R(int)=0.0466]; Completeness to theta=50.37° 99.6%; Absorption correction Semi-empirical from equivalents; Max. and min. transmission 0.742 and 0.706; Refinement method Full-matrix least-squares on $F^2$; Data/restraints/parameters: 2446/0/184; Goodness-of-fit on $F^2$ 1.467; Final R indices [I>2sigma(I)] R1=0.0871, $wR_2$=0.3160; R indices (all data) R1=0.0949, $wR_2$=0.3261; Largest duff. peak and hole 1.717 and −0.805 $e.Å^{-3}$ Atomic coordinates ($\times 10^4$) and equivalent isotropic displacement parameters ($Å^2 \times 10^3$) for ZIF-20. U(eq) is defined as one third of the trace of the orthogonalized $U^{ij}$ tensor.

| | x | y | z | U(eq) |
|---|---|---|---|---|
| C(1) | 2971(1) | 2029(1) | 689(2) | 57(2) |
| C(2) | 2988(1) | 2229(1) | 1108(2) | 58(2) |
| C(3) | 3046(2) | 2392(2) | 1348(2) | 100(4) |
| N(5) | 2875(2) | 2328(3) | 1581(2) | 147(5) |
| N(6) | 3046(2) | 2392(2) | 1348(2) | 100(4) |
| C(4) | 2875(2) | 2328(3) | 1581(2) | 147(5) |
| C(5) | 3379(2) | 2484(2) | 0 | 49(3) |
| C(6) | 3606(2) | 2105(2) | 151(1) | 71(2) |
| C(7) | 3734(2) | 1890(2) | 310(2) | 131(5) |
| N(7) | 3852(3) | 1675(2) | 140(2) | 220(8) |
| N(8) | 3734(2) | 1890(2) | 310(2) | 131(5) |
| C(8) | 3852(3) | 1675(2) | 140(2) | 220(8) |
| C(9) | 3873(2) | 2454(2) | 1127(2) | 53(2) |
| C(10) | 4072(1) | 2564(2) | 715(2) | 56(2) |
| C(11) | 4130(2) | 2642(2) | 430(1) | 86(3) |
| N(9) | 4420(2) | 2710(2) | 378(1) | 101(3) |
| N(10) | 4130(2) | 2642(2) | 430(1) | 86(3) |
| C(12) | 4420(2) | 2710(2) | 378(1) | 101(3) |
| C(13) | 2962(1) | 2962(1) | 640(2) | 46(2) |
| C(14) | 3380(1) | 3167(1) | 695(1) | 65(3) |
| C(15) | 3673(2) | 3232(2) | 729(2) | 94(3) |
| N(11) | 3726(2) | 3522(2) | 754(2) | 107(4) |
| N(12) | 3673(2) | 3232(2) | 729(2) | 94(3) |
| C(16) | 3726(2) | 3522(2) | 754(2) | 107(4) |
| N(1) | 3118(1) | 2234(1) | 838(1) | 54(2) |
| N(2) | 3459(1) | 2348(1) | 249(1) | 57(1) |
| N(3) | 3806(1) | 2491(1) | 843(1) | 56(2) |
| N(4) | 3248(1) | 2894(1) | 657(1) | 55(1) |
| O(1) | 3197 | 3197 | 0 | 80 |
| O(2) | 2500 | 2500 | 2500 | 144 |
| O(3) | 3335 | 3335 | 1665 | 146 |
| O(4) | 3246 | 3839 | 0 | 223 |
| O(5) | 3565 | 3565 | 0 | 251 |
| O(6) | 2500 | 2500 | 244 | 248 |
| O(7) | 2500 | 2500 | 737 | 500 |
| O(8) | 0 | 5000 | 0 | 407 |
| O(9) | 5000 | 3279 | 0 | 335 |
| O(10) | 4294 | 4294 | 706 | 486 |
| O(11) | 2500 | 2500 | 0 | 591 |
| O(12) | 3758 | 3758 | 0 | 367 |
| O(13) | 2860 | 3762 | 0 | 905 |
| O(14) | 1923 | 3077 | 0 | 982 |
| O(15) | 2973 | 3495 | 1505 | 238 |
| O(17) | 5000 | 3464 | 0 | 1011 |
| O(18) | 2855 | 2855 | 2145 | 874 |
| O(19) | 3387 | 1613 | 1613 | 257 |
| O(20) | 3340 | 3471 | 0 | 312 |
| Zn(1) | 3417(1) | 2495(1) | 656(1) | 54(1) |

Crystal data and structure refinement for ZIF-21: Empirical formula, C20H12 Co2 N16 O8.88; Formula weight 736.32; Temperature, 153 K; Wavelength, 1.54178 Å; Crystal system, Cubic; Space group, Fm-3m; Unit cell dimensions a=45.4725 Å, α=90°, b=45.4725 Å, β=90°, c=45.4725 Å, γ=90°; Volume, 94025.7 $Å^3$, Z, 96; Density (calculated), 1.248 $Mg/m^3$; Absorption coefficient 7.154 $mm^{-1}$; F(000), 35424; Crystal size, 0.20×0.10×0.10 $mm^3$; Theta range for data collection, 1.68 to 30.87°; Index ranges, −30<=h<=29, −30<=k<=30, −29<=l<=30; Reflections collected 47463; Independent reflections, 794 [R(int)=0.0818]; Completeness to theta=30.87°, 100.0%; Absorption correction, Semi-empirical from equivalents; Refinement method, Full-matrix least-squares on $F^2$; Data/restraints/parameters, 794/1/91; Goodness-of-fit on $F^2$ 2.636; Final R indices, [I>2sigma(I)] R1=0.1386, $wR_2$=0.4752; R indices (all data) R1=0.1423, $wR_2$=0.4838; Largest diff. peak and hole 0.663 and −0.788 $e.Å^{-3}$ Atomic coordinates ($\times 10^4$) and equivalent isotropic displacement parameters ($Å^2 \times 10^3$) for ZIF-21. U(eq) is defined as one third of the trace of the orthogonalized $U^{ij}$ tensor.

| | x | y | z | U(eq) |
|---|---|---|---|---|
| C(1) | 2980(2) | 2020(2) | 687(2) | 48(4) |
| C(2) | 2987(1) | 2227(2) | 1108(2) | 42(3) |
| C(3) | 3048(2) | 2389(2) | 1352(2) | 70(3) |
| N(5) | 2866(2) | 2335(2) | 1582(2) | 141(4) |
| N(6) | 3048(2) | 2389(2) | 1352(2) | 70(3) |
| C(4) | 2866(2) | 2335(2) | 1582(2) | 141(4) |
| C(5) | 3376(3) | 2487(2) | 0 | 38(4) |
| C(6) | 3605(2) | 2095(2) | 153(2) | 63(3) |
| C(7) | 3728(2) | 1877(2) | 311(2) | 104(4) |
| N(7) | 3865(2) | 1678(2) | 143(2) | 178(5) |
| N(8) | 3728(2) | 1877(2) | 311(2) | 104(4) |
| C(8) | 3865(2) | 1678(2) | 143(2) | 178(5) |
| C(9) | 3880(2) | 2453(2) | 1120(2) | 49(5) |
| C(10) | 4073(2) | 2561(2) | 718(2) | 49(4) |
| C(11) | 4127(2) | 2652(2) | 437(2) | 90(3) |
| N(9) | 4423(2) | 2721(2) | 379(1) | 66(3) |
| N(10) | 4127(2) | 2652(2) | 437(2) | 90(3) |
| C(12) | 4423(2) | 2721(2) | 379(1) | 66(3) |
| C(13) | 2965(1) | 2965(1) | 633(2) | 50 |
| C(14) | 3380(1) | 3170(1) | 698(1) | 60(3) |
| C(15) | 3676(2) | 3226(2) | 727(2) | 63(3) |

-continued

| | x | y | z | U(eq) |
|---|---|---|---|---|
| N(11) | 3725(2) | 3523(2) | 760(2) | 119(4) |
| N(12) | 3676(2) | 3226(2) | 727(2) | 63(3) |
| C(16) | 3725(2) | 3523(2) | 760(2) | 119(4) |
| N(1) | 3122(1) | 2232(1) | 835(1) | 40(2) |
| N(2) | 3458(1) | 2349(2) | 253(1) | 44(2) |
| N(3) | 3810(2) | 2493(1) | 837(2) | 43(3) |
| N(4) | 3247(1) | 2894(1) | 661(1) | 51(2) |
| O(1) | 3197 | 3197 | 0 | 80 |
| O(2) | 2500 | 2500 | 2500 | 144 |
| O(3) | 3335 | 3335 | 1665 | 146 |
| O(4) | 3246 | 3839 | 0 | 223 |
| O(5) | 3565 | 3565 | 0 | 251 |
| O(6) | 2500 | 2500 | 244 | 248 |
| O(7) | 2500 | 2500 | 737 | 2000 |
| O(8) | 0 | 5000 | 0 | 407 |
| O(9) | 5000 | 3279 | 0 | 335 |
| O(10) | 4294 | 4294 | 706 | 486 |
| O(11) | 2500 | 2500 | 0 | 591 |
| O(12) | 3758 | 3758 | 0 | 367 |
| O(13) | 2860 | 3762 | 0 | 905 |
| O(14) | 1923 | 3077 | 0 | 982 |
| O(15) | 2973 | 3495 | 1505 | 238 |
| O(17) | 5000 | 3464 | 0 | 1011 |
| O(18) | 2855 | 2855 | 2145 | 874 |
| O(19) | 3387 | 1613 | 1613 | 257 |
| O(20) | 3340 | 3471 | 0 | 312 |
| Co(1) | 3416(1) | 2494(1) | 656(1) | 48(1) |

ZIF-22: Zn(5-Azabenzimidazolato)$_2$·(DMF)$_{0.75}$(H$_2$O)$_2$.

A solid mixture of zinc nitrate tetrahydrate Zn(NO$_3$)$_2$·4H$_2$O (52 mg, 0.20 mmol) and 5-azabenzimidazole (238 mg, 2.00 mmol, Aldrich) was dissolved in 2 mL DMF in a 4-mL vial to obtain a white precipitate. The vial was tightly capped and heated in a 150° C. isothermal oven for 3 days to yield pale yellow octahedral crystals along with small amount of powder. After cooling the vial to room temperature naturally, the powder product was removed by decanting with mother liquor and DMF (4 mL×3). The crystals were dried in air for 30 min [yield: 68 mg, 87% based on Zn(NO$_3$)$_2$·4H$_2$O]. Elemental analysis: Calcd for Zn(5-Azabenzimidazolato)$_2$·(DMF)$_{0.75}$(H$_2$O)$_2$: C, 43.61; H, 4.43; N, 24.09. Found C, 43.74; H, 4.33; N, 24.24%. FT-IR (KBr, 4000-400 cm$^{-1}$): 3422 (br), 3067 (br), 2930 (w), 2858 (w), 1672 (s), 1601 (s), 1572 (w), 1468 (s), 1439 (m), 1408 (w), 1385 (s), 1342 (w), 1313 (s), 1285 (m), 1234 (s), 1205 (w), 1186 (m), 1173 (w), 1096 (m), 1063 (w), 1038 (w), 1016 (m), 991 (w). 918 (s), 816 (m), 793 (m), 660 (m), 644 (m), 613 (m), 565 (w), 467 (w), 420 (w).

Experimental and Refinement Details for ZIF-22.

Crystal data and structure refinement for ZIF-22: Empirical formula, C24H16N12O8.33 Zn2; Formula weight, 736.56; Temperature, 293 K; Wavelength, 1.54178 Å; Crystal system, Cubic; Space group, Fm-3m; Unit cell dimensions, a=45.6001 Å, α=90°, b=45.6001 Å, β=90°, c=45.6001 Å, γ=90°; Volume, 94819.4 Å$^3$, Z, 96; Density (calculated), 1.238 Mg/m$^3$; Absorption coefficient, 1.960 mm$^{-3}$; F(000), 35584; Crystal size, 0.16×014×013 mm$^3$; Theta range for data collection, 1.68 to 50.44°; Index ranges, −45 h<=45, −40<=k<=45, −45<=l<=43; Reflections collected, 101868; Independent reflections, 2456 [R(int)=0.1384]; Completeness to theta=50.44° 99.1%; Refinement method, Full-matrix least-squares on F$^2$; Data/restraints/parameters, 2456/0/213; Goodness-of-fit on F$^2$ 1.355; Final R indices [I>2sigma(I)] R1=0.1087, wR$_2$=0.3634; R indices (all data) R1=0.1402, wR$_2$=0.4071; Largest diff. peak and hole 2.663 and −0.835 e.Å$^{-3}$.

Atomic coordinates (×10$^4$) and equivalent isotropic displacement parameters (Å$^2$×10$^3$) for ZIF-22. U(eq) is defined as one third of the trace of the orthogonalized U$^{ij}$ tensor.

| | x | y | z | U(eq) |
|---|---|---|---|---|
| C(1) | 2030(2) | 2030(2) | 687(3) | 67(4) |
| C(2) | 2238(2) | 2019(2) | 1104(2) | 59(3) |
| C(3) | 2395(3) | 1968(3) | 1347(3) | 92(4) |
| C(4) | 2353(3) | 2128(3) | 1585(3) | 117(4) |
| N(5) | 2353(3) | 2128(3) | 1585(3) | 117(4) |
| C(5) | 2483(3) | 1625(3) | 0 | 60(4) |
| C(6) | 2109(3) | 1386(2) | 153(2) | 78(3) |
| C(7) | 1880(3) | 1246(3) | 282(4) | 123(5) |
| C(8) | 1664(3) | 1139(4) | 139(3) | 167(8) |
| N(6) | 1664(3) | 1139(4) | 139(3) | 167(8) |
| C(9) | 2969(2) | 2031(2) | 656(3) | 60(4) |
| C(10) | 3173(2) | 1614(2) | 679(2) | 75(3) |
| C(11) | 3246(3) | 1331(3) | 708(3) | 116(5) |
| C(12) | 3529(3) | 1249(3) | 728(3) | 128(5) |
| N(7) | 3529(3) | 1249(3) | 728(3) | 128(5) |
| C(13) | 2447(3) | 1123(2) | 1123(2) | 63(4) |
| C(14) | 2547(2) | 928(2) | 718(2) | 69(3) |
| C(15) | 2610(3) | 851(3) | 431(2) | 102(4) |
| C(16) | 2679(3) | 584(3) | 364(2) | 114(4) |
| N(8) | 2679(3) | 584(3) | 364(2) | 114(4) |
| N(1) | 2237(2) | 1891(2) | 830(2) | 71(3) |
| N(2) | 2348(2) | 1537(2) | 248(2) | 67(2) |
| N(3) | 2898(2) | 1747(2) | 663(2) | 66(2) |
| N(4) | 2476(2) | 1193(2) | 847(2) | 65(3) |
| O(1) | 1474(7) | 1474(7) | 1474(7) | 270(20) |
| O(2) | 2500 | 2500 | 366(11) | 243(18) |
| O(5) | 1871(8) | 3129(8) | 1871(8) | 290(20) |
| O(6) | 3487(8) | 1513(8) | 0 | 275(17) |
| O(9) | 3237(6) | 1763(6) | 0 | 208(11) |
| O(10) | 1662(4) | 3338(4) | 1662(4) | 130(8) |
| O(11) | 2500 | 2500 | 0 | 320(40) |
| O(12) | 3773(7) | 1797(8) | 0 | 328(16) |
| O(13) | 1657(6) | 1657(6) | 1657(6) | 206(14) |
| O(14) | 3665(8) | 1098(9) | 0 | 410(20) |
| O(15) | 3430(20) | 0 | 0 | 460(50) |
| O(16) | 1915(12) | 3085(12) | 2318(18) | 640(50) |
| O(17) | 2044(8) | 3546(5) | 1454(5) | 330(16) |
| O(18) | 2960(30) | 2040(30) | 0 | 830(140) |
| O(21) | 2754(15) | 2246(15) | 0 | 420(30) |
| Zn(1) | 2498(1) | 1588(1) | 655(1) | 66(1) |

ZIF-23: Zn(4-Azabenzimidazolato)$_2$·(H$_2$O)$_{0.25}$.

A solid mixture of zinc nitrate tetrahydrate Zn(NO$_3$)$_2$·4H$_2$O (52 mg, 0.20 mmol) and 4-azabenzimidazole (119 mg, 1.00 mmol, Aldrich) was dissolved in 1 mL DMF in a 4-mL vial. The vial was tightly capped and heated in a 100° C. isothermal oven for 1 day to yield pale yellow prism crystals. After cooling the vial to room temperature naturally, the crystals were rinsed with DMF (5 mL×3) and dried in air for 30 min [yield: 55 mg, 90% based on Zn(NO$_3$)$_2$·4H$_2$O]. The same product was obtained in the reaction at different temperature (65 and 150° C.), at which ZIF-20 and -22 were synthesized, respectively. Reaction with a different ligand/metal ratio (1:10, instead of 1:5) as used in a synthesis of ZIF-21 also gave the same compound. Elemental analysis: Calcd for Zn(4-Azabenzimidazolato)$_2$·(H$_2$O)$_{0.25}$: C, 47.08; H, 2.80; N, 27.45. Found C, 47.00; H, 2.82; N, 27.84%. FT-IR (KBr, 4000-400 cm$^{-1}$): 3439 (br), 3080 (m), 3053 (m), 2937 (w), 1919 (w), 1879 (w), 1850 (w), 1665 (m), 1597 (s), 1574 (w), 1474 (s), 1406 (s), 1395 (w), 1313 (m), 1290 (s), 1263 (w), 1225 (m), 1186 (m), 1117 (w), 1042 (w), 1013 (w), 959 (w), 918 (m), 802 (m), 771 (s), 667 (m), 652 (s), 594 (w), 569 (w), 503 (m), 490 (w).

Experimental and Refinement Details for ZIF-23.

Crystal data and structure refinement for ZIF-23: Empirical formula, C12H8N6 Zn; Formula weight, 301.61; Temperature, 153 K; Wavelength, 1.54178 Å; Crystal system, Orthorhombic; Space group, P212121; Unit cell dimensions, a=9.5477 Å, α=90°, b=10.1461 Å, β=90°, c=12.4459 Å, γ=90°; Volume, 1205.66 Å$^3$, Z, 4; Density (calculated), 1.662 Mg/m$^3$; Absorption coefficient, 2.791 mm$^-$; F(000), 608;

Crystal size, 0.11×0.05×0.03 mm³; Theta range for data collection, 5.63 to 50.41°. Index ranges, −9<=h<=9, −10<=k<=9, −10<=l<=12; Reflections collected, 5183; Independent reflections, 1257 [R(int)=0.0706]; Completeness to theta=50.41° 99.3%; Absorption correction, Semi-empirical from equivalents; Max. and min. transmission, 0.9111 and 0.7470; Refinement method, Full-matrix least-squares on $F^2$; Data/restraints/parameters, 1257/0/172; Goodness-of-fit on $F^2$ 0.783; Final R indices [I>2sigma(I)] R1=0.0242, wR$_2$=0.0618; R indices (all data) R1=0.0271, wR$_2$=0.0640; Absolute structure parameter −0.06(4); Largest diff. peak and hole 0.159 and −0.171e.Å$^{-3}$.

Atomic coordinates (×10$^4$) and equivalent isotropic displacement parameters (Å$^2$×10$^3$) for ZIF-23. U(eq) is defined as one third of the trace of the orthogonalized U$^{ij}$ tensor.

|  | x | y | z | U(eq) |
|---|---|---|---|---|
| C(1) | 1960(5) | 2496(5) | 4975(4) | 24(1) |
| C(2) | 513(5) | 3547(4) | 3990(3) | 23(1) |
| C(3) | −474(7) | 4604(5) | 2605(5) | 53(2) |
| C(4) | 636(8) | 4263(6) | 1933(4) | 54(2) |
| C(5) | −3260(5) | 1489(5) | 7697(3) | 31(1) |
| C(6) | −3324(4) | 1824(4) | 6641(3) | 23(1) |
| C(7) | 70(5) | 802(4) | 7483(4) | 22(1) |
| C(8) | 1532(4) | 1108(4) | 8783(4) | 20(1) |
| C(9) | 2454(5) | 1034(4) | 9622(4) | 27(1) |
| C(10) | 3109(6) | 2218(5) | 9877(5) | 42(2) |
| C(11) | 2823(5) | 3367(6) | 9305(4) | 47(1) |
| C(12) | 1326(5) | 2297(4) | 8238(3) | 23(1) |
| N(1) | 718(4) | 3092(3) | 5020(3) | 23(1) |
| N(2) | −2402(4) | 2502(3) | 5978(3) | 23(1) |
| N(3) | −722(4) | 5152(3) | 6727(2) | 21(1) |
| N(4) | 368(4) | 2097(3) | 7416(3) | 22(1) |
| N(5) | −583(4) | 4254(4) | 3643(3) | 41(1) |
| N(6) | 1912(4) | 3454(4) | 8487(3) | 41(1) |
| Zn(1) | −509(1) | 3268(1) | 6317(1) | 19(1) |

ZIF-35:

A solid mixture of zinc nitrate tetrahydrate Zn(NO$_3$)$_2$.4H$_2$O (78 mg, 0.30 mmol) and 4-cyanoimidazole (284 mg/3.05 mmol) was dissolved in 1 mL N-methylpyrrolidonone (NMP) in a 4-mL vial. The vial was tightly capped and heated in a 100 C isothermal oven for 3 days to yield pale yellow rectangular crystals (yield: 73 mg). Activation of ZIF-35 for gas adsorption measurement and gas separation experiments: the as-synthesized sample of ZIF-35 was immersed in anhydrous methanol in a glove box for 3 days; during the exchange the methanol was refreshed six times. The resulting methanol-exchanged sample of ZIF-35 in methanol was transferred to a glass tube in a glove box and the solvent was roughly decanted by pipette. The sample was then evacuated at ambient temperature for 12 hours to yield an activated sample.

(ZIF-60 mer): Zn(IM)$_{1.5}$(mIM)$_{0.5}$.

0.18 mL imidazole stock solution (0.15 M, 2.7×10$^{-5}$ mol) and 0.060 mL 2-methylimidazole stock solution (0.15 M, 0.90×10$^{-5}$ mol) was mixed together. To this solution was added 0.060 mL Zn(NO3)2.4H$_2$O stock solution (0.15 M, 0.90×10$^{-5}$ mol). After the glass plate was loaded with mixtures of stock solutions dispensed by a programmed liquid handler (Gilson, model 215), it was covered with a PTFE sheet, sealed by fastening the sheet with a metal clamp, then heated in an oven at 85° C. and allowed to react solvothermally for 72 h. The product was in the form of prism-shaped single crystals. Elemental analysis C$_{13}$H$_9$N$_8$Zn$_2$=Zn(IM)$_{1.5}$(MeIM)$_{0.5}$.(Me$_2$NH)(H$_2$O)$_3$: Calcd. C, 33.17; H, 6.55; N, 22.76. Found C, 33.28; H, 6.19; N, 22.13. Elemental analysis (activated) C$_{13}$H$_9$N$_8$Zn$_2$=Zn(IM)$_{15}$(MeIM)$_{0.5}$: Calcd. C, 37.44; H, 3.38; N, 26.87; Zn, 31.36. Found C, 36.97; H, 3.19; N, 27.13; Zn, 32.06. FT-IR: (KBr 4000-400 cm$^{-1}$): 3445 (br), 3134 (w), 2599 (w), 2528 (w), 2503 (w), 1683 (s), 1602 (m), 1505 (w), 1250 (w), 1163 (w), 955 (w), 756 (w), 675 (w).

Experimental and Refinement Details for ZIF-60.

A colorless prismatic crystal (0.25×0.20×0.18 mm³) of ZIF-60 was placed in a 0.4 mm diameter borosilicate capillary along with a small amount of mother liquor. The capillary was flame sealed and mounted on a SMART APEXII three circle diffractometer equipped with a CCD area detector and operated at 1200 W power (40 kV, 30 mA) to generate Cu Kα radiation (λ=1.5418 Å) while being flash frozen to 258(2) K in a liquid N$_2$ cooled stream of nitrogen. A total of 36256 reflections were collected of which 2911 were unique and 2404 of these were greater than 2σ(1). The range of θ was from 2.29 to 59.36°. Analysis of the data showed negligible decay during collection. The structure was solved in the tetragonal I4/mmm space group, with Z=4, using direct methods. Atoms C2 and C4 were found to be disordered and were refined isotropically with the occupancy for each group modeled as its own independent free variable (X, 1-X). All other nonhydrogen atoms were refined anisotropically with hydrogen atoms generated as spheres riding the coordinates of their parent atoms. Modeling of electron density within the voids of the frameworks did not lead to identification of guest entities in all structures due to the lowered resolution of the data. The attempts made to model the guests (solvent molecules) did not lead to identification of guest entities in all structures due to the limited periodicity of the solvent molecules in the crystals. Since the solvent is not bonded to the framework this can be expected for the MOF structures. Many atomic coordinates that have been attributed to solvent molecules lie on a special position. However, very high displacement parameters, high esd's and partial occupancy due to the disorder make it impossible to determine accurate positions for these solvent molecules. Thus, electron density within void spaces which could not be assigned to any definite guest entity was modeled as isolated carbon and oxygen atoms, and the foremost errors in all the models lies with assignment of guest electron density. To prove the correctness of the atomic positions in the framework the application of the SQUEEZE routine of A. Spek has been performed. However atomic co-ordinates for the "non-SQUEEZE" structures are also presented. The unit cell of ZIF-60 contains 1.5 imidazole and 0.5 2-methyl imidazole (3:1) per zinc. Final full matrix least-squares refinement on F2 converged to R1=0.0360 (F>2σF)) and wR$_2$=0.1157 (all data) with GOF=1.093. For the structure where the SQUEEZE program has not been employed, final full matrix least-squares refinement on F2 converged to R1=0.0674 (F>2σF)) and wR$_2$=0.2605 (all data) with GOF=1.059. When only framework atoms are included in the latter structure factor calculation, the residual electron density in the F-map is located within the pores of ZIF-60.

| ZIF 60 Crystal Data Structure and Refinement | |
|---|---|
| Empirical formula | C87H56N36O4Zn8 |
| Formula weight | 2192.80 |
| Temperature | 258(2) K |
| Wavelength | 1.54178 Å |
| Crystal system | Tetragonal |
| Space group | I4/mmm |
| Unit cell dimensions | a = 27.2448(3) Å   α = 90° |
|  | b = 27.2448(3) Å   β = 90° |
|  | c = 19.2254(3) Å   γ = 90° |

-continued

| ZIF 60 Crystal Data Structure and Refinement | |
|---|---|
| Volume | 14270.6(3) |
| Z | 4 |
| Density (calculated) | 1.021 |
| Absorption coefficient | 1.839 |
| F(000) | 4408 |
| Crystal size | 0.25 × 0.20 × 0.18 mm$^3$ |
| Theta range for data collection | 2.29-59.36 |
| Index ranges | $-30 <= h <= 24, -30 <= k <= 28,$ $-21 <= l <= 19$ |
| Reflections collected | 36256 |
| Independent reflections | 2911 [Rint = 0.0247] |
| Completeness to theta = 59.36° | 99.7% |
| Absorption correction | Semi-empirical from equivalents |
| Refinement method | Full-matrix least-squares on F$^2$ |
| Data/restraints/parameters | 2911/0/146 |
| Goodness-of-fit on F$^2$ | 1.059 |
| Final R indices [I > 2sigma(I)] | $R_1 = 0.0674, wR_2 = 0.2421$ |
| R indices (all data) | $R_1 = 0.0761, wR_2 = 0.2605$ |
| Largest diff. peak and hole | 0.634 and −0.444 e·Å$^{-3}$ |

| ZIF-60 SQUEEZE | |
|---|---|
| Empirical formula | C13H14N8Zn2 |
| Formula weight | 413.10 |
| Temperature | 258(2) K |
| Wavelength | 1.54178 Å |
| Crystal system | Tetragonal |
| Space group | I4/mmm |
| Unit cell dimensions | a = 27.2448(3) Å  α = 90° |
| | b = 27.2448(3) Å  β = 90° |
| | c = 19.2254(3) Å  γ = 90° |
| Volume | 14270.6(3) |
| Z | 16 |
| Density (calculated) | 0.769 |
| Absorption coefficient | 1.698 |
| F(000) | 3328.0 |
| Crystal size | 0.25 × 0.20 × 0.18 mm$^3$ |
| Theta range for data collection | 2.29-59.36 |
| Index ranges | $-30 <= h <= 24, -30 <= k <= 28,$ $-21 <= l <= 19$ |
| Reflections collected | 36256 |
| Independent reflections | 2911 [Rint = 0.0247] |
| Completeness to theta = 59.36° | 99.7% |
| Absorption correction | Semi-empirical from equivalents |
| Refinement method | Full-matrix least-squares on F$^2$ |
| Data/restraints/parameters | 2911/6/110 |
| Goodness-of-fit on F$^2$ | 1.093 |
| Final R indices [I > 2sigma(I)] | $R_1 = 0.0360, wR_2 = 0.1157$ |
| R indices (all data) | $R_1 = 0.0416, wR_2 = 0.1120$ |
| Largest diff. peak and hole | 0.454 and −0.330 e·Å$^{-3}$ |

(ZIF-61 zni): Zn(IM)(mIM).

0.12 mL imidazole stock solution (0.15 M, $1.8 \times 10^{-5}$ mol) and 0.12 mL 2-methylimidazole stock solution (0.15 M, $1.8 \times 10^{-5}$ mol) was mixed together. To this solution was added 0.060 mL Zn(NO$_3$)$_2$·4H$_2$O stock solution (0.15 M, $0.90 \times 10^{-5}$ mol). After the glass plate was loaded with mixtures of stock solutions dispensed by a programmed liquid handler (Gilson, model 215), it was covered with a PTFE sheet, sealed by fastening the sheet with a metal clamp, then heated in an oven at 11100° C. and allowed to react solvothermally for 96 h. The product was in the form of rodshaped single crystals. Elemental analysis C$_7$H$_9$N$_4$Zn=Zn(IM)(MeIM): Calcd. C, 38.99; H, 3.74; N, 25.99; Zn, 30.34. Found C, 39.17; H, 3.39; N, 26.13; Zn, 29.98. FT-IR: (KBr 4000-400 cm−1): 3445 (br), 3139 (w), 3108 (w), 2930 (w), 2513 (w), 1637 (s), 1499 (m), 1474 (w), 1316 (w), 1174 (w), 1008 (w), 837 (w), 675 (w), 420 (s).

Experimental and Refinement Details for ZIF-61.

A colorless prismatic crystal (0.21×0.18×0.16 mm$^3$) of ZIF-61 was placed in a 0.3 mm diameter borosilicate capillary along with a small amount of mother liquor. The capillary was flame sealed and mounted on a SMART APEXII three circle diffractometer equipped with a CCD area detector and operated at 1200 W power (40 kV, 30 mA) to generate Cu Kα radiation (λ=1.5418 Å) radiation while being flash frozen to 258(2) K in a liquid N$_2$ cooled stream of nitrogen. A total of 17067 reflections were collected of which 1443 were unique and 1335 of these were greater than 2σ(I). The range of θ was from 3.76 to 64.55°. Analysis of the data showed negligible decay during collection. The structure was solved in the tetragonal 141/acd space group with Z=2 using direct methods. Atoms C1, C5, and C6 were found to be disordered and were refined anisotropically with the occupancy for each group modeled as its own independent free variable (X, 1−X). All other non-hydrogen atoms were also refined anisotropically with hydrogen atoms generated as spheres riding the coordinates of their parent atoms. Modeling of electron density within the voids of the frameworks did not lead to identification of guest entities in all structures due to the lowered resolution of the data. The unit cell of ZIF-61 contains one imidazole and one 2-methylimidazole (1:1) per zinc. Final full matrix least-squares refinement on F2 converged to R1=0.0523 (F>2σF)) and wR$_2$=0.1339 (all data) with GOF=1.148.

| Crystal Data and Structure Refinement of ZIF-61 | |
|---|---|
| Empirical formula | C13H14N8Zn2 |
| Formula weight | 413.10 |
| Temperature | 258(2) K |
| Wavelength | 1.54178 Å |
| Crystal system | Tetragonal |
| Space group | I4$_1$/acd |
| Unit cell dimensions | a = 23.4803(3) Å  α = 90° |
| | b = 23.4803(3) Å  β = 90° |
| | c = 12.5545(3) Å  γ = 90° |
| Volume | 6921.6(3) |
| Z | 2 |
| Density (calculated) | 1.582 |
| Absorption coefficient | 3.500 |
| F(000) | 3312.0 |
| Crystal size | 0.21 × 0.18 × 0.16 mm$^3$ |
| Theta range for data collection | 3.76-64.55 |
| Index ranges | $-25 <= h <= 27, -26 <= k <= 27,$ $-12 <= l <= 14$ |
| Reflections collected | 36256 |
| Independent reflections | 1443 [Rint = 0.0228] |
| Completeness to theta = 64.55° | 98.5% |
| Absorption correction | Semi-empirical from equivalents |
| Refinement method | Full-matrix least-squares on F$^2$ |
| Data/restraints/parameters | 1443/24/129 |
| Goodness-of-fit on F$^2$ | 1.148 |
| Final R indices [I > 2sigma(I)] | $R_1 = 0.0523, wR_2 = 0.1339$ |
| R indices (all data) | $R_1 = 0.0558, wR_2 = 0.1359$ |
| Largest diff. peak and hole | 0.665 and −0.255 e·Å$^{-3}$ |

(ZIF-62 cag): Zn(IM)$_{1.75}$(bIM)$_{0.25}$.

0.15 mL imidazole stock solution (0.20 M, $3.0 \times 10^{-5}$ mol) and 0.075 mL benzimidazole stock solution (0.20 M, $1.5 \times 10^{-5}$ mol) was mixed together. To this solution was added 0.075 mL Zn(NO3)2·4H2O stock solution (0.20 M, $1.5 \times 10^{-5}$ mol). After the glass plate was loaded with mixtures of stock solutions dispensed by a programmed liquid handler (Gilson, model 215), it was covered with a PTFE sheet, sealed by fastening the sheet with a metal clamp, then heated in an oven at 100° C. and allowed to react solvothermally for 96 h. The product was in the form of prism-shaped single crystals.

Experimental and Refinement Details for ZIF-62.

A colorless prismatic crystal (0.20×0.15×0.12 mm³) of ZIF-62 was placed in a 0.4 mm diameter borosilicate capillary with a small amount of mother liquor. The capillary was flame sealed and mounted on a SMART APEXII three circle diffractometer equipped with a CCD area detector and operated at 1200 W power (40 kV, 30 mA) to generate Cu Kα radiation ($\lambda$=1.5418 Å) radiation while being flash frozen to 258(2) K in a liquid $N_2$ cooled stream of nitrogen. A total of 17208 reflections were collected, of which 2873 were unique and 2705 of these were greater than 2σ(I). The range of θ was from 4.86 to 55.98°. Analysis of the data showed negligible decay during collection. The structure was solved in the orthorhombic Pbca space group with Z=2 using direct methods. Modeling of electron density within the void of the frameworks leads to identification of one DMF guest molecule in the asymmetric unit. These imidazole linkers have no crystallographic symmetry. The contents per 2 Zn (independent)=4 linkers; 3 are unsubstituted imidazole with no disorder and the fourth is 0.375(11) benzimidazole and 0.625(11) imidazole. Note that this fourth position can contain a maximum of 50% benzimidazole because a center of symmetry in this space group would bring the benzene rings related by this center into contact with each other. No such limitation exists for the unsubstituted imidazole. With the exception of the 4 partial occupancy benzene carbon atoms and the solvent atoms, all non-hydrogen atoms have been refined anisotropically. All hydrogen atoms have been placed in geometrically located positions and their displacement parameters are tied to those of the attached carbon atoms. The unit cell of ZIF-62 contains 1.812 imidazole and 0.187 benzimidazole per zinc. Final full matrix least squares refinement on F2 converged to R1=0.0590 (F>2σF)) and $wR_2$=0.1890 (all data) with GOF=1.139.

| Crystal Data and Structure Refinement of ZIF-62 | |
|---|---|
| Empirical formula | C60H51N34O2Zn8 |
| Formula weight | 1803.47 |
| Temperature | 258(2) K |
| Wavelength | 1.54178 Å |
| Crystal system | Orthorhombic |
| Space group | Pbca |
| Unit cell dimensions | a = 15.6620(14) Å  α = 90° |
| | b = 15.6620(14) Å  β = 90° |
| | c = 18.2073(19) Å  γ = 90° |
| Volume | 4466.2(7) |
| Z | 2 |
| Density (calculated) | 1.341 |
| Absorption coefficient | 2.787 |
| F(000) | 1810 |
| Crystal size | 0.20 × 0.15 × 0.12 mm³ |
| Theta range for data collection | 4.86-55.98 |
| Index ranges | −16 <= h <= 16, −14 <= k <= 16, −19 <= l <= 19 |
| Reflections collected | 17208 |
| Independent reflections | 2873 [Rint = 0.0302] |
| Completeness to theta = 64.55° | 98.8% |
| Absorption correction | Semi-empirical from equivalents |
| Refinement method | Full-matrix least-squares on $F^2$ |
| Data/restraints/parameters | 2873/11/236 |
| Goodness-of-fit on $F^2$ | 1.139 |
| Final R indices [I > 2 sigma(I)] | $R_1$ = 0.0590, $wR_2$ = 0.1864 |
| R indices (all data) | $R_1$ = 0.0608, $wR_2$ = 0.1890 |
| Largest diff. peak and hole | 0.879 and −0.312 e · Å⁻³ |

(ZIF-64 dft): $Zn(IM)_2$.

To a 0.27 mL imidazole stock solution (0.20 M, 5.4×10⁻⁵ mol) 0.030 mL $Zn(NO_3)_2 \cdot 4H_2O$ stock solution (0.20 M, 0.060×10⁻⁵ mol) was added. After the glass plate was loaded with mixtures of stock solutions dispensed by a programmed liquid handler (Gilson, model 215), it was covered with a PTFE sheet, sealed by fastening the sheet with a metal clamp, then heated in an oven at 100° C. and allowed to react solvothermally for 72 h. The product was in the form of rod-shaped single crystals.

Experimental and Refinement Details for ZIF-60.

A colorless needle shaped crystal (0.25×0.14×0.12 mm³) of ZIF-64 was placed in a 0.7 mm diameter nylon CryoLoops (Hampton Research) with Paraton-N (Hampton Research). The loop was mounted on a SMART APEXII three circle diffractometer equipped with a CCD area detector and operated at 1200 W power (40 kV, 30 mA) to generate Cu Kα radiation ($\lambda$=1.5418 Å) while being flash frozen to 153(2) K in a liquid $N_2$ cooled stream of nitrogen. A total of 17208 reflections were collected, of which 2873 were unique and 2705 of these were greater than 2σ(I). The range of θ was from 2.96 to 53.31°. Analysis of the data showed negligible decay during collection. The structure was solved in the monoclinic P2/n space group with Z=16 using direct methods. Atoms C6 and C21 were found to be disordered and were refined anisotropically with the occupancy for each group modeled as its own independent free variable (X, 1−X). All other non-hydrogen atoms were refined anisotropically with hydrogen atoms generated as spheres riding the coordinates of their parent atoms. Although the unit cell has a=c and all angles 90°, Rint is 0.4189 for a tetragonal cell and 0.1546 for a monoclinic cell. XPREP prefers a monoclinic cell. The 4 independent Zn atoms of the monoclinic space group drop to 2 in the space group P4/n, but in the later space group the model refines poorly (R ~28%) and the disordered carbon atoms of the imidazole retain their disorder. An inspection of hkl with b as the unique axis has h 0 0 not equal to 0 0 1. Also, although there are no strong 0 k 0 reflections, the odd k are not entirely absent. The n-glide absence (h 0 1, h 1 1≠2n) are required for both space groups to be tested. Modeling of electron density within the void of the frameworks leads to identification of 2.5 DMF guest molecules in the asymmetric unit. These imidazole linkers have no crystallographic symmetry. The unit cell of ZIF-64 contains two imidazole linkers per zinc. All hydrogen atoms have been placed in geometrically located positions and their displacement parameters are tied to those of the attached carbon atoms. Final full matrix least-squares refinement on F2 converged to R1=0.1116 (F>2σF)) and $wR_2$=0.2573 (all data) with GOF=1.083.

| Crystal data and structure refinement of ZIF-64 | |
|---|---|
| Empirical formula | C7.75H9.25N4.56O0.56 Zn |
| Formula weight | 240.69 |
| Temperature | 153(2) K |
| Wavelength | 1.54178 Å |
| Crystal system | Monoclinic. |
| Space group | P2/n |
| Unit cell dimensions | a = 21.110(3) Å  α = 90° |
| | b = 9.906(2) Å  β = 90.00(2)° |
| | c = 21.110(4) Å  γ = 90° |
| Volume | 4414.6(14) |
| Z | 16 |
| Density (calculated) | 1.449 |
| Absorption coefficient | 2.882 |
| F(000) | 1955 |
| Crystal size | 0.25 × 0.14 × 0.12 mm³ |
| Theta range for data collection | 2.96-53.31 |
| Index ranges | −21 <= h <= 21, −10 <= k <= 9, −21 <= l <= 17 |
| Reflections collected | 17208 |
| Independent reflections | 2873 [Rint = 0.1546] |

| Crystal data and structure refinement of ZIF-64 | |
| --- | --- |
| Completeness to theta = 53.31° | 95.0% |
| Absorption correction | Semi-empirical from equivalents |
| Refinement method | Full-matrix least-squares on $F^2$ |
| Data/restraints/parameters | 2873/0/497 |
| Goodness-of-fit on $F^2$ | 1.083 |
| Final R indices [I > 2 sigma(I)] | $R_1 = 0.1116$, $wR_2 = 0.2573$ |
| R indices (all data) | $R_1 = 0.1639$, $wR_2 = 0.2768$ |
| Largest diff. peak and hole | 1.022 and −0.779 e · Å$^{-3}$ |

(ZIF-65 sod): Co(nIM)$_2$.

To a 0.25 mL 2-nitroimidazole stock solution (0.20 M, 5.0×10$^{-5}$ mol), 0.050 mL Co(NO$_3$)$_2$.6H$_2$O stock solution (0.20 M, 1.0×10$^{-5}$ mol) was added. After the glass plate was loaded with mixtures of stock solutions dispensed by a programmed liquid handler (Gilson, model 215), it was covered with a PTFE sheet, sealed by fastening the sheet with a metal clamp, then heated in an oven at 100° C. and allowed to react solvothermally for 72 h. The product was in the form of cube-shaped single crystals.

Experimental and Refinement Details for ZIF-65.

A colorless prismatic crystal (0.20×0.16×0.12 mm$^3$) of ZIF-65 was placed in a 0.7 mm diameter nylon CryoLoops (Hampton Research) with Paraton-N (Hampton Research). The loop was mounted on a SMART APEXII three circle diffractometer equipped with a CCD area detector and operated at 1200 W power (40 kV, 30 mA) to generate Cu Kα radiation (λ=1.5418 Å) while being flash frozen to 153(2) K in a liquid N$_2$ cooled stream of nitrogen. A total of 7062 reflections were collected of which 264 were unique and 257 of these were greater than 2σ(I). The range of θ was from 3.62 to 36.79°. Analysis of the data showed negligible decay during collection. The structure was solved in the cubic I-43m space group, with Z=2, using direct methods. All non-hydrogen atoms were refined anisotropically with hydrogen atoms generated as spheres riding the coordinates of their parent atoms. Modeling of electron density within the voids of the frameworks did not lead to identification of guest entities in all structures due to the lowered resolution of the data. Since the solvent is neither bonded to the framework nor tightly packed into the voids, this can be expected for the MOF structures. The unit cell of ZIF-65 contains two 2-nitroimidazole linker per cobalt. Final full matrix least-squares refinement on F2 converged to R1=0.0334 (F>2σF)) and wR$_2$=0.0938 (all data) with GOF=1.113. When only framework atoms are included in the structure factor calculation, the residual electron density in the F-map is located within the pores of ZIF-65.

| Crystal data and structure refinement of ZIF-65 | |
| --- | --- |
| Empirical formula | C36H24Co6N36O24 |
| Formula weight | 1698.49 |
| Temperature | 153(2) K |
| Wavelength | 1.54178 Å |
| Crystal system | Cubic |
| Space group | I-43m |
| Unit cell dimensions | a = 17.2715(4) Å  α = 90° |
| | b = 17.2715(4) Å  β = 90° |
| | c = 17.2715(4) Å  γ = 90° |
| Volume | 5152.2(2) |
| Z | 2 |
| Density (calculated) | 1.095 |
| Absorption coefficient | 7.965 |
| F(000) | 1692 |
| Crystal size | 0.20 × 0.16 × 0.12 mm$^3$ |
| Theta range for data collection | 3.62 to 36.79° |
| Index ranges | −13 <= h <= 13, −13 <= k <= 13, −12 <= l <= 13 |
| Reflections collected | 5875 |
| Independent reflections | 264 [Rint = 0.0818] |
| Completeness to theta = 36.79° | 100% |
| Absorption correction | Semi-empirical from equivalents |
| Refinement method | Full-matrix least-squares on $F^2$ |
| Data/restraints/parameters | 264/0/43 |
| Goodness-of-fit on $F^2$ | 1.113 |
| Final R indices [I > 2 sigma(I)] | $R_1 = 0.0334$, $wR_2 = 0.0942$ |
| R indices (all data) | $R_1 = 0.0344$, $wR_2 = 0.0938$ |
| Largest diff. peak and hole | 0.112 and −0.186 e · Å$^{-3}$ |

(ZIF-67 sod): Co(mIM)$_2$.

To a 0.225 mL 2-nitroimidazole stock solution (0.20 M, 4.5×10$^{-5}$ mol), 0.075 mL Co(NO$_3$)$_2$.6H$_2$O stock solution (0.20 M, 1.5×10$^{-5}$ mol) was added. After the glass plate was loaded with mixtures of stock solutions dispensed by a programmed liquid handler (Gilson, model 215), it was covered with a PTFE sheet, sealed by fastening the sheet with a metal clamp, then heated in an oven at 100° C. and allowed to react solvothermally for 72 h. The product was in the form of prism-shaped single crystals.

Experimental and Refinement Details for ZIF-67.

A colorless prismatic crystal (0.20×0.16×0.12 mm$^3$) of ZIF-67 was placed in a 0.7 mm diameter nylon CryoLoops (Hampton Research) with Paraton-N (Hampton Research). The loop was mounted on a SMART APEXII three circle diffractometer equipped with a CCD area detector and operated at 1200 W power (40 kV, 30 mA) to generate Cu Kα radiation (λ=1.5418 Å) while being flash frozen to 153(2) K in a liquid N2 cooled stream of nitrogen. A total of 7062 reflections were collected of which 399 were unique and 380 of these were greater than 2σ(I). The range of θ was from 3.69 to 45.00°. Analysis of the data showed negligible decay during collection. The structure was solved in the cubic I-43m space group, with Z=4, using direct methods. All non-hydrogen atoms were refined anisotropically with hydrogen atoms generated as spheres riding the coordinates of their parent atoms. Modeling of electron density within the voids of the frameworks did not lead to identification of guest entities in any of the structures due to the lowered resolution of the data. The attempts made to model the guests (solvent molecules) did not lead to identification of guest entities in any of the structures due to the limited periodicity of the solvent molecules in the crystals. Since the solvent is neither bonded to the framework nor tightly packed into the voids, this can be expected for the MOF structures. Thus, electron density within void spaces which could not be assigned to any definite guest entity was modeled as isolated oxygen atoms, and the foremost errors in all the models lie with the assignment of guest electron density. To assess the correctness of the atomic positions in the framework, the application of the SQUEEZE routine of A. Spek has been performed. However, atomic co-ordinates for the "non-SQUEEZE" structures are also presented. The unit cell of ZIF-67 contains two 2-methylimidazole linkers per cobalt. Final full matrix least-squares refinement on F2 converged to R1=0.0295 (F>2σF)) and wR$_2$=0.0825 (all data) with GOF=1.118. For the structure where the SQUEEZE program has not been employed, final full matrix least-squares refinement on F2 converged to R1=0.0724 (F>2σF)) and wR$_2$=0.2138 (all data) with GOF=1.193. When only framework atoms are included in the latter structure factor calculation, the residual electron density in the F-map is located within the pores of ZIF-67.

| Crystal data and structure refinement of ZIF-67. | |
| --- | --- |
| Empirical formula | C24H30Co3N12O2 |
| Formula weight | 695.39 |
| Temperature | 153(2) K |
| Wavelength | 1.54178 Å |
| Crystal system | Cubic |
| Space group | I-43 m |
| Unit cell dimensions | a = 16.9589(3) Å  $\alpha = 90°$ |
| | b = 16.9589(3) Å  $\beta = 90°$ |
| | c = 16.9589(3) Å  $\gamma = 90°$ |
| Volume | 4877.45(15) |
| Z | 4 |
| Density (calculated) | 0.947 |
| Absorption coefficient | 8.124 |
| F(000) | 1420 |
| Crystal size | 0.20 × 0.16 × 0.12 mm$^3$ |
| Theta range for data collection | 3.69-45.00 |
| Index ranges | −14 <= h <= 15, −15 <= k <= 14, |
| | −14 <= l <= 15 |
| Reflections collected | 7062 |
| Independent reflections | 399 [Rint = 0.0433] |
| Completeness to theta = 59.36° | 100% |
| Absorption correction | Semi-empirical from equivalents |
| Refinement method | Full-matrix least-squares on F$^2$ |
| Data/restraints/parameters | 399/0/38 |
| Goodness-of-fit on F$^2$ | 1.193 |
| Final R indices [I > 2sigma(I)] | $R_1$ = 0.0724, $wR_2$ = 0.2138 |
| R indices (all data) | $R_1$ = 0.0740, $wR_2$ = 0.2152 |
| Largest diff. peak and hole | 0.788 and −0.793 e · Å$^{-3}$ |

| ZIF-67 SQUEEZE | |
| --- | --- |
| Empirical formula | C8H10CoN4 |
| Formula weight | 221.13 |
| Temperature | 153(2) K |
| Wavelength | 1.54178 Å |
| Crystal system | Cubic |
| Space group | I-43 m |
| Unit cell dimensions | a = 16.9589(3) Å  $\alpha = 90°$ |
| | b = 16.9589(3) Å  $\beta = 90°$ |
| | c = 16.9589(3) Å  $\gamma = 90°$ |
| Volume | 4877.45(15) |
| Z | 4 |
| Density (calculated) | 0.903 |
| Absorption coefficient | 8.124 |
| F(000) | 1420 |
| Crystal size | 0.20 × 0.16 × 0.12 mm$^3$ |
| Theta range for data collection | 3.69-45.00 |
| Index ranges | −14 <= h <= 15, −15 <= k <= 14, |
| | −14 <= l <= 15 |
| Reflections collected | 7062 |
| Independent reflections | 399 [Rint = 0.0577] |
| Completeness to theta = 59.36° | 100% |
| Absorption correction | Semi-empirical from equivalents |
| Refinement method | Full-matrix least-squares on F$^2$ |
| Data/restraints/parameters | 399/0/34 |
| Goodness-of-fit on F$^2$ | 1.118 |
| Final R indices [I > 2sigma(I)] | $R_1$ = 0.0295, $wR_2$ = 0.0825 |
| R indices (all data) | $R_1$ = 0.0310, $wR_2$ = 0.0831 |
| Largest diff. peak and hole | 0.788 and −0.793 e · Å$^{-3}$ |

(ZIF-68 gme): Zn(nIM)(bIM).

0.180 mL 2-nitroimidazole stock solution (0.20 M, 3.6× 10$^{-5}$ mol) and 0.060 mL benzimidazole stock solution (0.20 M, 1.2×10$^{-5}$ mol) was mixed together. To this solution was added 0.060 mL Zn(NO3)2.4H2O stock solution (0.20 M, 1.2×10$^{-5}$ mol). After the glass plate was loaded with mixtures of stock solutions dispensed by a programmed liquid handler (Gilson, model 215), it was covered with a PTFE sheet, sealed by fastening the sheet with a metal clamp, then heated in an oven at 100° C. and allowed to react solvothermally for 72 h. The product was in the form of yellow colored prism-shaped single crystals. Elemental analysis $C_{10}H_9N_5O_2Zn$=Zn(NO$_2$IM)(PhIM).(DMF)(H$_2$O)2: Calcd. C, 36.10; H, 3.33; N, 21.05. Found C, 35.47; H, 2.89; N, 21.83. Elemental analysis (activated) $C_{10}H_9N_5O_2Zn$=Zn(NO$_2$IM)(PhIM): Calcd. C, 40.49; H, 2.38; N, 23.62; O, 10.79; Zn, 22.05. Found C, 40.09; H, 2.12; N, 23.60; O, 11.44; Zn, 21.95.

Experimental and Refinement Details for ZIF-68.

A colorless prismatic crystal (0.24×0.18×0.16 mm3) of ZIF-68 was placed in a 0.7 mm diameter nylon CryoLoops (Hampton Research) with Paraton-N (Hampton Research). The loop was mounted on a SMART APEXII three circle diffractometer equipped with a CCD area detector and operated at 1200 W power (40 kV, 30 mA) to generate Cu Kα radiation (λ=1.5418 Å) while being flash frozen to 153(2) K in a liquid N2 cooled stream of nitrogen. A total of 30723 reflections were collected of which 1382 were unique and 1209 of these were greater than 2σ(I). The range of θ was from 1.91 to 40.66°. Analysis of the data showed negligible decay during collection. Space groups P63/mmc (hexagonal) and P-31c (trigonal) were suggested by XPREP with very similar CFOM (7.60 vs 7.32). The structure was solved in the hexagonal P63/mmc space group, with Z=24, using direct methods. Atoms Zn1, N2, N3, C1, and C11 were refined anisotropically. All other non-hydrogen atoms were refined isotropically with hydrogen atoms generated as spheres riding the coordinates of their parent atoms. ZIF-68 is composed of one 2-nitroimidazole and one benzimidazole per Zn. An asymmetric unit contains one half nitroimidazole (linker with mirror symmetry, no disorder), one half benzimidazole (linker with mirror symmetry, no disorder), one half nitroimidazole (linker with mirror symmetry), and one half benzimidazole (linker with a 2-fold axis). The attempts made to model the guests (solvent molecules) did not lead to identification of guest entities in any of the structures due to the limited periodicity of the solvent molecules in the crystals. Since the solvent is neither bonded to the framework nor tightly packed into the voids, solvent disorder can be expected for the MOF structures. Thus, electron density within void spaces which could not be assigned to any definite guest entity was modeled as isolated carbon atoms, and the foremost errors in all the models lies with the assignment of guest electron density. To assess the correctness of the atomic positions in the framework, the application of the SQUEEZE routine of A. Spek has been performed. It should be noted that the precision of this model is low; however, the structure is reported to display the framework for ZIF-68 as isolated in the crystalline form. Other supporting characterization data (vide infra Materials and Methods) are consistent with the crystal structure. Final full matrix least-squares refinement on F2 converged to R1=0.1367 (F>2σF)) and wR$_2$=0.4772 (all data) with GOF=2.374. When only framework atoms are included in the latter structure factor calculation, the residual electron density in the F-map is located within the pores of ZIF-68.

| Crystal data and structure refinement of ZIF-68 | |
| --- | --- |
| Empirical formula | C7.06H4.94N3.53O1.59Zn0.71 |
| Formula weight | 210.76 |
| Temperature | 153(2) K |
| Wavelength | 1.54178 Å |
| Crystal system | Hexagonal |
| Space group | P6$_3$/mmc |
| Unit cell dimensions | a = 26.6407(4) Å  $\alpha = 90°$ |
| | b = 26.6407(4) Å  $\beta = 90°$ |
| | c = 18.4882(4) Å  $\gamma = 120°$ |

| Crystal data and structure refinement of ZIF-68 | |
| --- | --- |
| Volume | 11363.6(3) |
| Z | 24 |
| Density (calculated) | 1.047 |
| Absorption coefficient | 1.846 |
| F(000) | 3600 |
| Crystal size | 0.24 × 0.18 × 0.16 mm$^3$ |
| Theta range for data collection | 1.91-40.66 |
| Index ranges | $-22 <= h <= 22, -22 <= k <= 23,$ $-14 <= l <= 16$ |
| Reflections collected | 30723 |
| Independent reflections | 1382 [Rint = 0.0321] |
| Completeness to theta = 40.66° | 99.9% |
| Absorption correction | Semi-empirical from equivalents |
| Refinement method | Full-matrix least-squares on F$^2$ |
| Data/restraints/parameters | 1382/26/105 |
| Goodness-of-fit on F$^2$ | 2.374 |
| Final R indices [I > 2sigma(I)] | $R_1 = 0.1369, wR_2 = 0.4617$ |
| R indices (all data) | $R_1 = 0.1435, wR_2 = 0.4766$ |
| Largest diff. peak and hole | 0.874 and −0.739 e · Å$^{-3}$ |

(ZIF-69 gme): Zn(nIM)(5cbIM).

0.12 mL 2-nitroimidazole stock solution (0.20 M, 2.4× 10$^{-5}$ mol) and 0.12 mL 5-chlorobenzimidazole stock solution (0.20 M, 2.4×10$^{-5}$ mol) was mixed together. To this solution was added 0.060 mL Zn(NO$_3$)$_2$.4H$_2$O stock solution 15 (0.15 M, 1.2×10$^{-5}$ mol). After the glass plate was loaded with mixtures of stock solutions dispensed by a programmed liquid handler (Gilson, model 215), it was covered with a PTFE sheet, sealed by fastening the sheet with a metal clamp, then heated in an oven at 100° C. and allowed to react solvothermally for 72 h. The product was in the form of yellow colored prism-shaped single crystals. Elemental analysis C$_{10}$H$_8$N$_4$O$_2$ClZn=Zn(NO$_2$IM)(5ClPhIM).(H$_2$O)$_4$: Calcd. C, 32.78; H, 4.44; N, 17.65. Found C, 31.89; H, 4.39; N, 17.13. Elemental analysis (activated) C$_{10}$H$_8$N$_4$O$_2$ClZn=Zn(NO$_2$IM)(5ClPhIM): Calcd. C, 36.28; H, 1.83; N, 21.16; 0, 9.67; Cl, 10.74; Zn, 19.75. Found C, 35.90; H, 1.81; N, 20.76; 0, 9.82; Zn, 19.51. FT-IR: (KBr 4000-400 cm−1): 3445 (br), 3439 (w), 3119 (w), 3088 (w), 3027 (w), 2859 (s), 2660 (m), 2523 (w), 2319 (w), 1667 (w), 1470 (w), 1364 (w), 1291 (w), 1240 (s), 1174 (w), 807 (w), 659 (m), 603 (w).

Experimental and Refinement Details for ZIF-69.

A colorless prismatic crystal (0.24×0.18×0.16 mm3) of ZIF-69 was placed in a 0.4 mm diameter nylon CryoLoops (Hampton Research) with Paraton-N (Hampton Research). The loop was mounted on a SMART APEXII three circle diffractometer equipped with a CCD area detector and operated at 1200 W power (40 kV, 30 mA) to generate Cu Kα radiation (λ=1.5418 Å) while being flash frozen to 153(2) K in a liquid N2 cooled stream of nitrogen. A total of 43296 reflections were collected of which 1782 were unique and 1617 of these were greater than 2σ(I). The range of θ was from 1.96 to 45.35°. Analysis of the data showed negligible decay during collection. Space groups P63/mmc (hexagonal) and P-31c (trigonal) were suggested by XPREP with very similar CFOM (7.80 vs 7.22). The structure was solved in the hexagonal P63/mmc space group, with Z=24, using direct methods. Atoms N1, C12, O3 and N9 were found to be disordered and were refined anisotropically with the occupancy for each group modeled as its own independent free variable (X, 1−X). All other non-hydrogen atoms were refined anisotropically with hydrogen atoms generated as spheres riding the coordinates of their parent atoms. ZIF-69 is composed of one 2-nitroimidazole and one monochlorobenzoimidazole per Zn. An asymmetric unit contains one half nitroimidazole (linker with mirror symmetry, no disorder), one half monochorobenzoimidazole (linker with mirror symmetry, no disorder), one half nitroimidazole (linker with mirror symmetry, disorder with separable atoms for NO2 and HCCH), and one half monochlorobenzoimidazole (linker with a 2-fold axis, disorder with separable atoms for N and for Cl). The attempts made to model the guests (solvent molecules) did not lead to identification of guest entities in any of the structures due to the limited periodicity of the solvent molecules in the crystals. Since the solvent is neither bonded to the framework nor tightly packed into the voids, solvent disorder can be expected for the MOF structures. Thus, electron density within void spaces which could not be assigned to any definite guest entity was modeled as isolated carbon atoms, and the foremost errors in all the models lies with the assignment of guest electron density. To assess the correctness of the atomic positions in the framework, the application of the SQUEEZE routine of A. Spek has been performed. However, atomic co-ordinates for the "non-SQUEEZE" structures are also presented. It should be noted that the precision of this model is low; however, the structure is reported to demonstrate the nature of the framework of ZIF-69.

Other supporting characterization data (vide infra Materials and Methods) agree with the structure. Final full matrix least-squares refinement on F2 converged to R1=0.0716 (F>2Fσ)) and wR$_2$=0.1978 (all data) with GOF=1.011. For the structure where the SQUEEZE program has not been employed, final full matrix least-squares refinement on F2 converged to R1=0.0930 (F>2σF)) and wR$_2$=0.3169 (all data) with GOF=1.671. When only framework atoms are included in the latter structure factor calculation, the residual electron density in the F-map is located within the pores of ZIF-69.

| Crystal data and refinement structure of ZIF-69. | |
| --- | --- |
| Empirical formula | C12.58H6ClN5.25O2.50Zn |
| Formula weight | 371.55 |
| Temperature | 153(2) K |
| Wavelength | 1.54178 Å |
| Crystal system | Hexagonal |
| Space group | P6$_3$/mmc |
| Unit cell dimensions | a = 26.0840(18) Å  α = 90° |
| | b = 26.0840(18) Å  β = 90° |
| | c = 19.4082(18) Å  γ = 120° |
| Volume | 11435.7(15) |
| Z | 24 |
| Density (calculated) | 1.295 |
| Absorption coefficient | 3.218 |
| F(000) | 4446 |
| Crystal size | 0.24 × 0.18 × 0.16 mm$^3$ |
| Theta range for data collection | 1.96-45.35 |
| Index ranges | $-23 <= h <= 22, -23 <= k <= 23,$ $-16 <= l <= 17$ |
| Reflections collected | 43296 |
| Independent reflections | 1782 [Rint = 0.0321] |
| Completeness to theta = 45.35° | 99.8% |
| Absorption correction | Semi-empirical from equivalents |
| Refinement method | Full-matrix least-squares on F$^2$ |
| Data/restraints/parameters | 1782/0/262 |
| Goodness-of-fit on F$^2$ | 1.671 |
| Final R indices [I > 2sigma(I)] | $R_1 = 0.0930, wR_2 = 0.3169$ |
| R indices (all data) | $R_1 = 0.0972, wR_2 = 0.3281$ |
| Largest diff. peak and hole | 1.101 and −0.511 e · Å$^{-3}$ |

| ZIF-69 SQUEEZE DATA | |
| --- | --- |
| Empirical formula | C10.25H6ClN5.25O2.75Zn |
| Formula weight | 347.52 |
| Temperature | 258(2) K |
| Wavelength | 1.54178 Å |
| Crystal system | Hexagonal |
| Space group | P6$_3$/mmc |
| Unit cell dimensions | a = 26.0840(18) Å  α = 90° |
|  | b = 26.0840(18) Å  β = 90° |
|  | c = 19.4082(18) Å  γ = 120° |
| Volume | 11435.7(15) |
| Z | 24 |
| Density (calculated) | 1.295 |
| Absorption coefficient | 3.218 |
| F(000) | 4158 |
| Crystal size | 0.24 × 0.18 × 0.16 mm$^3$ |
| Theta range for data collection | 1.96-45.35 |
| Index ranges | −23 <= h <= 22, −23 <= k <= 23, −16 <= l <= 17 |
| Reflections collected | 43296 |
| Independent reflections | 1782 [Rint = 0.0321] |
| Completeness to theta = 45.35° | 99.8% |
| Absorption correction | Semi-empirical from equivalents |
| Refinement method | Full-matrix least-squares on F$^2$ |
| Data/restraints/parameters | 1782/0/236 |
| Goodness-of-fit on F$^2$ | 1.011 |
| Final R indices [I > 2sigma(I)] | $R_1$ = 0.0716, $wR_2$ = 0.1978 |
| R indices (all data) | $R_1$ = 0.0753, $wR_2$ = 0.2024 |
| Largest diff. peak and hole | 0.176 and −0.109 e · Å$^{-3}$ |

(ZIF-70 gme): Zn(IM)1.13(nIM)0.87.

0.12 mL 2-nitroimidazole stock solution (0.20 M, 2.4×10$^{-5}$ mol) and 0.12 mL imidazole stock solution (0.20 M, 2.4×10$^{-5}$ mol) was mixed together. To this solution was added 0.060 mL Zn(NO$_3$)$_2$.4H$_2$O stock solution (0.15 M, 1.2×10$^{-5}$ mol). After the glass plate was loaded with mixtures of stock solutions dispensed by a programmed liquid handler (Gilson, model 215), it was covered with a PTFE sheet, sealed by fastening the sheet with a metal clamp, then heated in an oven at 100° C. and allowed to react solvothermally for 72 h. The product was in the form of prism-shaped single crystals. Elemental analysis C$_6$H$_{5.13}$N$_{4.87}$O$_{1.74}$Zn =Zn(IM)$_{1.10}$(NO$_2$IM)$_{0.90}$(DMF)(H$_2$O)$_4$: Calcd. C, 35.30; H, 4.44; N, 20.59. Found C, 35.17; H, 4.39; N, 20.13. Elemental analysis (activated) C$_6$H$_{5.13}$N$_{4.87}$O$_{1.74}$Zn=Zn(IM)$_{1.10}$(NO$_2$IM)$_{0.90}$: Calcd. C, 29.93; H, 2.14; N, 28.34; O, 11.57; Zn, 27.16. Found C, 29.77; H, 2.12; N, 28.36; O, 11.90; Zn, 27.01. FT-IR: (KBr 4000-400 cm−1): 3445 (br), 3419 (w), 3114 (w), 2920 (w), 2869 (w), 2655 (s), 2518 (m), 2329 (w), 1678 (w), 1510 (w), 1372 (w), 1168 (w), 1102 (w), 669 (s).

Experimental and Refinement Details for ZIF-70.

A colorless prismatic crystal (0.24×0.18×0.16 mm3) of ZIF-70 was placed in a 0.4 mm diameter borosilicate capillary along with a small amount of mother liquor. The sealed capillary was mounted on a SMART APEXII three circle diffractometer equipped with a CCD area detector and operated at 1200 W power (40 kV, 30 mA) to generate Cu Kα radiation (λ=1.5418 Å) while being flash frozen to 258(2) K in a liquid N2 cooled stream of nitrogen. A total of 59459 reflections were collected of which 3536 were unique and 2822 of these were greater than 2σ(I). The range of θ was from 1.89 to 64.74°. Analysis of the data showed negligible decay during collection. Space groups P6$_3$/mmc (hexagonal) and P-31c (trigonal) were suggested by XPREP with very similar CFOM (8.60 vs 8.82). The structure was solved in the hexagonal P6$_3$/mmc space group, with Z=4, using direct methods. Atoms C6 and C7 were found to be disordered and were refined anisotropically with the occupancy for each group modeled as its own independent free variable (X, 1−X). All other non-hydrogen atoms were refined anisotropically with hydrogen atoms generated as spheres riding the coordinates of their parent atoms. The attempts made to model the guests (solvent molecules) did not lead to identification of guest entities in any of the structures due to the limited periodicity of the solvent molecules in the crystals. Since the solvent is neither bonded to the framework nor tightly packed into the voids, solvent disorder can be expected for the MOF structures. Thus, electron density within void spaces which could not be assigned to any definite guest entity was modeled as isolated carbon atoms, and the foremost errors in all the models lie with the assignment of guest electron density. "Solvent" is 4 atoms refined as carbon atoms of undefined solvent, located in a void of the framework. To assess the correctness of the atomic positions in the framework, the application of the SQUEEZE routine of A. Spek has been performed. However, atomic co-ordinates for the "non-SQUEEZE" structures are also presented. The tetrahedrally coordinated Zn is surrounded by four linkers; one imidazole with 2-fold symmetry and one 2-nitroimidazole with mirror symmetry have no disorder. The two remaining positions have both imidazole and 2-nitroimidazole as linkers, always with mirror symmetry. In one position the 2-nitroimidazole occupancy is 29.8% and in the other position this occupancy is 44.2%. The framework contains 1.13 imidazole and 0.87 2-nitroimidazole per Zn. It should be noted that the precision of this model is low; however, the structure is reported to describe the framework of ZIF-70 can be isolated in crystalline form. Other supporting characterization data (vide infra Materials and Methods) agree with the crystal structure. Final full matrix least-squares refinement on F2 converged to R1=0.0580 (F>2σF)) and wR$_2$=0.1944 (all data) with GOF=1.129. For the structure where the SQUEEZE program has not been employed, final full matrix least-squares refinement on F2 converged to R1=0.0777 (F>2σF)) and wR$_2$=0.2560 (all data) with GOF=1.132. When only framework atoms are included in the latter structure factor calculation, the residual electron density in the F-map is located within the pores of ZIF-70.

| Crystal data and refinement structure of ZIF-70. | |
| --- | --- |
| Empirical formula | C6H5.13N4.87O1.74Zn |
| Formula weight | 237.99 |
| Temperature | 258(2) K |
| Wavelength | 1.54178 Å |
| Crystal system | Hexagonal |
| Space group | P6$_3$/mmc |
| Unit cell dimensions | a = 27.0111(9) Å  α = 90° |
|  | b = 27.0111(9) Å  β = 90° |
|  | c = 18.0208(9) Å  γ = 120° |
| Volume | 11386.5(10) |
| Z | 4 |
| Density (calculated) | 0.885 |
| Absorption coefficient | 1.752 |
| F(000) | 3028 |
| Crystal size | 0.24 × 0.18 × 0.16 mm$^3$ |
| Theta range for data collection | 1.89-64.74 |
| Index ranges | −30 <= h <= 31, −31 <= k <= 30, −21 <= l <= 20 |
| Reflections collected | 59459 |
| Independent reflections | 3536 [Rint = 0.0328] |
| Completeness to theta = 64.75° | 99.3% |
| Absorption correction | Semi-empirical from equivalents |
| Refinement method | Full-matrix least-squares on F$^2$ |
| Data/restraints/parameters | 3536/0/178 |
| Goodness-of-fit on F$^2$ | 1.132 |
| Final R indices [I > 2sigma(I)] | $R_1$ = 0.0777, $wR_2$ = 0.2769 |
| R indices (all data) | $R_1$ = 0.0888, $wR_2$ = 0.2560 |
| Largest diff. peak and hole | 1.057 and −0.395 e · Å$^{-3}$ |

| ZIF-70 SQUEEZE | |
|---|---|
| Empirical formula | C6H5.13N4.87O1.74Zn |
| Formula weight | 237.99 |
| Temperature | 258(2) K |
| Wavelength | 1.54178 Å |
| Crystal system | Hexagonal |
| Space group | P6$_3$/mmc |
| Unit cell dimensions | a = 27.0111(9) Å  α = 90° |
|  | b = 27.0111(9) Å  β = 90° |
|  | c = 18.0208(9) Å  γ = 120° |
| Volume | 11386.5(10) |
| Z | 4 |
| Density (calculated) | 0.854 |
| Absorption coefficient | 1.736 |
| F(000) | 2924 |
| Crystal size | 0.24 × 0.18 × 0.16 mm$^3$ |
| Theta range for data collection | 1.89-64.74 |
| Index ranges | −30 <= h <= 31, −31 <= k <= 30, −21 <= l <= 20 |
| Reflections collected | 59459 |
| Independent reflections | 3536 [Rint = 0.0328] |
| Completeness to theta = 64.75° | 99.3% |
| Absorption correction | Semi-empirical from equivalents |
| Refinement method | Full-matrix least-squares on F$^2$ |
| Data/restraints/parameters | 3536/0/164 |
| Goodness-of-fit on F$^2$ | 1.129 |
| Final R indices [I > 2sigma(I)] | R$_1$ = 0.0580, wR$_2$ = 0.1944 |
| R indices (all data) | R$_1$ = 0.0631, wR$_2$ = 0.2004 |
| Largest diff. peak and hole | 0.680 and −1.078 e·Å$^{-3}$ |

(ZIF-71 rho): Zn(dcIM)$_2$.

To a 0.24 mL 4,5-dichloroimidazole stock solution (0.075 M, 1.8×10$^{-5}$ mol) 0.060 mL Zn(NO$_3$)$_2$.4H$_2$O stock solution (0.075 M, 0.45×10$^{-5}$ mol) was added. After the glass plate was loaded with mixtures of stock solutions dispensed by a programmed liquid handler (Gilson, model 215), it was covered with a PTFE sheet, sealed by fastening the sheet with a metal clamp, then heated in an oven at 85° C. and allowed to react solvothermally for 96 h. The product was in the form of block-shaped single crystals.

Experimental and Refinement Details for ZIF-71.

A colorless prismatic crystal (0.22×0.20×0.19 mm3) of ZIF-71 was placed in a 0.7 mm diameter nylon CryoLoops (Hampton Research) with Paraton-N (Hampton Research). The loop was mounted on a SMART APEXII three circle diffractometer equipped with a CCD area detector and operated at 1200 W power (40 kV, 30 mA) to generate Cu Kα radiation (λ=1.5418 Å) while being flash frozen to 153(2) K in a liquid N2 cooled stream of nitrogen. A total of 57835 reflections were collected of which 1209 were unique and 782 of these were greater than 2σ(I). The range of θ was from 1.55 to 36.83°. Analysis of the data showed negligible decay during collection. The structure was solved in the cubic Pm-3m space group, with Z=48, using direct methods. All non-hydrogen atoms were refined anisotropically with hydrogen atoms generated as spheres riding the coordinates of their parent atoms. Since absorption corrections (SADABS) were ineffectual for improving the data quality of data this data has been processed without an absorption correction. Modeling of electron density within the voids of the framework did not lead to identification of guest entities in all structures due to the lowered resolution of the data and a limited periodicity of the solvent molecules in the crystals. Since the solvent is not bonded to the framework this can be expected for the MOF structures. Many atomic co-ordinates that have been attributed to solvent molecules lie on a special position. However, very high displacement parameters, high esd's and partial occupancy due to the disorder make it impossible to determine accurate positions for these solvent molecules. Thus, electron density within void spaces which could not be assigned to any definite guest entity was modeled as isolated carbon and oxygen atoms, and the foremost errors in all the models lie with assignment of guest electron density. To prove the correctness of the atomic positions in the framework the application of the SQUEEZE routine of A. Spek has been performed. However atomic co-ordinates for the "non-SQUEEZE" structures are also presented. The unit cell of ZIF-71 contains two 4,5-dichloroimidazole per zinc. Final full matrix least-squares refinement on F2 converged to R1=0.0424 (F>2Fσ)) and wR$_2$=0.1045 (all data) with GOF=1.022. For the structure where the SQUEEZE program has not been employed, final full matrix least-squares refinement on F2 converged to R1=0.0651 (F>2σF)) and wR$_2$=0.2307 (all data) with GOF=1.073. When only framework atoms are included in the latter structure factor calculation, the residual electron density in the F-map is located within the pores of ZIF-71.

| Crystal data and structure refinement of ZIF-71. | |
|---|---|
| Empirical formula | C7.30 H2 Cl4 N4 O0.03 Zn |
| Formula weight | 353.42 |
| Temperature | 153(2) K |
| Wavelength | 1.54178 Å |
| Crystal system | Cubic |
| Space group | Pm-3m |
| Unit cell dimensions | a = 28.5539(2) Å α = 90° |
|  | b = 28.5539(2) Å β = 90° |
|  | c = 28.5539(2) Å γ = 90° |
| Volume | 23280.7(3) |
| Z | 48 |
| Density (calculated) | 1.210 |
| Absorption coefficient | 6.697 |
| F(000) | 8259 |
| Crystal size | 0.22 × 0.20 × 0.19 mm$^3$ |
| Theta range for data collection | 1.55-36.83 |
| Index ranges | −22 <= h <= 22, −22 <= k <= 22, −22 <= l <= 22 |
| Reflections collected | 57835 |
| Independent reflections | 1209 [Rint = 0.1866] |
| Completeness to theta = 36.83° | 100% |
| Absorption correction | None |
| Refinement method | Full-matrix least-squares on F$^2$ |
| Data/restraints/parameters | 1209/0/142 |
| Goodness-of-fit on F$^2$ | 1.073 |
| Final R indices [I > 2sigma(I)] | R$_1$ = 0.0651, wR$_2$ = 0.2183 |
| R indices (all data) | R$_1$ = 0.0967, wR$_2$ = 0.2370 |
| Largest diff. peak and hole | 0.134 and −0.286 e.Å$^{-3}$ |

| ZIF-71 SQEEZE | |
|---|---|
| Empirical formula | C6 H2 Cl4 N4 Zn |
| Formula weight | 337.29 |
| Temperature | 153(2) K |
| Wavelength | 1.54178 Å |
| Crystal system | Cubic |
| Space group | Pm-3m |
| Unit cell dimensions | a = 28.5539(2) Å α = 90° |
|  | b = 28.5539(2) Å β = 90° |
|  | c = 28.5539(2) Å γ = 90° |
| Volume | 23280.7(3) |
| Z | 48 |
| Density (calculated) | 1.155 |
| Absorption coefficient | 6.697 |
| F(000) | 7872 |
| Crystal size | 0.22 × 0.20 × 0.19 mm$^3$ |
| Theta range for data collection | 1.55-36.83 |
| Index ranges | −22 <= h <= 22, −22 <= k <= 22, −22 <= l <= 22 |
| Reflections collected | 57835 |

| ZIF-71 SQEEZE | |
|---|---|
| Independent reflections | 1209 [Rint = 0.1866] |
| Completeness to theta = 36.83° | 100% |
| Absorption correction | None |
| Refinement method | Full-matrix least-squares on $F^2$ |
| Data/restraints/parameters | 1209/0/142 |
| Goodness-of-fit on $F^2$ | 1.022 |
| Final R indices [I > 2sigma(I)] | $R_1$ = 0.0424, $wR_2$ = 0.1045 |
| R indices (all data) | $R_1$ = 0.0776, $wR_2$ = 0.1145 |
| Largest diff. peak and hole | 0.134 and −0.286 e.Å$^{-3}$ |

(ZIF-72 lcs): $Zn(dcIM)_2$.

To a 0.24 mL 4,5-dichloroimidazole stock solution (0.20 M, 4.8×10$^{-5}$ mol) 0.060 mL $Zn(NO_3)_2 \cdot 4H_2O$ stock solution (0.20 M, 1.2×10$^{-5}$ mol) in DEF was added. After the glass plate was loaded with mixtures of stock solutions dispensed by a programmed liquid handler (Gilson, model 215), it was covered with a PTFE sheet, sealed by fastening the sheet with a metal clamp, then heated in an oven at 65° C. and allowed to react solvothermally for almost 6 days. The product was in the form of prismshaped single crystals.

Experimental and Refinement Details for ZIF-72.

A colorless prismatic crystal (0.18×0.16×0.15 mm3) of ZIF-72 was placed in a 0.7 mm diameter nylon CryoLoops (Hampton Research) with Paraton-N (Hampton Research). The loop was mounted on a SMART APEXII three circle diffractometer equipped with a CCD area detector and operated at 1200 W power (40 kV, 30 mA) to generate Cu Kα radiation (λ=1.5418 Å) while being flash frozen to 153(2) K in a liquid N2 cooled stream of nitrogen. A total of 10108 reflections were collected of which 264 were unique and 253 of these were greater than 2σ(I). The range of θ was from 5.51 to 45.09°. Analysis of the data showed negligible decay during collection. The structure was solved in the cubic Ia-3d space group with Z=2 using direct methods. Due to the low data to parameter ratio atom C1 has been refined isotropically with the attached hydrogen atom riding the coordinates of its parent atom. All other non-hydrogen atoms were refined anisotropically. Absorption correction by SADABS decreases R(int) to 0.0235. The absorption coefficient has a rather high value, μ=10.268. A final ratio of 8.2 for reflections to parameters was achieved. The unit cell of ZIF-72 reveals that the unit cell contains two 4,5-dichloroimidazoles per zinc [Zn(45DCIM)2]. Final full matrix leastsquares refinement on F2 converged to R1=0.0172 (F>2σF)) and $wR_2$=0.0371 (all data) with GOF=1.185.

| Crystal data and structure refinement ZIF-72. | |
|---|---|
| Empirical formula | C6 H2 Cl4 N4 Zn |
| Formula weight | 337.31 |
| Temperature | 153(2) K |
| Wavelength | 1.54178 Å |
| Crystal system | Cubic |
| Space group | Ia-3d |
| Unit cell dimensions | a = 19.6544(2) Å α = 90° |
| | b = 19.6544(2) Å β = 90° |
| | c = 19.6544(2) Å γ = 90° |
| Volume | 7592.40(13) |
| Z | 2 |
| Density (calculated) | 1.771 |
| Absorption coefficient | 10.268 |
| F(000) | 3936.0 |
| Crystal size | 0.18 × 0.16 × 0.15 mm$^3$ |
| Theta range for data collection | 5.51-45.09 |
| Index ranges | −18 <= h <= 17, −17 <= k <= 18, −18 <= l <= 17 |

| Crystal data and structure refinement ZIF-72. | |
|---|---|
| Reflections collected | 10108 |
| Independent reflections | 264 [Rint = 0.0235] |
| Completeness to theta = 45.09° | 100% |
| Absorption correction | Semi-empirical from equivalents |
| Refinement method | Full-matrix least-squares on $F^2$ |
| Data/restraints/parameters | 264/0/32 |
| Goodness-of-fit on $F^2$ | 1.183 |
| Final R indices [I > 2sigma(I)] | $R_1$ = 0.0172, $wR_2$ = 0.0371 |
| R indices (all data) | $R_1$ = 0.0162, $wR_2$ = 0.0367 |
| Largest diff. peak and hole | 0.114 and −0.140 e.Å$^{-3}$ |

(ZIF-73 frl): $Zn(nIM)_{1.74}(dmbIM)_{0.26}$.

0.12 mL 2-nitroimidazole stock solution (0.20 M, 2.4×10$^{-5}$ mol) and 0.12 mL 5,6-dimethylbenzimidazole stock solution (0.20 M, 0.90×10$^{-5}$ mol) was mixed together. To this solution was added 0.060 mL $Zn(NO_3)_2 \cdot 4H_2O$ stock solution (0.15 M, 0.90×10$^{-5}$ mol). After the glass plate was loaded with mixtures of stock solutions dispensed by a programmed liquid handler (Gilson, model 215), it was covered with a PTFE sheet, sealed by fastening the sheet with a metal clamp, then heated in an oven at 85° C. and allowed to react solvothermally for 72 h. The product was in the form of prism-shaped single crystals.

| Crystal data and structure refinement of ZIF-73 | |
|---|---|
| Empirical formula | C75.60 H57 N57.40 O34.80 Zn10 |
| Formula weight | 2980.29 |
| Temperature | 153(2) K |
| Wavelength | 1.54178 Å |
| Crystal system | Orthorhombic |
| Space group | Ibam |
| Unit cell dimensions | a = 10.9660(2) Å α = 90° |
| | b = 22.7960(4) Å β = 90° |
| | c = 24.9704(5) Å γ = 90° |
| Volume | 6242.1(2) |
| Z | 2 |
| Density (calculated) | 1.586 |
| Absorption coefficient | 2.891 |
| F(000) | 3186 |
| Crystal size | 0.29 × 0.16 × 0.12 mm$^3$ |
| Theta range for data collection | 3.54-63.58 |
| Index ranges | −12 <= h <= 12, −25 <= k <= 26, −28 <= l <= 28 |
| Reflections collected | 15847 |
| Independent reflections | 2639 [Rint = 0.0242] |
| Completeness to theta = 64.58° | 99.7% |
| Absorption correction | Semi-empirical from equivalents |
| Refinement method | Full-matrix least-squares on $F^2$ |
| Data/restraints/parameters | 2639/0/242 |
| Goodness-of-fit on $F^2$ | 1.115 |
| Final R indices [I > 2sigma(I)] | $R_1$ = 0.0322, $wR_2$ = 0.0882 |
| R indices (all data) | $R_1$ = 0.0366, $wR_2$ = 0.0902 |
| Largest diff. peak and hole | 0.824 and −0.241 e.Å$^{-3}$ |

| ZIF-73 SQEEZE | |
|---|---|
| Empirical formula | C82.60 H57 N61.40 O38.80 Zn10 |
| Formula weight | 3184.40 |
| Temperature | 153(2) K |
| Wavelength | 1.54178 Å |
| Crystal system | Orthorhombic |
| Space group | Ibam |
| Unit cell dimensions | a = 10.9660(2) Å α = 90° |
| | b = 22.7960(4) Å β = 90° |
| | c = 24.9704(5) Å γ = 90° |
| Volume | 6242.1(2) |
| Z | 2 |
| Density (calculated) | 1.694 |

| ZIF-73 SQUEEZE | |
|---|---|
| Absorption coefficient | 2.973 |
| F(000) | 2982 |
| Crystal size | 0.29 × 0.16 × 0.12 mm³ |
| Theta range for data collection | 3.54-63.58 |
| Index ranges | −12 <= h <= 12, −25 <= k <= 26, −28 <= l <= 28 |
| Reflections collected | 15847 |
| Independent reflections | 2639 [Rint = 0.0242] |
| Completeness to theta = 64.58° | 99.7% |
| Absorption correction | Semi-empirical from equivalents |
| Refinement method | Full-matrix least-squares on $F^2$ |
| Data/restraints/parameters | 2639/0/263 |
| Goodness-of-fit on $F^2$ | 1.146 |
| Final R indices [I > 2sigma(I)] | $R_1$ = 0.0396, $wR_2$ = 0.1185 |
| R indices (all data) | $R_1$ = 0.0443, $wR_2$ = 0.1214 |
| Largest diff. peak and hole | 0.778 and −0.451 e.Å⁻³ |

(ZIF-74 gis): Zn(nIM)(dmbIM).

0.18 mL 2-nitroimidazole stock solution (0.20 M, 3.6×10⁻⁵ mol) and 0.060 mL 5,6-dimethylbenzimidazole stock solution (0.20 M, 1.2×10⁻⁵ mol) was mixed together. To this solution was added 0.060 mL $Zn(NO_3)_2.4H_2O$ stock solution (0.15 M, 0.90×10⁻⁵ mol). After the glass plate was loaded with mixtures of stock solutions dispensed by a programmed liquid handler (Gilson, model 215), it was covered with a PTFE sheet, sealed by fastening the sheet with a metal clamp, then heated in an oven at 85° C. and allowed to react solvothermally for 5 days. The product was in the form of rod-shaped single crystals. Elemental analysis $C_{12}H_{13}N_5O_2Zn$=Zn(NO₂IM)(5,6Me₂PhIM): Calcd. C, 39.28; H, 5.36; N, 28.65. Found C, 39.47; H, 4.39; N, 27.13. FT-IR: (KBr 4000-400 cm−1): 3445 (br), 3429 (w), 3108 (w), 2762 (w), 1958 (w), 1611 (s), 1469 (m), 1342 (w), 1286 (w), 1092 (w), 939 (w), 802 (w), 669 (w), 603 (s).

Experimental and Refinement Details for ZIF-74.

A colorless prismic crystal (0.24×0.21×0.19 mm3) of ZIF-74 was placed in a 0.7 mm diameter nylon Cryo-Loops (Hampton Research) with Paraton-N (Hampton Research). The loop was mounted on a SMART APEXII three circle diffractometer equipped with a CCD area detector and operated at 1200 W power (40 kV, 30 mA) to generate Cu Kα radiation (λ=1.5418 Å) while being flash frozen to 153(2) K in a liquid N2 cooled stream of nitrogen. A total of 13589 reflections were collected of which 2492 were unique and 2241 of these were greater than 2σ(I). The range of θ was from 3.35 to 64.35°. Analysis of the data showed negligible decay during collection. The structure was solved in the tetragonal I41/a space group, with Z=8, using direct methods. Atoms O1 and O2 were found to be disordered and were refined anisotropically with the occupancy for each group modeled as its own independent free variable (X, 1–X). All other nonhydrogen atoms were refined anisotropically with hydrogen atoms generated as spheres riding the coordinates of their parent atoms. It is probable that N5, which is bonded to the disordered oxygen atoms O1 and O2, also could be modeled in two sites. However, overlap for these N5 positions are too great and as a result N5 has been described as a single atom with full occupancy (and consequently a rather high Ueq). C10, is expected to have Ueq values similar to the rest of the five membered imidazole ring rather than similar to the Ueq values for N5 of the NO2 ring. Modeling of electron density within the voids of the frameworks lead to the identification of a DMF guest disordered about two positions which has been refined isotropically with the hydrogen atoms for the CHO functionality omitted. The unit cell of ZIF-74 contains one 5,6-dimethyl benzimidazole and one 2-nitro imidazole (1:1) per zinc. Final full matrix least-squares refinement on F2 converged to R1=0.0440 (F>2σF)) and wR₂=0.1292 (all data) with GOF=1.097.

| Crystal data and structure refinement of ZIF-74 | |
|---|---|
| Empirical formula | C27 H28 N11 O5 Zn2 |
| Formula weight | 717.34 |
| Temperature | 153(2) K |
| Wavelength | 1.54178 Å |
| Crystal system | Tetragonal |
| Space group | I4₁/a |
| Unit cell dimensions | a = 16.6703(2) Å α = 90° |
| | b = 16.6703(2) Å β = 90° |
| | c = 21.6026(6) Å γ = 90° |
| Volume | 6003.2(3) |
| Z | 8 |
| Density (calculated) | 1.574 |
| Absorption coefficient | 2.458 |
| F(000) | 2936 |
| Crystal size | 0.24 × 0.21 × 0.19 mm³ |
| Theta range for data collection | 3.35-64.35 |
| Index ranges | −19 <= h <= 16, −16 <= k <= 18, −24 <= l <= 21 |
| Reflections collected | 13589 |
| Independent reflections | 2492 [Rint = 0.0242] |
| Completeness to theta = 64.35° | 98.4% |
| Absorption correction | Semi-empirical from equivalents |
| Refinement method | Full-matrix least-squares on $F^2$ |
| Data/restraints/parameters | 2492/4/230 |
| Goodness-of-fit on $F^2$ | 1.097 |
| Final R indices [I > 2sigma(I)] | $R_1$ = 0.0440, $wR_2$ = 0.1292 |
| R indices (all data) | $R_1$ = 0.0488, $wR_2$ = 0.1336 |
| Largest diff. peak and hole | 1.372 and −0.517 e.Å⁻³ |

(ZIF-75 gis): Co(nIM)(dmbIM).

0.12 mL imidazole stock solution (0.15 M, 1.8×10⁻⁵ mol) and 0.12 mL 5,6-dimethylbenzimidazole stock solution (0.15 M, 0.90×10⁻⁵ mol) was mixed together. To this solution was added 0.060 mL Co(NO3)2.6H2O stock solution (0.15 M, 0.90×10⁻⁵ mol). After the glass plate was loaded with mixtures of stock solutions dispensed by a programmed liquid handler (Gilson, model 215), it was covered with a PTFE sheet, sealed by fastening the sheet with a metal clamp, then heated in an oven at 85° C. and allowed to react solvothermally for 5 days. The product was in the form of pink colored rod-shaped single crystals.

Experimental and Refinement Details for ZIF-75.

A pink colored prismic crystal (0.24×0.21×0.19 mm3) of ZIF-75 was placed in a 0.7 mm diameter nylon Cryo-Loops (Hampton Research) with Paraton-N (Hampton Research). The loop was mounted on a SMART APEXII three circle diffractometer equipped with a CCD area detector and operated at 1200 W power (40 kV, 30 mA) to generate Cu Kα radiation (λ=1.5418 Å) while being flash frozen to 153(2) K in a liquid N2 cooled stream of nitrogen. A total of 9066 reflections were collected of which 1209 were unique and 1104 of these were greater than 2σ(I). The range of θ was from 3.35 to 44.98°. Analysis of the data showed negligible decay during collection. However a high μ=9.195 and a low data to parameter ratio (6.08) is notable. The structure was solved in the tetragonal I41/a space group, with Z=4, using direct methods. Atoms O1 and O2 were found to be disordered and were refined isotropically with the occupancy for each group modeled as its own independent free variable (X, 1–X). All other non-hydrogen atoms were refined anisotropically with hydrogen atoms generated as spheres riding the coordinates of their parent atoms. Modeling of electron density within the voids of the frameworks does not lead to the identification of any guest molecule. Thus, electron density within void spaces, which could not be assigned to any definite guest entity, was modeled as isolated oxygen and carbon atoms, and the foremost errors in all the models lies with assignment of guest electron density. The unit cell of ZIF-75 contains one 5,6-dimethylbenzimidazole and one 2-nitroimidazole (1:1) per zinc. Final full matrix leastsquares refinement on F2 converged to R1=0.0574 (F>2σF)) and $wR_2$=0.1476 (all data) with GOF=1.037.

| Crystal data and structure refinement of ZIF-75 | |
| --- | --- |
| Empirical formula | C50 H44 Co4 N20 O14 |
| Formula weight | 717.34 |
| Temperature | 153(2) K |
| Wavelength | 1.54178 Å |
| Crystal system | Tetragonal |
| Space group | $I4_1/a$ |
| Unit cell dimensions | a = 16.6695(2) Å α = 90° |
| | b = 16.6695(2) Å β = 90° |
| | c = 21.5797(5) Å γ = 90° |
| Volume | 5996.4(2) |
| Z | 4 |
| Density (calculated) | 1.534 |
| Absorption coefficient | 9.195 |
| F(000) | 2816 |
| Crystal size | 0.24 × 0.21 × 0.19 mm³ |
| Theta range for data collection | 3.35-44.98 |
| Index ranges | −14 <= h <= 15, −14 <= k <= 15, −19 <= l <= 18 |
| Reflections collected | 9066 |
| Independent reflections | 1209 [Rint = 0.0242] |
| Completeness to theta = 64.55° | 98.9% |
| Absorption correction | Semi-empirical from equivalents |
| Refinement method | Full-matrix least-squares on $F^2$ |
| Data/restraints/parameters | 1209/14/199 |
| Goodness-of-fit on $F^2$ | 1.037 |
| Final R indices [I > 2sigma(I)] | $R_1$ = 0.0574, $wR_2$ = 0.1476 |
| R indices (all data) | $R_1$ = 0.0624, $wR_2$ = 0.1520 |
| Largest diff. peak and hole | 0.521 and −0.292 e.Å⁻³ |

(ZIF-76 Ita): Zn(IM)(cbIM).

0.15 mL imidazole stock solution (0.15 M, 2.25×10⁻⁵ mol) and 0.075 mL 5-chlorobenzimidazole stock solution (0.15 M, 1.13×10⁻⁵ mol) was mixed together. To this solution was added 0.075 mL Zn(NO$_3$)$_2$.4H$_2$O stock solution (0.15 M, 1.12×10⁻⁵ mol). After the glass plate was loaded with mixtures of stock solutions dispensed by a programmed liquid handler (Gilson, model 215), it was covered with a PTFE sheet, sealed by fastening the sheet with a metal clamp, then heated in an oven at 65° C. and allowed to react solvothermally for 5 days. The product was in the form of hexagon-shaped single crystals. Elemental analysis $C_8H_{13}N_5Zn$=Zn(IM)$_{1.5}$(5ClPhIM)$_{0.5}$.(H$_2$O)$_4$: Calcd. C, 33.96; H, 5.57; N, 18.05. Found C, 33.27; H, 5.39; N, 18.13. Elemental analysis (activated) $C_8H_{13}N_5Zn$=Zn(IM)$_{1.5}$(5ClPhIM)$_{0.5}$: Calcd. C, 39.28; H, 5.36; N, 28.65. Found C, 39.47; H, 4.39; N, 27.13. FT-IR: (KBr 4000-400 cm⁻¹): 3445 (br), 3429 (w), 3108 (w), 2762 (w), 1958 (w), 1611 (s), 1469 (m), 1342 (w), 1286 (w), 1092 (w), 939 (w), 802 (w), 669 (w), 603 (s).

Experimental and Refinement Details for ZIF-76.

A colorless prismatic crystal (0.25×0.20×0.18 mm3) of ZIF-76 was placed in a 0.7 mm diameter nylon Cryo-Loops (Hampton Research) with Paraton-N (Hampton Research). The loop was mounted on a SMART APEXII three circle diffractometer equipped with a CCD area detector and operated at 1200 W power (40 kV, 30 mA) to generate Cu Kα radiation (λ=1.5418 Å) while being flash frozen to 153(2) K in a liquid N2 cooled stream of nitrogen. A total of 29357 reflections were collected of which 1170 were unique and 1018 of these were greater than 2σ(I). The range of θ was from 3.90 to 37.47°. Analysis of the data showed negligible decay during collection. The structure was solved in the cubic P-43m space group, with Z=24, using direct methods. Although a partial structural solution was found in space group Pm-3m but a better refinement was achieved in space group P-43m. All non-hydrogen atoms except zinc were refined isotropically with hydrogen atoms generated as spheres riding the coordinates of their parent atoms. The attempts made to model the guests (solvent molecules) did not lead to identification of guest entities in all structures due to the limited periodicity of the solvent molecules in the crystals. Since the solvent is neither bonded nor fits tightly in the framework disordered solvent molecules can be expected for the MOF structures. Many atomic co-ordinates that have been attributed to solvent molecules lie on a special position. However, very high displacement parameters, high esd's and partial occupancy due to the disorder make it impossible to determine accurate positions for these solvent molecules. Thus, electron density within void spaces which could not be assigned to any definite guest entity has been modeled as isolated carbon and oxygen atoms, and the foremost errors in all the models lie in the assignment of the guest electron density. ZIF-76 is composed of 1.5 imidazole and 0.5 monochloro-benzimidazole per Zn. The larger linker 5-chlorobenzimidazole occurs in two different linker positions, at half occupancy in each. In these positions, the other half occupant is imidazole and the imidazole cycle perfectly overlaps the imidazole moiety of the larger linker. The contents of the crystal agree well with the elemental analysis of the bulk sample (3 imidazole and 1 chlorobenzimidazole tetrahedrally coordinated to a Zn atom). The benzimidazole must have half occupancy (or less) because full occupancy in either position would require two crystallographically related benzimidazole linkers to approach each other too closely. The linkers in the remaining two positions are fully occupied by unsubstituted imidazole. The framework is further complicated by a disorder involving three of the four linkers. Rotation of 60 degrees about one of the N—Zn bonds (N1-Zn1) gives a second nitrogen triangle involving the other three Zn—N bonds. Still another disorder results because the chlorine atom of the chlorobenzene is randomly (50%) bonded to either of the two possible ring carbon atoms. Three of the four imidazole positions are located about mirror planes; two chlorine atom positions of an imidazole are related by mirror symmetry, although of course only one of these positions is filled for any given imidazole. It should be noted that the precision of this model is low; however, the structure is reported to describe the ZIF-76 framework. Other supporting characterization data (vide infra Materials and Methods) agree with crystal structure. To assess the correctness of the atomic positions in the framework the application of the SQUEEZE routine of A. Spek has been applied. However atomic co-ordinates for the "non-SQUEEZE" structures are also presented. The unit cell of ZIF-76 contains 1.5 imidazole and 0.5 5-chlorobenzimidazole imidazole per zinc. Final full matrix least-squares refinement on F2 converged to R1=0.0854 (F>2σF)) and $wR_2$=0.2376 (all data) with GOF=1.136. For the structure where the SQUEEZE program has not been employed, final full matrix least-squares refinement on F2 converged to R1=0.1108 (F>2Fσ)) and wR1=0.3072 (all data) with GOF=1.542. When only framework atoms are included in the latter structure factor calculation, the residual electron density in the F-map is located within the pores of ZIF-76.

| Crystal data and structure refinement of ZIF-76 | |
|---|---|
| Empirical formula | C7.69 H3.58 Cl0.42 N2.78ZN0.67 |
| Formula weight | 193.29 |
| Temperature | 153(2) K |
| Wavelength | 1.54178 Å |
| Crystal system | Cubic |
| Space group | P-43m |
| Unit cell dimensions | a = 22.6702(3) Å α = 90° |
| | b = 22.6702(3) Å β = 90° |
| | c = 22.6702(3) Å γ = 90° |
| Volume | 11651.08(18) |
| Z | 24 |
| Density (calculated) | 0.992 |
| Absorption coefficient | 2.462 |
| F(000) | 3466 |
| Crystal size | 0.25 × 0.20 × 0.18 mm$^3$ |
| Theta range for data collection | 2.76-37.26 |
| Index ranges | $-17 <= h <= 17, -17 <= k <=$ |
| | $17, -17 <= l <= 17$ |
| Reflections collected | 29357 |
| Independent reflections | 1170 [Rint = 0.0751] |
| Completeness to theta = 37.47° | 98.9% |
| Absorption correction | Semi-empirical from equivalents |
| Refinement method | Full-matrix least-squares on F$^2$ |
| Data/restraints/parameters | 1170/24/150 |
| Goodness-of-fit on F$^2$ | 1.542 |
| Final R indices [I > 2sigma(I)] | $R_1 = 0.1108, wR_2 = 0.3072$ |
| R indices (all data) | $R_1 = 0.1190, wR_2 = 0.3200$ |
| Largest diff. peak and hole | 0.748 and −0.524 e.Å$^{-3}$ |

| ZIF-76 SQUEEZE | |
|---|---|
| Empirical formula | C5.83 H3.58 Cl0.42 N2.67 |
| Formula weight | 169.38 |
| Temperature | 153(2) K |
| Wavelength | 1.54178 Å |
| Crystal system | Cubic |
| Space group | P-43m |
| Unit cell dimensions | a = 22.6702(3) Å α = 90° |
| | b = 22.6702(3) Å β = 90° |
| | c = 22.6702(3) Å γ = 90° |
| Volume | 11651.08(18) |
| Z | 24 |
| Density (calculated) | 0.869 |
| Absorption coefficient | 2.404 |
| F(000) | 3036 |
| Crystal size | 0.25 × 0.20 × 0.18 mm$^3$ |
| Theta range for data collection | 2.76-37.26 |
| Index ranges | $-17 <= h <= 17, -17 <= k <=$ |
| | $17, -17 <= l <= 17$ |
| Reflections collected | 29357 |
| Independent reflections | 1170 [Rint = 0.0751] |
| Completeness to theta = 37.47° | 98.9% |
| Absorption correction | Semi-empirical from equivalents |
| Refinement method | Full-matrix least-squares on F$^2$ |
| Data/restraints/parameters | 1170/24/150 |
| Goodness-of-fit on F$^2$ | 1.542 |
| Final R indices [I > 2sigma(I)] | $R_1 = 0.0854, wR_2 = 0.2376$ |
| R indices (all data) | $R_1 = 0.0884, wR_2 = 0.2430$ |
| Largest diff. peak and hole | 0.819 and −0.315 e.Å$^{-3}$ |

(ZIF-77 frl): $Zn(nIM)_2$.

To a 0.26 mL 2-nitroimidazole stock solution (0.20 M, 5.2×10$^{-5}$ mol) 0.060 mL Zn(NO$_3$)$_2$·4H$_2$O stock solution (0.20 M, 1.2×10$^{-5}$ mol) was added. After the glass plate was loaded with mixtures of stock solutions dispensed by a programmed liquid handler (Gilson, model 215), it was covered with a PTFE sheet, sealed by fastening the sheet with a metal clamp, then heated in an oven at 100° C. and allowed to react solvothermally for 72 h. The product was in the form of prism-shaped single crystals.

Experimental and Refinement Details for ZIF-77.

A pink colorless cubic crystal (0.24×0.21×0.20 mm3) of ZIF-77 was placed in a 0.7 mm diameter nylon Cryo-Loops (Hampton Research) with Paraton-N (Hampton Research). The loop was mounted on a SMART APEXII three circle diffractometer equipped with a CCD area detector and operated at 1200 W power (40 kV, 30 mA) to generate Cu Kα radiation (λ=1.5418 Å) while being flash frozen to 153(2) K in a liquid N2 cooled stream of nitrogen. A total of 13528 reflections were collected of which 1950 were unique and 1939 of these were greater than 2σ(I). The range of θ was from 3.35 to 54.23°. Analysis of the data showed negligible decay during collection. However a high μ=3.058 (because μ is based on atomic contents and this is uncertain because of the guest this number is quite imprecise) and a rather low data to parameter ratio (8.23) should be noted. The structure was solved in the orthorhombic Ibam space group, with Z=2, using direct methods. All non-hydrogen atoms in the framework were refined anisotropically with hydrogen atoms generated as spheres riding the coordinates of their parent atoms. Modeling of electron density within the voids of the frameworks leads to the identification of one DMF as a guest molecule. However the other electron density within void spaces, which could not be assigned to any definite guest entity, was modeled as oxygen and carbon atoms, and the foremost errors in all the models lie with assignment of guest electron density. The unit cell of ZIF-77 contains two 2-nitroimidazole links per zinc. Final full matrix least-squares refinement on F2 converged to R1=0.0434 (F>2σF)) and wR$_2$=0.1267 (all data) with GOF=1.190.

| Crystal data and structure refinement ZIF-77 | |
|---|---|
| Empirical formula | C75 H52 N62 O47 Zn10 |
| Formula weight | 3227.69 |
| Temperature | 153(2) K |
| Wavelength | 1.54178 Å |
| Crystal system | Orthorhombic |
| Space group | Ibam |
| Unit cell dimensions | a = 11.1248(6) Å α = 90° |
| | b = 22.3469(12) Å β = 90° |
| | c = 24.9087(14) Å γ = 90° |
| Volume | 6192.4(6) |
| Z | 2 |
| Density (calculated) | 1.731 |
| Absorption coefficient | 3.058 |
| F(000) | 3224 |
| Crystal size | 0.24 × 0.21 × 0.20 mm$^3$ |
| Theta range for data collection | 3.55-54.23 |
| Index ranges | $-11 <= h <= 11, -22 <= k <=$ |
| | $23, -26 <= l <= 22$ |
| Reflections collected | 13528 |
| Independent reflections | 1950 [Rint = 0.0175] |
| Completeness to theta = 54.23° | 99.7% |
| Absorption correction | Semi-empirical from equivalents |
| Refinement method | Full-matrix least-squares on F$^2$ |
| Data/restraints/parameters | 1950/0/237 |
| Goodness-of-fit on F$^2$ | 1.190 |
| Final R indices [I > 2sigma(I)] | $R_1 = 0.0434, wR_2 = 0.1267$ |
| R indices (all data) | $R_1 = 0.0438, wR_2 = 0.1286$ |
| Largest diff. peak and hole | 1.103 and −0.388 e.Å$^{-3}$ |

Powder X-ray diffraction (PXRD) data were collected using a Bruker D8Advance θ-2θ diffractometer in reflectance Bragg-Brentano geometry employing Ni filtered Cu Kα line focused radiation at 1600 W (40 kV, 40 mA) power and equipped with a Na(Tl) scintillation detector fitted a 0.2 mm radiation entrance slit. All samples were ground to ensure mono-dispersity in the bulk, then mounted onto a zero-background sample holder by dropping powders from a wide-blade spatula and then leveling the sample surface with a razor blade. The best counting statistics were achieved by using a 0.02° 2θ step scan from 1.5-60° with an exposure time of 10 s per step.

Comparison of positions and indices of diffraction lines in the experimental and simulated PXRD patterns of ZIF-1 (crb). Deviations from perfect correspondence primarily arise from difference in data collection temperatures (cryogenic for single crystal data and room temperature for bulk powder):

| Observed PXRD | | Simulated PXRD | | Indices |
|---|---|---|---|---|
| 2-Theta | d | 2-Theta | d | hkl |
| 10.16 | 8.698 | 10.18 | 8.684 | −101 |
| 11.19 | 7.899 | 11.71 | 7.548 | −1-11 |
| 11.93 | 7.384 | 11.98 | 7.384 | 002 |
| 12.96 | 6.825 | 13.05 | 6.781 | 021 |
| 13.26 | 6.674 | 13.31 | 6.647 | 012 |
| 15.02 | 5.893 | 15.12 | 5.852 | −112 |
| 15.39 | 5.753 | 15.44 | 5.733 | −1-21 |
| 16.42 | 5.394 | 16.48 | 5.373 | 121 |
| 16.64 | 5.323 | 16.69 | 5.307 | 022 |
| 17.23 | 5.142 | 17.19 | 5.155 | 112 |
| 18.34 | 4.835 | 18.41 | 4.815 | 200 |
| 25.04 | 3.554 | 25.08 | 3.548 | 140 |

Comparison of positions and indices of diffraction lines in the experimental and simulated PXRD patterns of ZIF-4 (cag). Deviations from perfect correspondence primarily arise from difference in data collection temperatures (cryogenic for single crystal data and room temperature for bulk powder):

| Observed PXRD | | Simulated PXRD | | Indices |
|---|---|---|---|---|
| 2-Theta | d | 2-Theta | d | hkl |
| 9.38 | 9.420 | 9.45 | 9.353 | 111 |
| 11.03 | 8.019 | 11.18 | 7.906 | 102 |
| 11.37 | 7.778 | 11.55 | 7.654 | 020 |
| 12.53 | 7.058 | 12.51 | 7.068 | 021 |
| 12.60 | 7.020 | 12.59 | 7.024 | 112 |
| 13.63 | 6.493 | 13.77 | 6.423 | 121 |
| 14.86 | 5.957 | 14.98 | 5.907 | 202 |
| 16.09 | 5.503 | 16.07 | 5.511 | 212 |
| 16.50 | 5.367 | 16.57 | 5.345 | 113 |
| 16.84 | 5.259 | 17.01 | 5.206 | 221 |
| 18.22 | 4.866 | 18.51 | 4.790 | 023 |
| 18.76 | 4.726 | 18.85 | 4.704 | 311 |
| 19.24 | 4.609 | 19.25 | 4.606 | 004 |

Comparison of positions and indices of diffraction lines in the experimental and simulated PXRD patterns of ZIF-7 (sod). Deviations from perfect correspondence primarily arise from difference in data collection temperatures (cryogenic for single crystal data and room temperature for bulk powder):

| Observed PXRD | | Simulated PXRD | | Indices |
|---|---|---|---|---|
| 2-Theta | d | 2-Theta | d | hkl |
| 7.12 | 12.413 | 7.14 | 12.358 | −111 |
| 7.60 | 11.629 | 7.68 | 11.494 | 110 |
| 12.16 | 7.271 | 12.07 | 7.329 | 012 |
| 13.21 | 6.691 | 13.33 | 6.636 | 030 |
| 15.29 | 5.791 | 15.41 | 5.747 | 220 |
| 16.25 | 5.450 | 16.27 | 5.443 | −132 |
| 18.61 | 4.765 | 18.55 | 4.779 | 113 |
| 19.57 | 4.533 | 19.61 | 4.522 | 312 |
| 21.11 | 4.206 | 21.09 | 4.208 | 042 |
| 21.64 | 4.104 | 21.55 | 4.119 | −333 |
| 22.93 | 3.875 | 22.91 | 3.878 | −243 |
| 31.78 | 2.814 | 31.87 | 2.806 | −663 |

Comparison of positions and indices of diffraction lines in the experimental and simulated PXRD patterns of ZIF-8 (sod). Deviations from perfect correspondence primarily arise from difference in data collection temperatures (cryogenic for single crystal data and room temperature for bulk powder).

| Observed PXRD | | Simulated PXRD | | Indices |
|---|---|---|---|---|
| 2-Theta | d | 2-Theta | d | hkl |
| 7.31 | 12.085 | 7.35 | 12.015 | 011 |
| 10.24 | 8.629 | 10.40 | 8.496 | 002 |
| 12.65 | 6.994 | 12.75 | 6.937 | 112 |
| 14.67 | 6.035 | 14.73 | 6.007 | 022 |
| 16.03 | 5.433 | 16.48 | 5.373 | 013 |
| 17.84 | 4.905 | 18.07 | 4.905 | 222 |
| 22.02 | 4.033 | 22.18 | 4.005 | 114 |
| 24.38 | 3.648 | 24.55 | 3.623 | 233 |
| 26.64 | 3.343 | 26.73 | 3.332 | 134 |
| 29.72 | 3.004 | 29.72 | 3.004 | 044 |
| 30.44 | 2.934 | 30.65 | 2.914 | 334 |
| 31.69 | 2.821 | 31.57 | 2.832 | 244 |
| 32.41 | 2.760 | 32.46 | 2.756 | 235 |

Comparison of positions and indices of diffraction lines in the experimental and simulated PXRD patterns of ZIF-11 (rho). Deviations from perfect correspondence primarily arise from difference in data collection temperatures (cryogenic for single crystal data and room temperature for bulk powder).

| Observed PXRD | | Simulated PXRD | | Indices |
|---|---|---|---|---|
| 2-Theta | d | 2-Theta | d | Hkl |
| 3.09 | 28.564 | 3.07 | 28.759 | 001 |
| 4.31 | 20.466 | 4.34 | 20.336 | 011 |
| 6.03 | 14.655 | 6.14 | 14.380 | 002 |
| 7.53 | 11.727 | 7.52 | 11.741 | 112 |
| 8.63 | 10.240 | 8.69 | 10.168 | 022 |
| 9.72 | 9.089 | 9.72 | 9.095 | 013 |
| 11.09 | 7.970 | 11.08 | 7.977 | 023 |
| 12.33 | 7.175 | 12.30 | 7.190 | 004 |
| 12.74 | 6.945 | 12.68 | 6.975 | 223 |
| 13.01 | 6.799 | 13.05 | 6.779 | 033 |
| 13.83 | 6.3971 | 13.76 | 6.431 | 024 |
| 15.75 | 5.622 | 15.70 | 5.640 | 015 |
| 17.05 | 5.196 | 17.42 | 5.084 | 044 |
| 18.42 | 4.813 | 18.50 | 4.793 | 006 |

ZIF-7, 8, and 11 were tested for their stability in benzene, methanol and water. These solvents were chosen to compare the relative effects of non-polar to polar solvents. The tests were performed at room temperature, 50° C. and at the boiling point of each solvent (methanol 65° C., benzene 80° C. and water 100° C.) for up to 7 days. The structural stability of the frameworks were monitored by aliquoting portions of the samples for PXRD analysis after every 24 h period.

All samples were run on a TA Instruments Q-500 series thermal gravimetric analyzer with samples held in platinum pans in a continuous flow nitrogen atmosphere. Samples were heated at a constant rate of 5° C./min during all TGA experiments.

Treatment with methanol or dichloromethane simplified the thermogravimetric behavior of ZIF-8, indicative of effective solvent-exchange. In particular, in the TGA trace of methanol-exchanged ZIF-8 sample, the original gradual weight-loss step of 28.3% up to 450° C. were replaced by a very small initial step at near-ambient temperature, a plateau up to 200° C. and a gradual step of 7.6% in the temperature range 200-450° C. ZIF-11 could be much more effectively solvent-exchanged, in the case of methanol-exchanged sample whose TGA trace only showed a tiny weight-loss step of 0.4% in the temperature range 150-250° C. Once again, ZIF-11 appears to be a more dynamic structure than ZIF-8.

All low-pressure gas-sorption experiments (up to 1 atm) were performed on a Quantachrome Autosorb-1C automatic volumetric instrument. High-pressure hydrogen sorption experiments (up to 80 bar) were performed on a VTI HPA-100 volumetric instrument equipped with a home-made liquid nitrogen cooling system to sustain a constant coolant bath level. The compressibility factors of high-pressure gases were determined by using the NIST RefProp program (version 7.0) and the NIST Standard Reference Data Base 23 (for details of high-pressure hydrogen sorption measurements, see Wong-Foy, A. G., Matzger, A. J. & Yaghi, O. M. (2006) *J. Am. Chem. Soc.* 128, 3494-3495).

Figure 35:
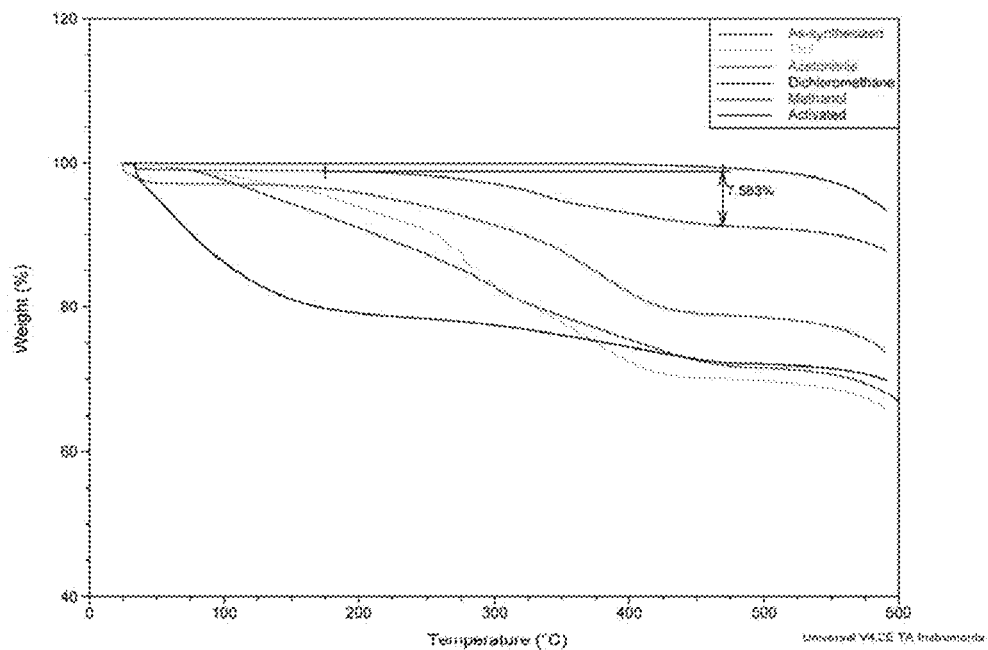
FIG. 35 shows The overlay of TGA traces of as-synthesized, solvent-exchanged, and evacuated (activated) samples of (a) ZIF-8 and (b) ZIF-11.
Figure 35:
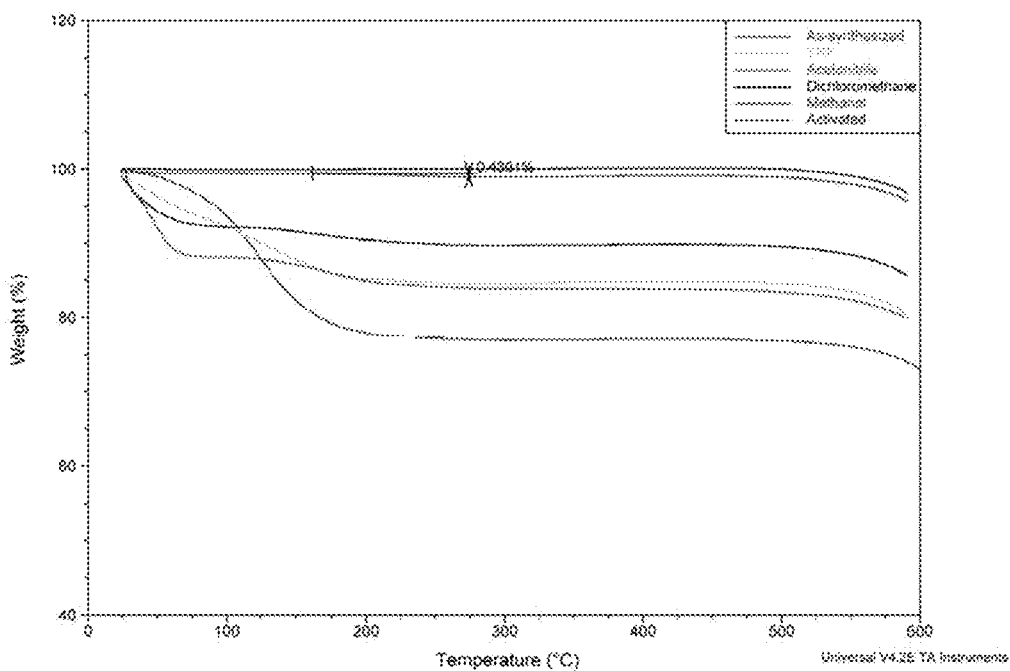

In light of the TGA results shown in the previous section, ZIF-8 and ZIF-11 were evacuated in the following way prior to gas-sorption analysis. The as-synthesized ZIF samples were immersed in methanol at ambient temperature for 48 h, evacuated at ambient temperature for 5 h, then at an elevated temperature (300° C. for ZIF-8, 180° C. for ZIF-11) for 2 h. ZIF samples thus obtained were optimally evacuated, as evidenced by their well-maintained PXRD patterns and the long plateau (ambient temperature to 550° C.) in their TGA traces, shown in FIG. 35.

The microporous nature of evacuated ZIF-8 was proven by this compound's Type I nitrogen sorption isotherm. In the logarithmic-scale plot of the same isotherm, two consecutive N2 uptake steps in the micropore region were revealed, occurring at $P/P0=1\times10^{-4}$-$2\times10^{-3}$ and $5\times10^{-3}$-$1\times10^{-2}$, respectively. The two-step feature was found in the argon sorption isotherm at 87 K for ZIF-8 as well. Interestingly, the two steps in the argon isotherm were much more separated, occurring at $P/P0=1\times10^{-3}$-$3\times10^{-3}$ and 0.25-0.35, respectively. With the latter step being a quite steep hysteresis loop, this argon isotherm should be classified as a typical Type IV. However, the hysteresis loop cannot be explained by capillary condensation of argon into mesopores because of its low closure point, and more importantly, because of the lack of any step and hysteresis feature in the mesopore range of the nitrogen isotherm for ZIF-8. Neither is it plausible to attribute the two-step features to a change in the structure of ZIF-8 that allows further accommodation of significant amount of gas molecules because such effect was not observed in ZIF-11, which has been shown to be a more dynamic structure than ZIF-8 at elevated temperatures or in solvents. Therefore, the two-step features in both nitrogen and argon isotherms as a result of a rearrangement of the adsorbed gas molecules occurred at a certain threshold pressure, and this effect is significant in the case of ZIF-8 because its aperture size is very close to the sizes of nitrogen and argon molecules. Further, the large difference between the threshold pressures for the second steps in nitrogen and argon isotherms could be due to the different polarizabilities and molecular shapes of nitrogen and argon, which in turn determine how the adsorbed gas molecules distribute and rearrange after the completion of the first steps.

Apparent surface areas of 1,810 $m^2/g$ (Langmuir) and 1,630 $m^2/g$ (BET) for ZIF-8 were obtained by using the data points on the adsorption branch in the range of $P/P0=0.01$-$0.10$, and a micropore volume of 0.636 $cm^3/g$ for ZIF-8 was obtained based on a single data point at $P/P0=0.10$. The linearity of fitting to Langmuir equation is 1.000000, to BET equation is 0.999710, and the C constant derived from BET equation is -663. Therefore, Langmuir model appears to be more suitable for evaluating the surface area of ZIF-8.

Using the data points on the nitrogen isotherm in the range of $P/P0=7\times10^{-4}$-$4\times10^{-3}$, i.e. at the completion of the first step, a Langmuir surface area of 1334 $m^2/g$ (linearity 0.999997), a BET surface area of 1328 $m^2/g$ (linearity 0.999998, C constant 3900), and a micropore volume of 0.443 $cm^3/g$ (at $P/P0=4\times10^{-3}$) were obtained. Using the data points on the argon isotherm in the range of $P/P0=5\times10^{-3}$-$5\times10^{-2}$, i.e. at the completion of the first step, a Langmuir surface area of 1430 $m^2/g$ (linearity 0.999996), a BET surface area of 1353 $m^2/g$ (linearity 0.999961, C constant -7890), and a micropore volume of 0.481 (at $P/P0=0.10$) were obtained. The values derived from nitrogen isotherm and argon isotherm match well. Using a single data point on the adsorption branch of argon isotherm at $P/P0=0.42$, i.e. at the completion of the second step, a micropore volume of 0.656 $cm^3/g$ was obtained. Again, the value matches the one derived from the counterparts in the nitrogen isotherm. These calculations show the similarity between the two-step features in nitrogen and argon isotherms.

Figure 36:
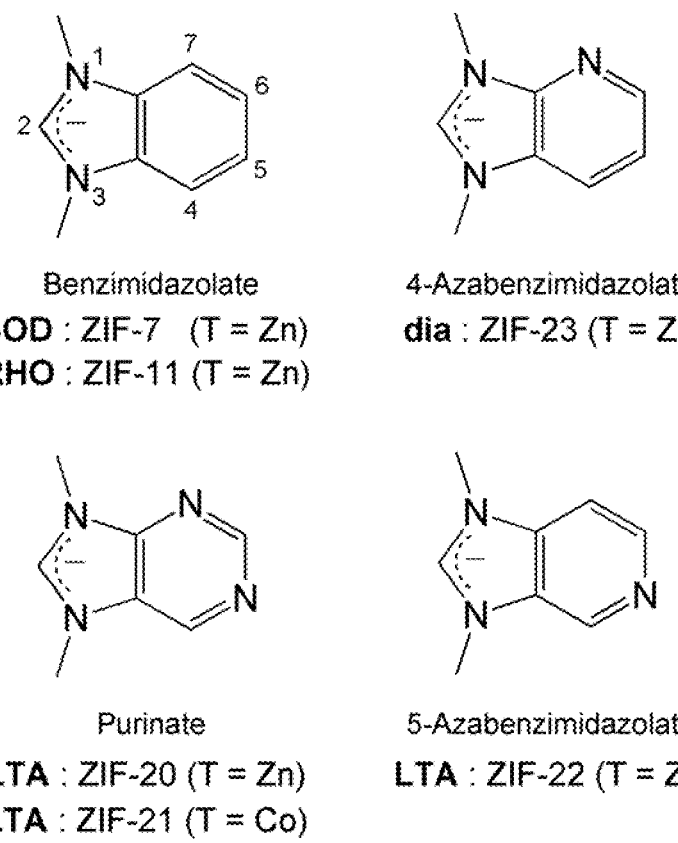
FIG. 36 depicts the position of the nitrogen atoms in the imidazolate-type linkers is significant in the selection of which zeolite imidazolate framework (ZIF) topology (SOD, RHO, dia, and LTA) is produced. The numbering of all linkers is the same as indicated for benzimidazolate.

For materials with both the RHO and SOD zeolite topologies, the same framework composition is obtained using benzimidazolate as a linker (FIG. 36). In each of these structures there is one type of cage. In efforts to prepare a ZIF with zeolite A (LTA) topology, which has two type of cages (α and β), replacing key carbon atom positions with nitrogen had a profound impact on whether or not an LTA structure is achieved (FIG. 36). Replacing carbon in position 4 of benzimidazolate gave ZIF-23 with a diamond dia topology. However, replacing carbon atoms in position(s) 5 or 5 and 7 gave ZIFs based on LTA structures. These positions are ideally suited for introducing link-link interactions and together with the geometric control imparted by the nitrogen atoms in positions 1 and 3 direct the structure specifically to LTA (FIG. 36). This approach is a new way to exploit structure-directing agents which also serve as linkers in contrast to the addition of alkylammonium ions and some organic molecules that are well studied in the synthesis of aluminosilicate zeolites.

The ZIFs with LTA topology were synthesized by a solvothermal reaction of $Zn(NO_3)_2.4H_2O$ or $Co(NO_3)_2.6H_2O$ and excess amount of purine in N,N-dimethylformamide (DMF) at 65° C. or 85° C., respectively, to give crystalline $Zn(Pur)_2.(DMF)_{0.75}(H_2O)_{1.5}$ (ZIF-20, Pur=purinate) and its Co(II) anagloue (ZIF-21).

Figure 37:
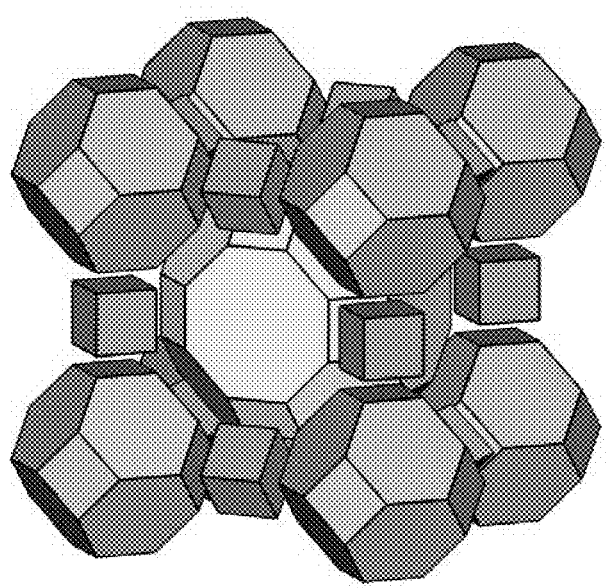
FIG. 37 depicts cage constituents of the LTA topology. The structure is shown as an exploded tiling of cubes, truncated octahedral and truncated cuboctahedra.
Figure 38:
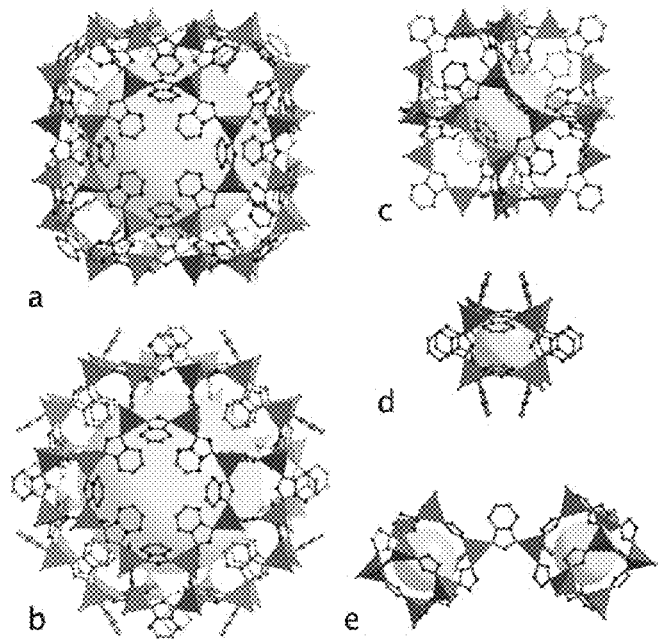
FIG. 38A-E show an X-ray single crystal structure of ZIF-20 having the same LTA topology as zeolite A. Here the oxygen and silicon atoms in zeolite A are replaced by benz-imidazolates and tetrahedral zinc atoms, respectively, to give an expanded two α-cages, a and b, β-cage, c, and cube, d. Linkage between two cubes, e, is important in the reticulation of the structure. The figure depicts a close approach of pairs of C/N atoms. $ZnN_4$ tetrahedra, carbon and nitrogen.

The framework of the LTA structure is illustrated in FIG. 37, which shows just the vertices (T atoms) and edges (links between the T atoms). It is simply made up of a tiling of cubes, truncated octahedra (β-cages), and truncated cuboctahedra (α-cages) in the ratio 3:1:1. In ZIF-20, the T atoms are Zn and the linkers are Pur bonding to Zn via the N atoms of the five-membered imidazolate ring (FIG. 38). In this structure the linkers are disordered. The N and C atoms in the 6-membered ring span a crystallographic mirror plane perpendicular to the ring, therefore C and N atoms are indistinguishable. A cubic unit cell of ZIF-20 with a=45.4725 Å contains 192 zinc ions within a unit cell volume of 94025.7(7) Å$^3$. The density (T/V) of metal atoms per unit volume is 2.04 nm$^{-3}$ which is much less than that of zeolite A (12.9 nm$^{-3}$). An identical structure was found for ZIF-21 in which Co replaces Zn.

FIG. 38 shows the separate cages in the structure of ZIF-20; notice that, because of the way the Pur linkers are oriented, there are two kinds of α-cage as depicted in FIGS. 38a and 38b. The α-cage comprises 48 Zn and 72 Pur (360 C, 216H, 288 N). The large pore with a diameter of 14.5 Å (FIG. 38a) or 15.4 Å (FIG. 38b) is surrounded by twelve 8-membered rings, eight 12-membered rings, and six 16-membered rings, in which Zn and C atoms in position 2 of Pur were taken as points on rings. The largest 16-membered ring has a pore aperture of 2.8 Å in diameter. The T . . . T distance (ca. 5.9 Å) in ZIF-20 is extended by replacement of oxide ion into imidazolate linker (the corresponding Si . . . Si distance in an aluminosilicate is ca. 3.0 Å), which resulted in the larger maximum pore size of the α-cage compared to that in zeolite A (11.4 Å). The β-cage [24 Zn and 36 Pur (180 C, 108H, 144 N)] (FIG. 38c) and the cube [8 Zn and 12 Pur (60 C, 36H, 48 N)] (FIG. 38d) have smaller cavities (5.3 and 4.5 Å, respectively) and smaller pore aperture (2.0 Å and 1.5 Å, respectively). Thus the β-cage can be accessed by some small molecules through the 16-membered window.

In order to elucidate the reason for the production of the LTA topology rather than the SOD and RHO (both obtained with benzimidazolate), either 4-azabenzimidazolate or 5-azabenzimidazolate was employed as a linker (FIG. 36). The former gave a new structure (ZIF-23) of dia topology, but the latter lead again to the LTA structure (ZIF-22) with essentially identical atomic coordinates, both of which were identified by single crystal X-ray crystallography.

To produce the LTA structure N atom are provided at the position 5 of the linker. Examination of all these structures shows that a unique feature of the structure is (see especially FIG. 38d) that pairs of pairs of atoms of the six-membered ring at the positions 5 and 6 approach each other closely (3.39 and 3.52 Å). This appears to be caused by an electrostatic interaction and a dipole-dipole interaction between the CH—N . . . N—CH pair at the positions 5 and 6 of two linkers. In the case of 4-azabenzimidazolate, however, the distances between two linkers at positions 4 and 7 are too far to make a favorable interaction as may be seen from FIG. 38d. Such interactions favor forming the cube, presumably at an early stage in crystallization of the LTA structure. The importance of the initial formation of the cube has also been proposed for zeolite A LTA synthesis.

Once a cube is formed, the LTA structure is the primary topological candidate which can propagate. As has been discussed elsewhere, there are two ways of linking cubes through one kind of edge and these lead to the LTA and ACO topologies, so these are expected to be the default topologies. The LTA structure is already tailored to 145° T-X-T links (in this case X=Im), but in the maximum symmetry form of ACO that angle must be 180°. One can decrease the angle in an ACO-derived structure by lowering the symmetry, but, and this is a key point, to make an imidazolate ACO the T—Im bonds would have to be distorted significantly away from the plane of the linking molecule, in this case the five-membered $C_3H_1N_2$ imidazolate ring. In fact for imidazolates the T—Im bonds are coplanar with the imidazolate ring; for example, in ZIF-20 the Zn—N—N—Zn dihedral angles are 0.00-0.15° and the cubes can be linked with a 145° angle and a planar linker (FIG. 38e).

Figure 39:
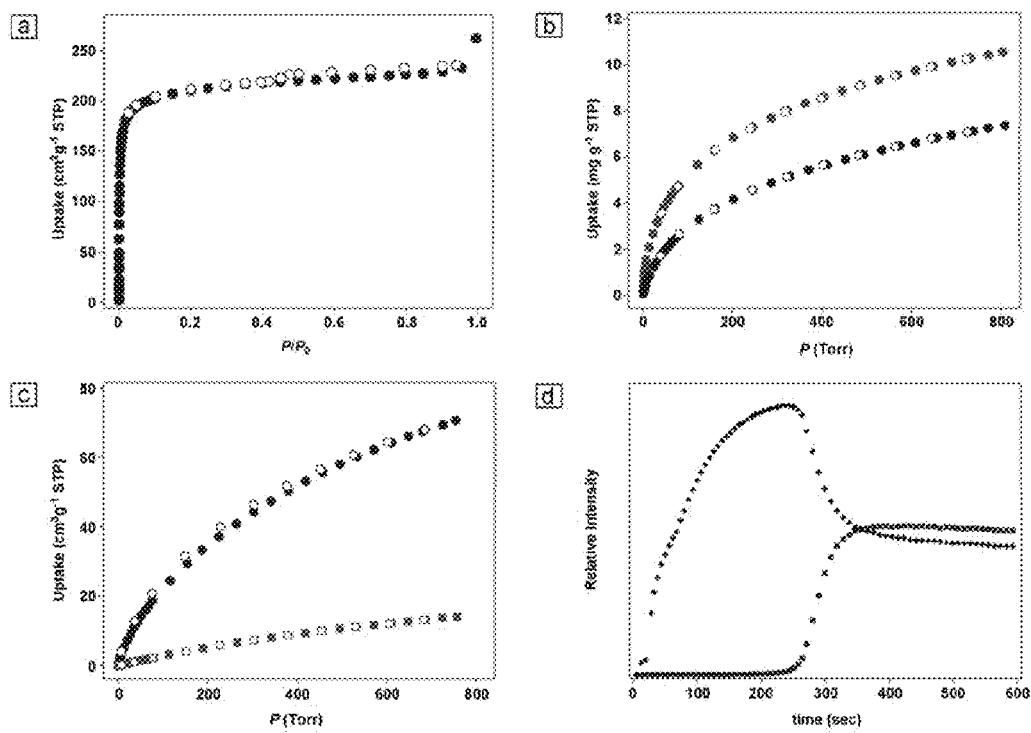
FIG. 39A-D shows gas adsorption isotherms of ZIF-20 for (a) Ar at 87 K, (b) H2 at 77 K (top) and 87 K (bottom), and (c) CO2 (top) and CH4 (bottom) at 273 K, and (d) breakthrough curves of CO2 (squares) and CH4 (+) for ZIF-20 using CO2/CH4 gas mixture. ZIF-20 has not only a permanent porosity, but also shows gas separation ability. Filled and open circles in a-c represent adsorption and desorption, respectively. In breakthrough experiment (d), the relative intensity of each gas passed through a ZIF-20 packed column were obtained on mass spectrometer detecting the ion peaks at m/z=44 (CO2) and 16 (CH4).
Figure 40:
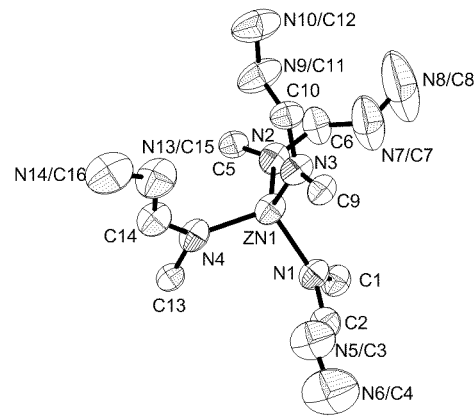
FIG. 40 shows ORTEP drawing of the asymmetric unit of ZIF-20, excluding the guest entities and hydrogen atoms are excluded also for clarity. Ellipsoids are displayed at the 50% probability level.
Figure 41:
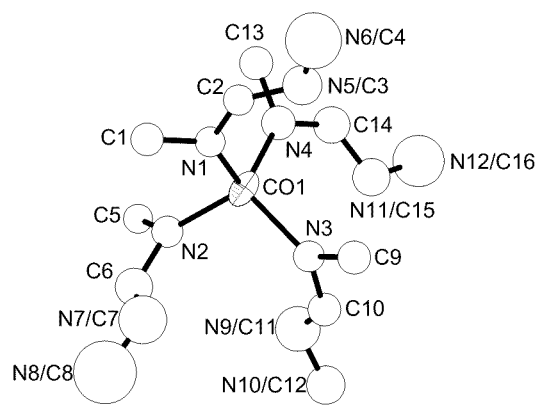
FIG. 41 shows ORTEP drawing of the asymmetric unit of ZIF-21, excluding the guest entities and hydrogen atoms are excluded also for clarity. Ellipsoids are displayed at the 50% probability level. Note that the organic purinate ligands have been refined isotropically.
Figure 42:
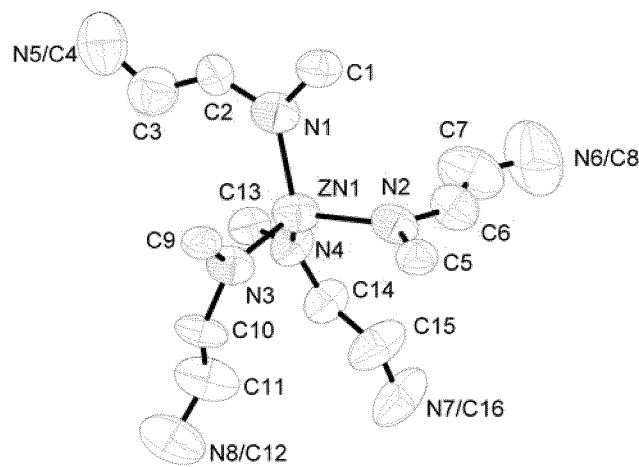
FIG. 42 shows ORTEP drawing of the asymmetric unit of ZIF-22, excluding the guest entities and hydrogen atoms are excluded also for clarity. Ellipsoids are displayed at the 50% probability level.
Figure 43:
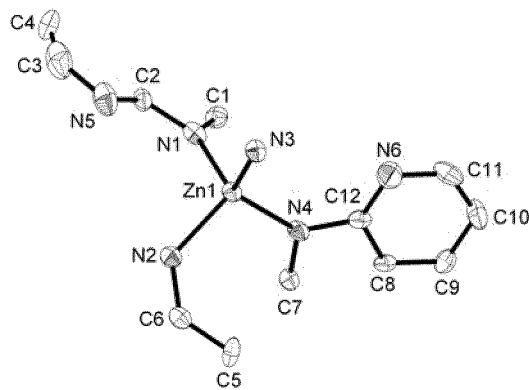
FIG. 43 shows ORTEP drawing of the asymmetric unit of ZIF-23, hydrogen atoms are excluded also for clarity. Ellipsoids are displayed at the 50% probability level.

The permanent porosity of guest-free (activated) ZIF-20 was proven by measurement of argon gas adsorption. As-synthesized ZIF-20 includes approximately 21 wt % of DMF and $H_2O$ estimated by an elemental analysis and a thermogravimetric analysis (TGA, FIG. 39). The activated sample was prepared by exchanging the solvent in as-synthesized ZIF-20 with methanol, followed by evacuation at room temperature. The methanol-exchanged and activated compounds were characterized by a TGA and powder X-ray diffraction (PXRD) measurement (see, FIGS. 48 and 44, respectively).

A type I isotherm (IUPAC classification) observed for Ar adsorption at 87 K (FIG. 39) indicates the microporosity of activated ZIF-20. The small $H_4$ hysteresis at $P/P_0 > 0.4$ can be attributed to intercrystalline voids in the sample. The maximum pore aperture (2.8 Å) of ZIF-20 determined from the crystal structure is smaller than the kinetic diameter of Ar (3.40 Å). However, the space inside the structure is accessible through a dynamic pore widening process wherein the Pur swing out of the way to allow gas molecules through. The apparent surface area and pore volume were calculated to be 800 m$^2$ g$^{-1}$ and 0.27 cm$^3$ g$^{-1}$ by applying the Langmuir and Dubinin-Radushkevitch (DR) equation, respectively.

The sample for the gas adsorption measurement was prepared as follows. The as-synthesized sample of ZIF-20 was immersed in anhydrous methanol in a glove box for 3 days; during the exchange the methanol was refreshed six times. The resulting methanol-exchanged sample of ZIF-20 in methanol was transferred to quartz cell in a glove box and the solvent was roughly decanted by pipette. The wet sample then was evacuated at ambient temperature for 12 h to yield an activated sample (ca. 200 mg) for gas adsorption measurements. The sample cell with a filler rod was attached to a valve in a glove box, which was kept closed until the start of the measurement, and then attached to the instrument without exposing the sample to air.

Low-pressure Ar adsorption experiment (up to 1 atm) was performed on a Quantachrome AUTOSORB-1 automatic volumetric instrument at 87K using a liquid argon bath. Apparent surface areas of 800 m$^2$ g$^{-1}$ (Langmuir, the linearity of fitting, 0.999967) was obtained by using the data points on the adsorption branch in the range of $P/P_0=0.02-0.10$. Micropore volume of 0.27 cm$^3$ g$^{-1}$ was obtained by applying the Dubinin-Radushkevitch (DR) equation (the linearity of fitting, 0.999781) in the range of $P/P_0=0.02-0.10$. Surface adsorption due to the quartz cell and filler rod was below 0.4% of the observed uptake with sample.

Data was collected on a Bruker SMART APEXII three circle diffractometer equipped with a CCD area detector and operated at 1200 W power (40 kV, 30 mA) to generate Cu Kα radiation (λ=1.5418 Å) radiation. The incident X-ray beam was focused and monochromated using Bruker Excalibur Gobel mirror optics. All crystals were mounted on nylon CryoLoops (Hampton Research) with Paraton-N (Hampton Research). Initial scans of each specimen were taken to gain preliminary unit cell parameters and to assess the mosaicity (i.e. breadth of spots between frames) of the crystal to select the required frame width for data collection. For all cases frame widths of 0.3° were judged to be appropriate and full hemispheres of data were collected using the Bruker APEX2[1] software suite to carry out overlapping Φ and ω scans at three different detector (2θ) settings (2θ=28, 60, 100°). Following data collection, reflections were sampled from all regions of the Ewald sphere to redetermine unit cell parameters for data integration and to check for rotational twinning using CELL_NOW. No evidence for crystal decay was ever encountered. Following exhaustive review of collected frames the resolution of the dataset was judged, and if necessary regions of the frames where no coherent scattering was observed were removed from consideration for data integration using the Bruker SAINTplus program. Data was integrated using a narrow frame algorithm and subsequently corrected for absorption. Space group determination and tests for merohedral twinning were carried out using XPREP. In all cases the highest possible space group was chosen and no indications of merohedral twinning observed.

Figure 44:
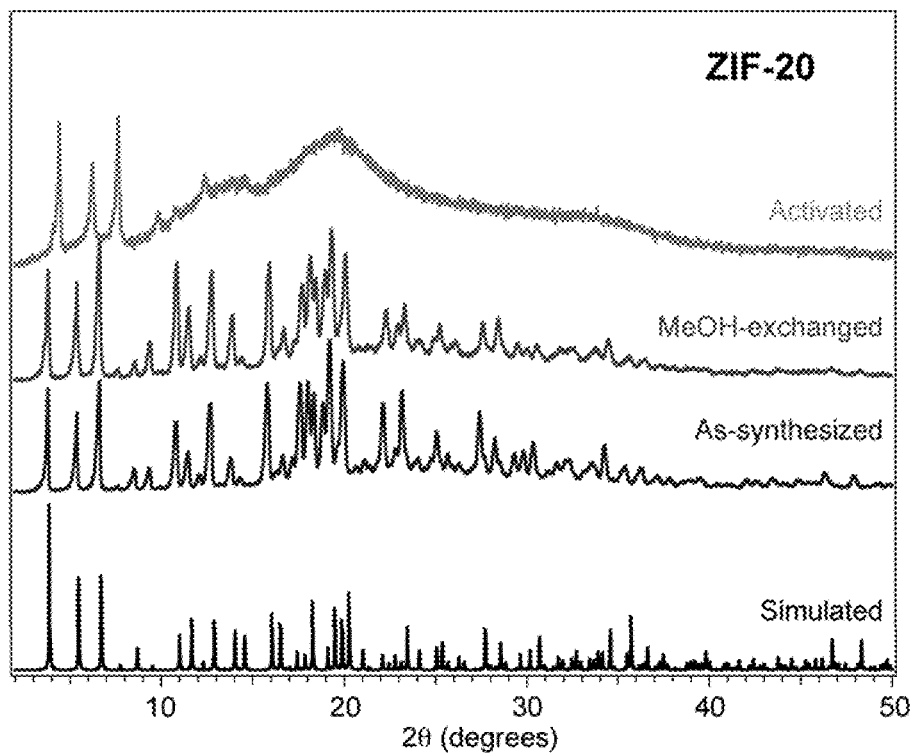
FIG. 44 shows a comparison of the experimental PXRD pattern of as-synthesized (blue), MeOH-exchanged and activated ZIF-20 along with the simulated pattern from the single X-ray crystal structure.
Figure 45:
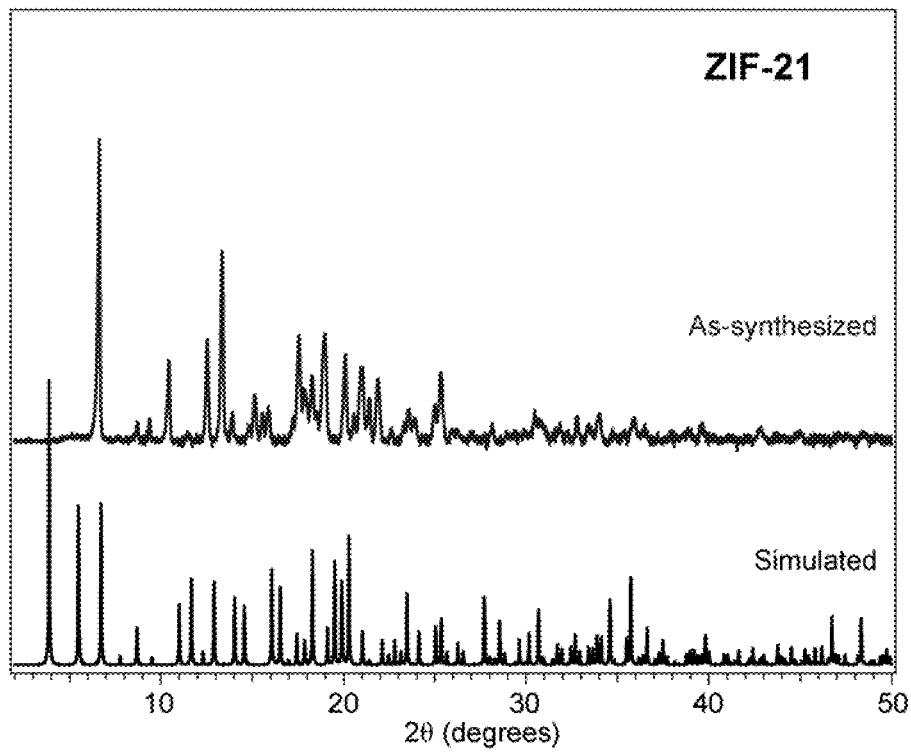
FIG. 45 shows a comparison of the experimental PXRD pattern of as-synthesized ZIF-21 along with the simulated pattern from the single X-ray crystal structure.
Figure 46:
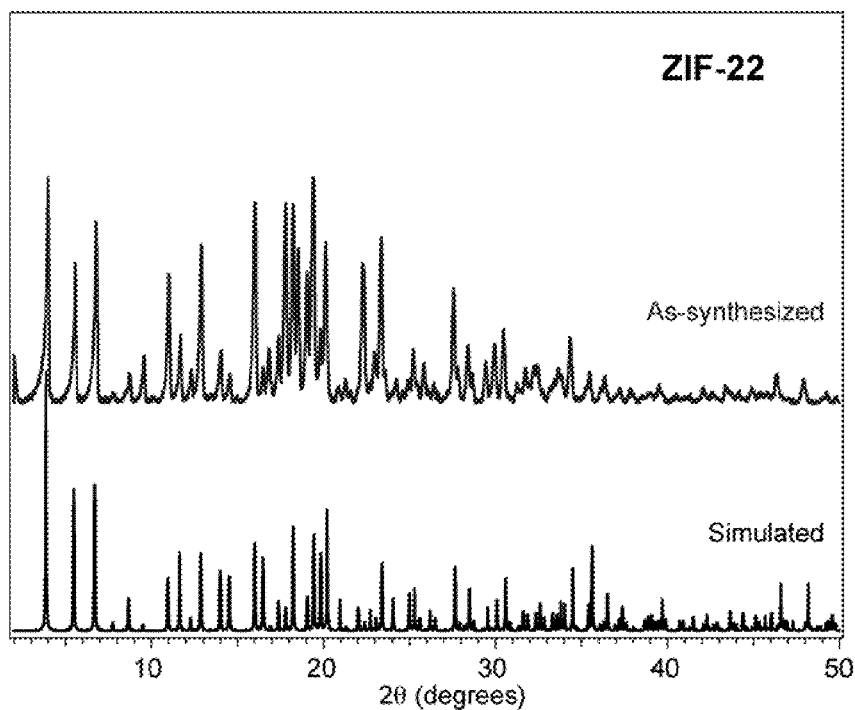
FIG. 46 shows a comparison of the experimental PXRD pattern of as-synthesized ZIF-22 along with the simulated pattern from the single X-ray crystal structure.
Figure 47:
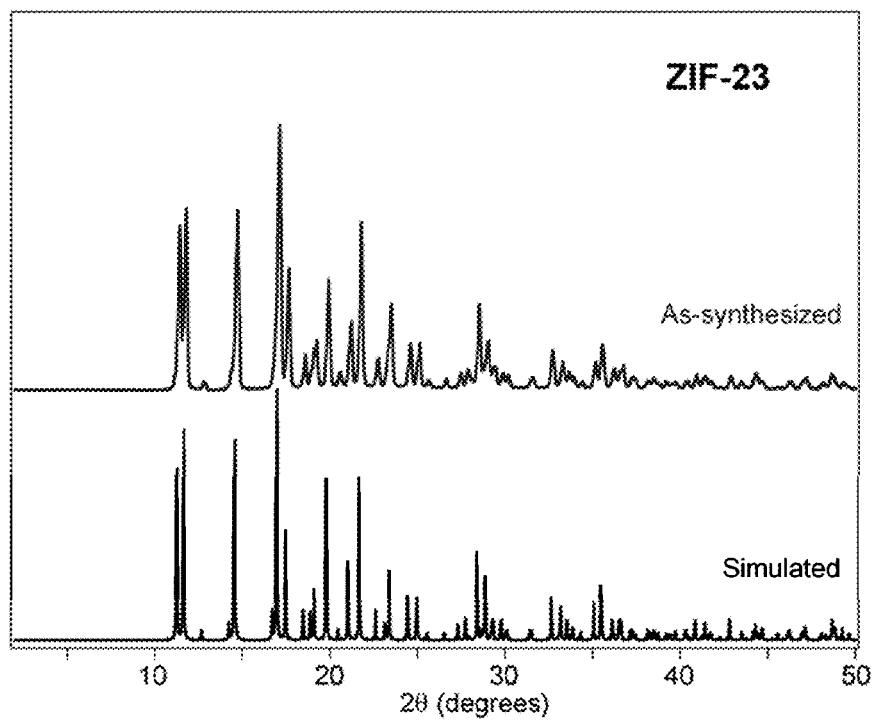
FIG. 47 shows a comparison of the experimental PXRD pattern of as synthesized ZIF-23 along with the simulated pattern from the single X-ray crystal structure.

The diffraction pattern collected for as-synthesized ZIFs are shown in FIG. 44-47 along with the simulated ones from their single X-ray crystal structures. The data for MeOH-exchanged and activated materials of ZIF-20 were also included as shown in FIG. 44.

Figure 48:
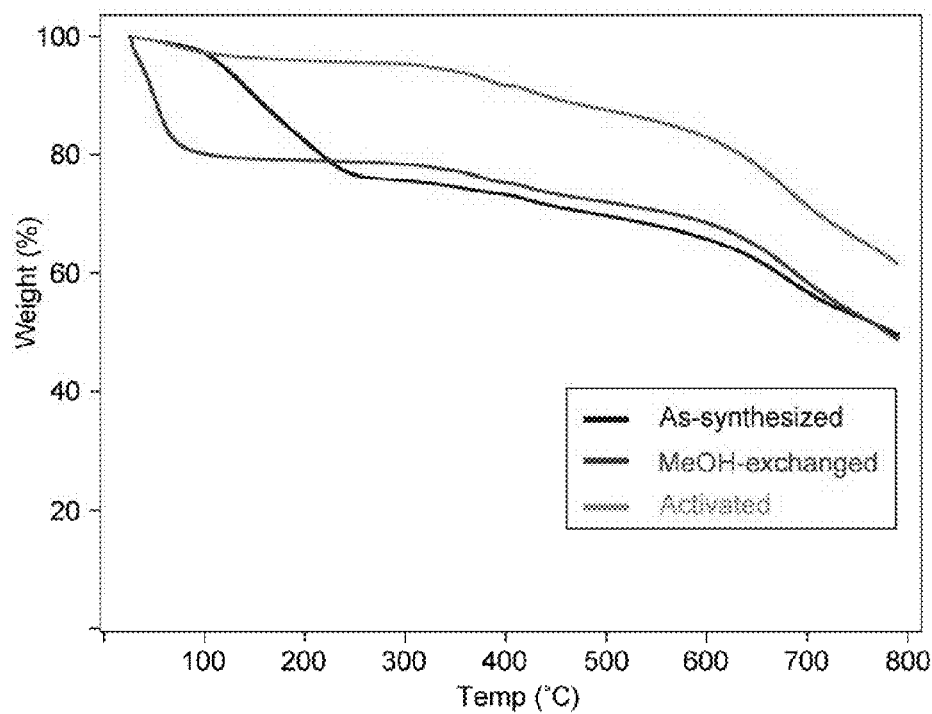
FIG. 48 is an overlay of TGA traces of as-synthesized, solvent-exchanged, and activated samples of ZIF-20.
Figure 49:
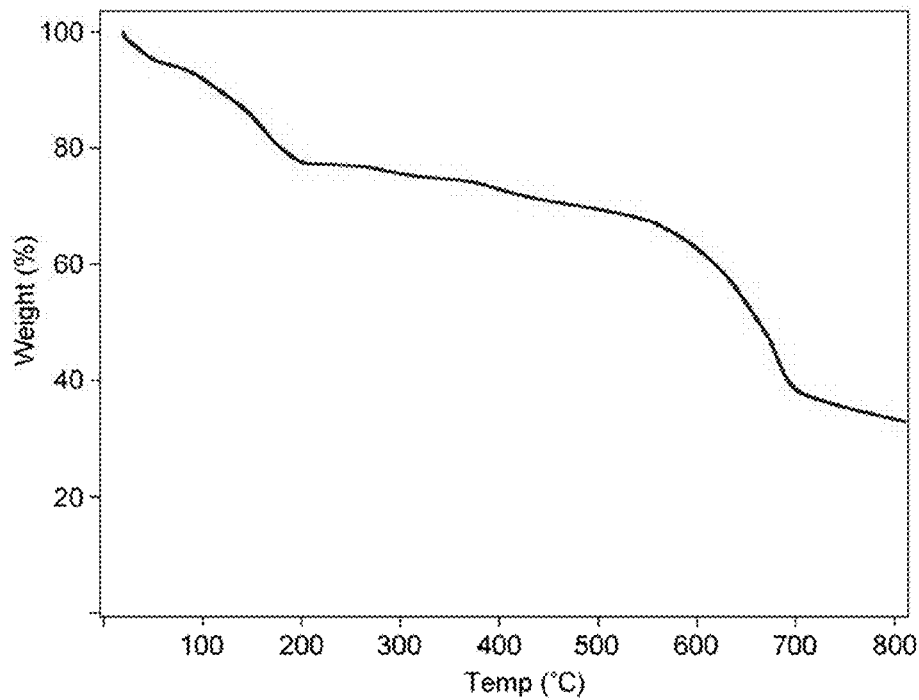
FIG. 49 shows a TGA trace of as-synthesized sample of ZIF-21.
Figure 50:
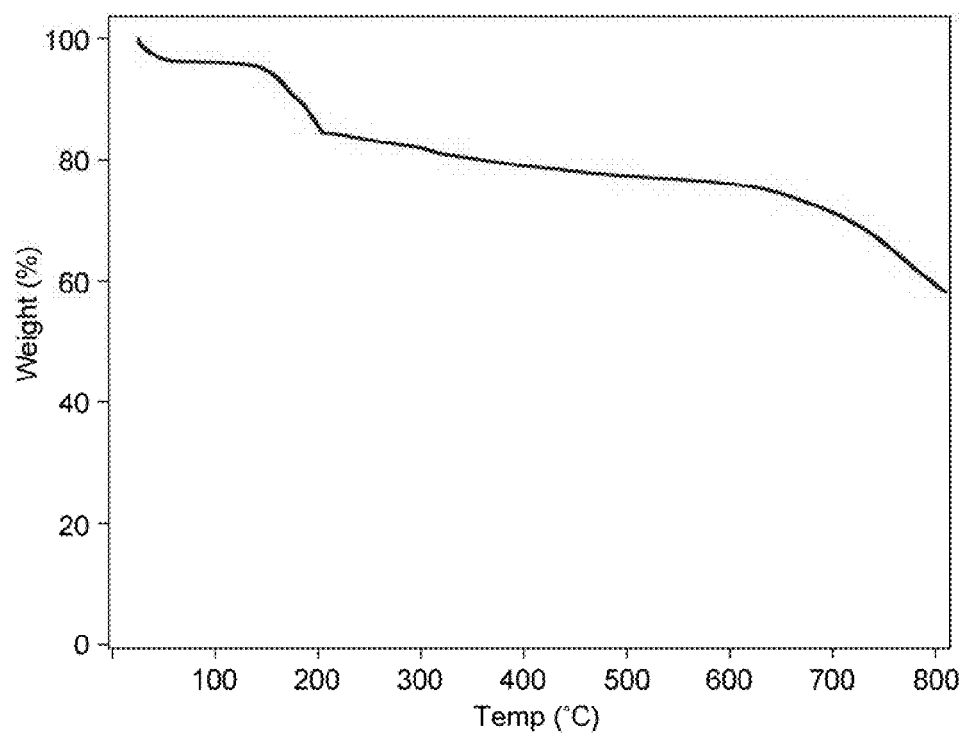
FIG. 50 shows a TGA trace of as-synthesized sample of ZIF-22.

The TGA traces of as-synthesized ZIF-20, -21, and -22 are shown in FIG. 48-50, respectively. The weight-loss of 23% up to 250° C. in ZIF-20 corresponds to the release of guest molecules (0.75 DMF and 1.5H$_2$O; calcd. 21%), despite the fact that DMF is actually much larger than the aperture of ZIF-20 in size. The weight-loss of 23% up to 210° C. in ZIF-21 corresponds to the release of guest molecules (1 DMF and 1H$_2$O; calcd. 23%). The weight-loss of 20% up to 250° C. in ZIF-22 corresponds to the release of guest molecules (0.75 DMF and 2H$_2$O; calcd. 23%).

FIG. 48 also shows the TGA traces of a MeOH-exchanged and an activated ZIF-20. The original weight-loss up to 250° C. in as-synthesized material was replaced by an initial step of 20% around ambient temperature, indicative of the effective solvent-exchange by methanol. Although DMF molecule is actually much larger than the aperture of ZIF-20 in size, the solvent-exchange behavior can be explained by a dynamic structure of ZIF-20 as discussed for ZIF-11 in previous report. The profile for an activated material indicates that the solvent molecules captured in the pore were mostly removed, although slight weight-loss (~3%, probably due to H$_2$O) was observed.

As mentioned above, the compounds may be formulated T(Im)$_2$ (Im=imidazolate and its derivatives, T=tetrahedrally bonded metal ion) and are similar to the (Al)SiO$_2$ frameworks of (alumino)silicate zeolites; in particular the T-Im-T angle of 145° is close to the Si—O—Si angle typically found in zeolites. Not surprisingly, that for materials with both the RHO and SOD zeolite topologies, the same framework composition is obtained using benzimidazolate as a linker (FIG. 36). In each of these structures there is only one type of cage. In the efforts to prepare a ZIF with the zeolite A (LTA) topology, which has two types of cage (□ and □), replacing key carbon atom positions with nitrogen had a profound impact on whether or not the LTA structure is achieved (FIG. 36). Replacing carbon in position 4 of benzimidazolate gave ZIF-23 with a diamond dia topology. However, replacing carbon atoms in position(s) 5 or 5 and 7 gave ZIFs based on LTA structures. As will be explained below, these positions are ideally suited for introducing link-link interactions and together with the geometric control imparted by the nitrogen atoms in positions 1 and 3 direct the structure specifically to LTA (FIG. 36). This approach is a new way to exploit structure-directing agents which also serve as linkers in contrast to the addition of alkylammonium ions and some organic molecules that are well studied in the synthesis of aluminosilicate zeolites.

The structure of ZIF-20 was determined from single-crystal X-ray diffraction data. The framework of the LTA structure is illustrated in FIG. 37, which shows just the vertices (T atoms) and edges (links between the T atoms). It is simply made up of a tiling of cubes, truncated octahedra (β-cages), and truncated cuboctahedra (α-cages) in the ratio 3:1:1. In ZIF-20, the T atoms are Zn and the linkers are Pur bonding to Zn via the N atoms of the five-membered imidazolate ring (FIG. 38). In this structure the linkers are disordered, because the N and C atoms in the 6-membered ring span a crystallographic mirror plane perpendicular to the ring and are therefore indistinguishable. A cubic unit cell of ZIF-20 with a=45.4725(2) Å contains 192 zinc ions within a unit cell volume of 94025.7(7) Å$^3$. The density (T/V) of metal atoms per unit volume is 2.04 nm$^{-3}$ which is much less than that of zeolite A (12.9 nm$^{-3}$)[13]. The identical structure where Co replaces Zn, ZIF-21, was also crystallized.

FIG. 38 shows the separate cages in the structure of ZIF-20; notice that, because of the way the Pur linkers are oriented, there are two kinds of □-cage as depicted in FIGS. 38a and 3b. The □-cage consists of 48 Zn and 72 Pur (360 C, 216H, 288 N). The large pore with a diameter of 14.5 Å (FIG. 38a) or 15.4 Å (FIG. 38b) is surrounded by twelve 8-membered rings, eight 12-membered rings, and six 16-membered rings, in which Zn and C atoms in position 2 of Pur were taken as points on rings. The largest 16-membered ring has a pore aperture of 2.8 Å in diameter. The T . . . T distance (ca. 5.9 Å) in ZIF-20 is extended by replacement of oxide ions with imidazolate linkers (the corresponding Si . . . Si distance in aluminosilicates is ca. 3.0 Å), which results in the larger maximum pore size of the □-cage compared to that in zeolite A (11.4 Å). The □-cage [24 Zn and 36 Pur (180 C, 108H, 144 N)] (FIG. 38c) and the cube [8 Zn and 12 Pur (60 C, 36H, 48 N)] (FIG. 38d) have smaller cavities (5.3 and 4.5 Å, respectively) and smaller pore aperture (2.0 Å and 1.5 Å, respectively). Thus the □-cage can be accessed by some small molecules through the 16-membered window as described below.

In order to elucidate the reason for the formation of the LTA topology rather than the SOD and RHO (both obtained with benzimidazolate), either 4-azabenzimidazolate or 5-azabenzimidazolate was used as a linker (FIG. 36). The former gave a new structure (ZIF-23) of dia topology, but the latter lead again to the LTA structure (ZIF-22) with essentially identical atomic coordinates as ZIF20, both of which were identified by single crystal X-ray crystallography (see Supplementary Information).

To produce the LTA an N atom is provided at the position 5 of the linker. Examination of all these structures shows that a feature of the structure is (see especially FIG. 38d) that pairs of pairs of atoms in six-membered rings at positions 5 and 6 approach each other closely (3.39 and 3.52 Å). This appears to be caused by an electrostatic interaction and a dipole-dipole interaction between the CH—N . . . N—CH pair at the positions 5 and 6 of two linkers. In the case of 4-azabenzimidazolate, however, the distances between two linkers at positions 4 and 7 are too far to form favorable interactions as may be seen from FIG. 38d. Such interactions favor forming the cube, presumably at an early stage in crystallization of the LTA structure. The importance of the initial formation of the cube has also been proposed for zeolite A LTA synthesis.

Once a cube is formed, the LTA structure is the primary topological candidate which can propagate. As has been discussed elsewhere, there are only two ways of linking cubes through one kind of edge and these lead to the LTA and ACO topologies, it is expected that these are the default topologies. The LTA structure is already tailored to 145° T-X-T links (in this case X=Im), but in the maximum symmetry form of ACO that angle must be 180°. One can decrease the angle in an ACO-derived structure by lowering the symmetry, but, and this is a key point, to make an imidazolate ACO the T-Im bonds would have to be distorted significantly away from the plane of the linking molecule, in this case the five-membered C$_3$H$_1$N$_2$ imidazolate ring. In fact for all imidazolates examined the T-Im bonds are coplanar with the imidazolate ring; for example in ZIF-20 the Zn—N—N—Zn dihedral angles range 0.00-0.15° and the cubes can be linked with a 145° angle and a planar linker (FIG. 38e).

The permanent porosity of guest-free (activated) ZIF-20 was proven by gas adsorption measurements. As-synthesized ZIF-20 includes approximately 21 wt % of DMF and $H_2O$ molecules as quantified from thermogravimetric analysis (TGA) corroborated by elemental microanalysis (FIG. 48). The activated sample was prepared by exchanging the solvent in as-synthesized ZIF-20 with methanol, followed by evacuation at room temperature. The methanol-exchanged and activated compounds were characterized by TGA and powder X-ray diffraction (PXRD) measurements to assure full activation was achieved (FIGS. 48 and 44, respectively).

The type I isotherm (IUPAC classification) observed for Ar adsorption at 87 K (FIG. 39a) indicates the microporosity of activated ZIF-20. The small $H_4$ hysteresis at $P/P_0>0.4$ can be attributed to intercrystalline voids in the sample (see Supplementary Information). The maximum pore aperture (2.8 Å) of ZIF-20, as measured from its crystal structure, is smaller than the kinetic diameter of Ar (3.40 Å). However, the space inside the structure becomes accessible through a dynamic aperture widening process wherein the Pur swing out of the way to allow gas molecules to pass. The apparent surface area and pore volume were calculated to be 800 $m^2$ $g^{-1}$ and 0.27 $cm^3$ $g^{-1}$ by applying the Langmuir and Dubinin-Radushkevitch (DR) equation, respectively.

Figure 51:
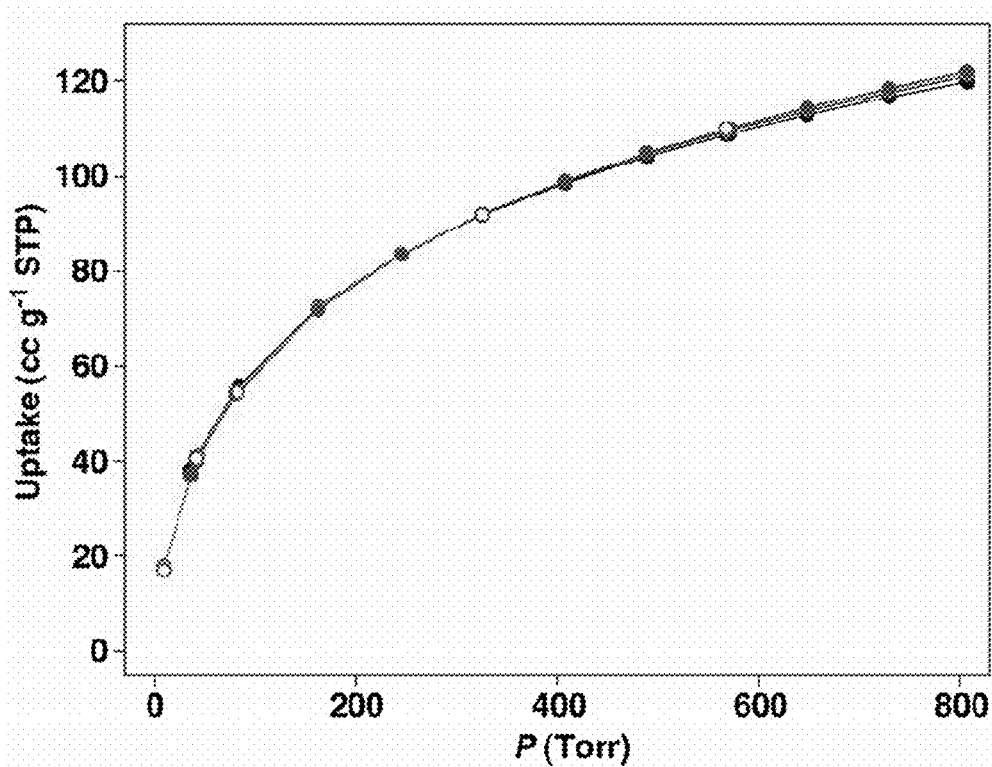
FIG. 51 shows the repeatability of the $H_2$ isotherm of ZIF-20 at 77 K through repeated cycles. Filled and open circles represent adsorption and desorption, respectively.

Adsorption isotherms for $H_2$ were collected at 77 and 87 K as shown in FIG. 39b. It should be noted that the repeatability of the $H_2$ adsorption behavior was confirmed by reproducing the same isotherm four times at 77 K (FIG. 51). The uptake at ~800 Torr for 77 K is 1.1 wt % which is slightly lower than those for ZIF-8 (1.3 wt %) and ~11 (1.4 wt %)[9]. The initial uptake of ZIF-20, however, is much higher than ZIF-8 and comparable to ZIF-11. This suggests a relatively strong interaction between the ZIF-20 framework and $H_2$ exists. The presence of a strong interaction was also expected by the analysis of the isosteric heat of adsorption ($Q_{st}$), which is calculated by using parameters obtained by fitting the isotherms at 77 K and 87 K to a virial-type expression (see Supplementary Information for detail)[19,20]. The initial $Q_{st}$ value is estimated to be 8.5 kJ $mol^{-1}$ that is relatively high compared to the other porous materials[20], such as some porous MOFs with small pores[21]. Also, theoretical study suggests that nitrogen atoms on aromatic rings in framework can enhance the adsorption energy of $H_2$. In this case, the both effects are available to bind $H_2$ strongly.

The adsorption of $CO_2$ and $CH_4$ gas on ZIF-20 were also examined at 273 K. As shown in FIG. 39c, the $CO_2$ uptake at 760 Torr is five times higher than $CH_4$, suggesting a stronger interaction between the framework and $CO_2$ molecules. This behavior led us to examine a $CO_2$ separation from $CH_4$, which is an essential industrial process for natural gas purification/combustion and landfill gas separation[23]. A preliminary breakthrough experiment (see Methods and FIG. 52) using $CO_2/CH_4$ (ca. 50:50 v/v) gas mixture was carried out in a column packed with activated ZIF-20 sample. Indeed, the breakthrough curves clearly show that ZIF-20 can separate $CO_2$ from $CH_4$ (FIG. 39d). This gas separation behavior is likely the result of uncoordinated nitrogen atoms inducing a polar pore wall, thus favorable $CO_2$ binding sites, and/or the appropriate pore size that prefers $CO_2$ rather than $CH_4$. Further study is in progress to fully understand the effect of the functionality for gas storage and separation properties of ZIFs and will be reported in future.

ZIFs are a new class of porous materials that potentially have the advantages both of inorganic zeolites (e.g., high stability) and of MOFs (e.g., high porosity and organic functionality), which could be applied to highly efficient catalysis and separations. From a synthetic perspective, ZIF topologies can be directed by the molecular structure of the organic linker and rationalized by examining the resulting linker-linker interactions in the ZIFs. The potential difficulty in predicting ZIF structures, such as is always encountered in zeolite chemistry, can be overcome by further detailing the linker requirements for forming the basic secondary building units (cube in the case of LTA) in the structure. The accumulation of such information, should allow the development of strategies based on the principles of reticular chemistry[24] to create new zeolite structures with organic and transition metal units.

The sample for the gas adsorption measurement was prepared as follows. The as-synthesized sample of ZIF-20 was immersed in anhydrous methanol in a glove box for 3 days; during the exchange the methanol was refreshed six times. The resulting methanol-exchanged sample of ZIF-20 in methanol was transferred to quartz cell in a glove box and the solvent was roughly decanted by pipette. The wet sample then was evacuated at ambient temperature for 12 h to yield an activated sample (ca. 200 mg) for gas adsorption measurements. The sample cell with a filler rod was attached to a valve in a glove box, which was kept closed until the start of the measurement, and then attached to the instrument without exposing the sample to air.

Low-pressure gas adsorption experiments (up to 1 atm) were performed on a Quantachrome AUTOSORB-1 automatic volumetric instrument. Ultra-high purity (UHP) grade of gases were used in all adsorption measurements. The Ar (87 K), $H_2$ (77 and 87 K), $CO_2$ (273 K), and $CH_4$ (273 K) isotherm were measured using a liquid argon bath (77 K), a liquid nitrogen bath (87 K), and an ice bath (273 K), respectively.

Figure 53:
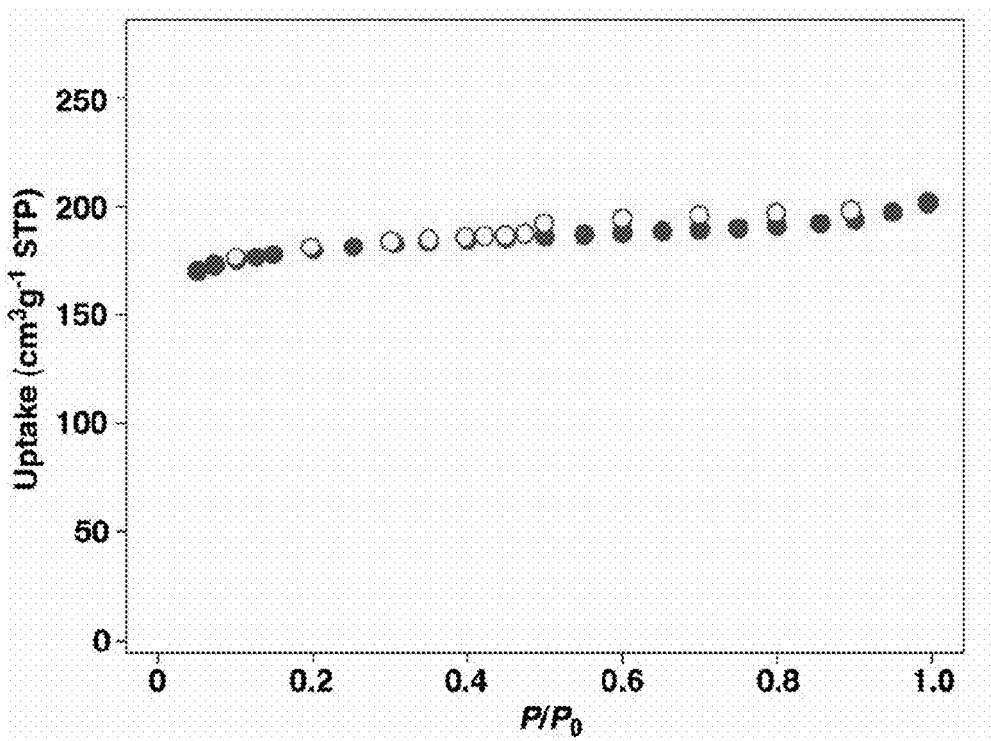
FIG. 53 shows N2 adsorption isotherm of ZIF-20 monitored at 77 K. Filled and open circles represent adsorption and desorption, respectively.

Apparent surface areas of 800 $m^2$ $g^{-1}$ (Langmuir, the linearity of fitting, 0.999967) was obtained by using the data points on the adsorption branch of Ar isotherm in the range of $P/P_0=0.02$-0.10. Micropore volume of 0.27 $cm^3$ $g^{-1}$ was obtained by applying the Dubinin-Radushkevitch (DR) equation (the linearity of fitting, 0.999781) in the range of $P/P_0=0.02$-0.10. Surface adsorption due to the quartz cell and filler rod was below 0.4% of the observed uptake with sample. The $N_2$ adsorption isotherm was also measured at 77 K (FIG. 53), although the extremely slow diffusion through the tight pore apertures of ZIF-20 prevented us to take a complete isotherm starting in the low pressure region. From the $N_2$ isotherm, almost the same Langmuir surface areas (790 $m^2$ $g^{-1}$, the linearity of fitting, 0.999986) and micropore volume (0.28 $cm^3$ $g^{-1}$, the linearity of fitting, 0.999415) were obtained.

Figure 52:
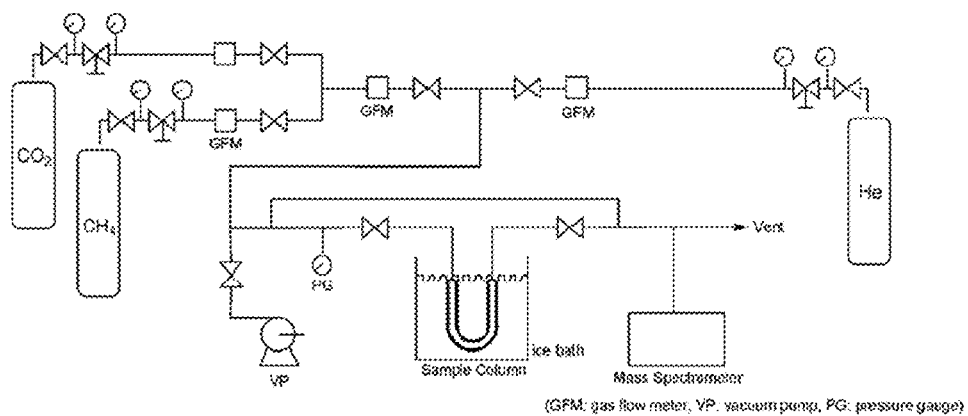
FIG. 52 shows a schematic of system used in the adsorption measurements.

Preliminary gas separation property of ZIF-20 was examined by a breakthrough experiment using $CO_2/CH_4$ gas mixture (ca. 50:50 v/v). Activated sample (1.3 g) of ZIF-20 was packed into a stainless steel column (0.46 i.d.×17 cm) in a glove box. The column was then attached to gas separation apparatus built as shown in FIG. 52. Helium gas was initially purged into the sample column. The column was cooled to 273 K using an ice bath. The gas mixture (20 psi) was dosed into the column at a flow rate of 20 mL/min. The relative amount of gases passed through the column were monitored on Hiden Analytical HPR20 benchtop gas analysis system by detecting ion peaks at m/z 44 ($CO_2$) and 16 ($CH_4$). Gentle rising slope of $CH_4$ profile is due to the initial displacement of purge He gas.

The Ar isotherm in FIG. 39a shows a small H$_4$ hysteresis at P/P0>0.4. Although the hysteresis is likely attributed to intercrystalline voids in the sample, there is another possibility of the structural transition during the sorption process because of the small aperture of ZIF-20.

Figure 54:
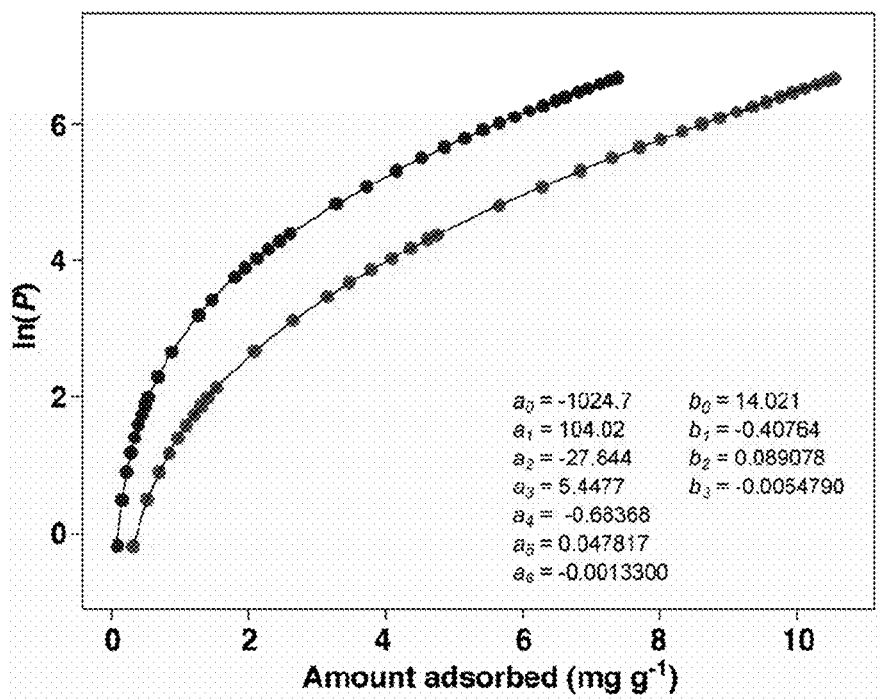
FIG. 54 shows a graph fitting for H2 adsorption isotherms of ZIF-20 measured at 77K (bottom curve) and 87K (top curve).
Figure 55:
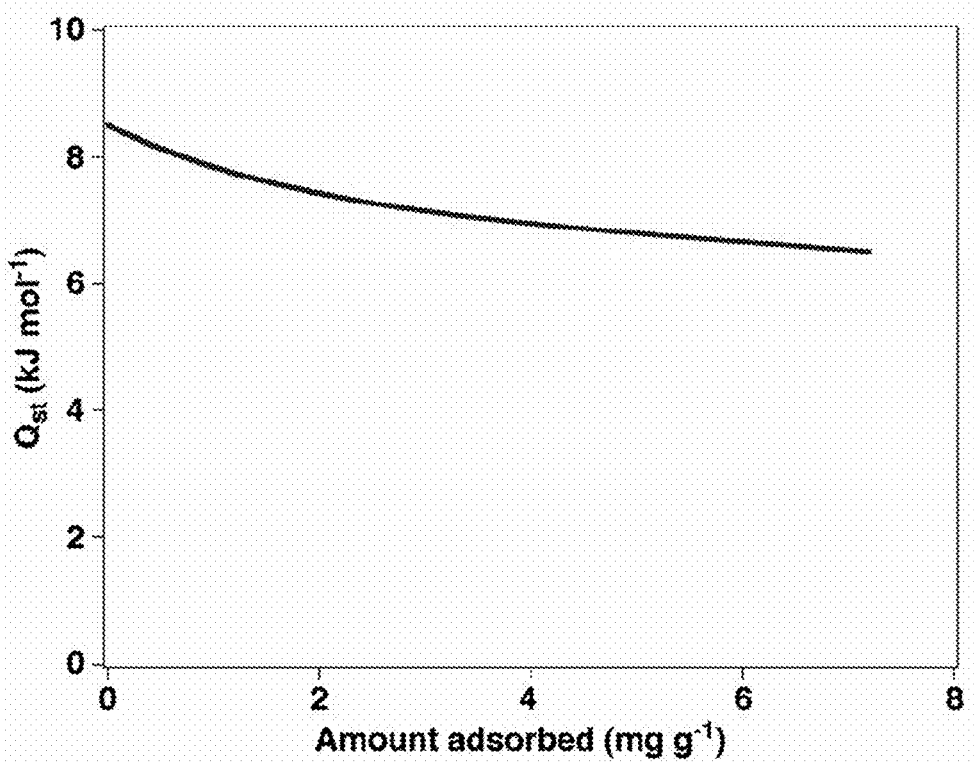
FIG. 55 shows the coverage dependency of isosteric heat of adsorption for H2 in ZIF-20.
Figure 56:
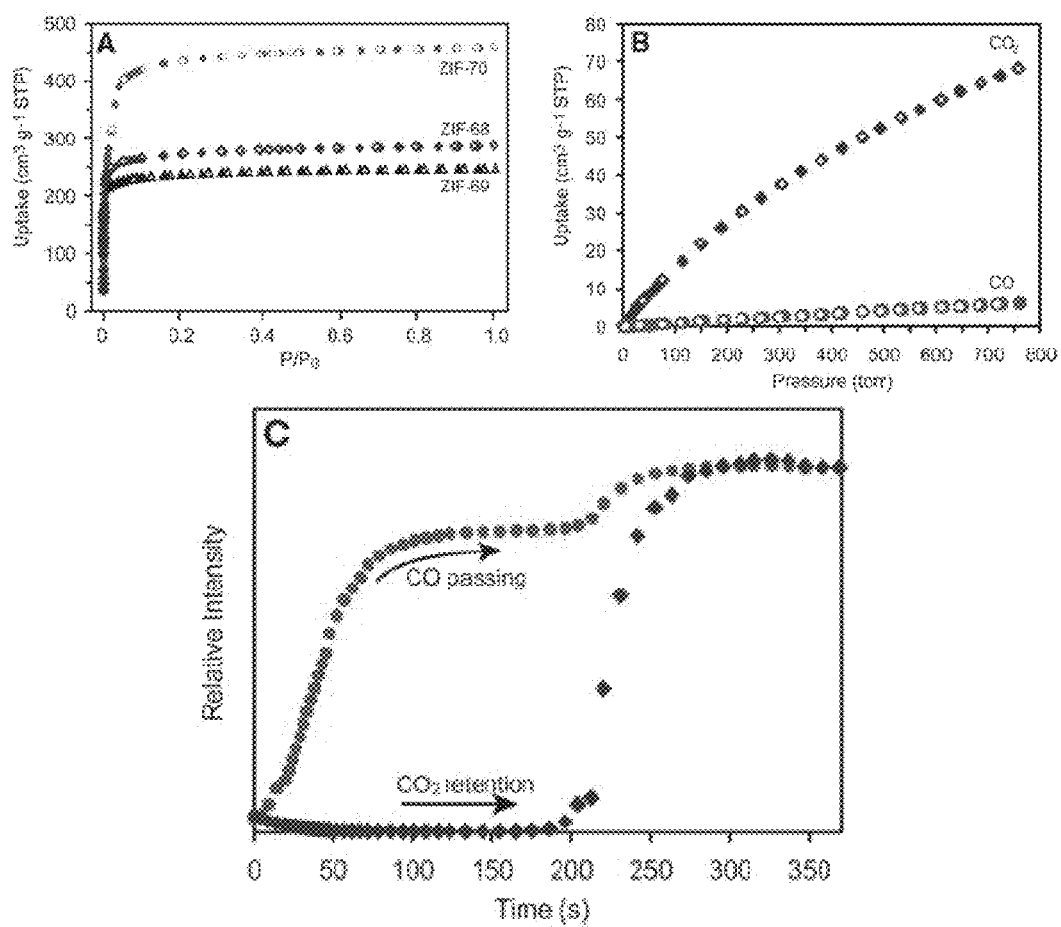
FIG. 56. Shows gas adsorption isotherms and CO2 capture properties of ZIFs. (A) The $N_2$ adsorption isotherms for heterolinked ZIF-68, 69, and 70 at 77 K. P/P0, relative pressure; STP, standard temperature and pressure. (B) The CO2 and CO adsorption isotherms for ZIF-69 at 273 K. For (A) and (B), the gas uptake and release are indicated by solid and open symbols, respectively. (C) Breakthrough curves of a stream of $CO_2$/CO mixture passed through a sample of ZIF-68 showing the retention of CO2 in the pores and passage of CO.

The isosteric heat of adsorption (Qst) for H$_2$ adsorption of ZIF-20 was calculated as follows. The isotherms obtained at 77 and 87 K were fitted by a viral-type equation involving parameters a$_i$ and b$_i$ that are independent of temperature:

$$\ln P = \ln N + \frac{1}{T}\sum_{i=0}^{m} a_i N^i + \sum_{i=0}^{n} b_i N^i$$

where P is pressure, N is the amount adsorbed, T is temperature, and m and n determine the number of terms required to adequately describe the isotherm. The best fit was obtained at m=6 and n=3 as shown in FIG. 54. Using the parameters, a$_i$ and b$_i$, the Qst was calculated according to:

$$Q_{st} = -R\sum_{i=0}^{m} a_i N^i$$

where R is gas constant. The coverage dependency of Qst was shown in FIG. 55.

Although a number of embodiments and features have been described above, it will be understood by those skilled in the art that modifications and variations of the described embodiments and features may be made without departing from the teachings of the disclosure or the scope of the invention as defined by the appended claims.

What is claimed:

1. A method of separating a component gas from a multi-component gas, comprising contacting a functionalized zeolitic framework with the multi-component gas,
   wherein a component of the multi-component gas is selectively adsorbed to the functionalized zeolitic framework by electrostatically interacting with the one or more electron withdrawing group of the pore walls, thereby separating the absorbed component from other components in the multi-component gas,
   wherein the functionalized zeolitic framework is ZIF-68, ZIF-69, or ZIF-70, and
   wherein the method comprises either (a) separating the component gas from a multicomponent gas, where the multicomponent gas is natural gas, or (b) separating the component gas from a multi-component gas that is rich in methane and contains CO$_2$, where the component gas is CO$_2$ and the component gas is adsorbed by the zeolitic framework.

2. The method of claim 1, wherein the functionalized zeolitic framework comprises a plurality of pores, each of the plurality of pores comprises a sufficient number of accessible sites for atomic or molecular adsorption.

3. The method of claim 2, wherein a surface area of a pore of the plurality of pores is greater than about 2000 m$^2$/g.

4. The method of claim 2, wherein a surface area of a pore of the plurality of pores is about 3,000-18,000 m$^2$/g.

5. The method of claim 2, wherein a surface area of a pore of the plurality of pores is about 3,000-6,000 m$^2$/g.

6. The method of claim 2, wherein a pore of the plurality of pores comprises a pore volume 0.1 to 0.99 cm$^3$/cm$^3$.

7. The method of claim 2, wherein a pore of the plurality of pores comprises a pore volume of 0.4-0.5 cm$^3$/cm$^3$.

8. The method of claim 1, wherein the functionalized zeolitic framework has a framework density of about 0.17 g/cm$^3$.

9. The method of claim 1, wherein the adsorbed component is selected from the group consisting of ammonia, carbon dioxide, hydrogen, amines, oxygen, argon, nitrogen, organic dyes, polycyclic organic molecules, and combinations thereof.

10. A method of separating a component from a multi-component gas, comprising: passing a multi-component gas through a functionalized zeolitic imidazolate framework comprising one or more pore walls that are polar, wherein the component gas is selectively adsorbed to the polar pore walls of the functionalized zeolitic imidazolate framework, wherein the functionalized zeolitic imidazolate framework is ZIF-68, ZIF-69, or ZIF-70, and wherein the multicomponent gas is (a) natural gas, or (b) a multi-component gas that is rich in methane and contains CO$_2$, where the component gas is CO$_2$ and the component gas is adsorbed by the zeolitic framework.

11. The method of claim 1 or 10, wherein the multi-component gas is natural gas.

12. The method of claim 1 or 10, wherein the multi-component gas is rich in methane and contains CO$_2$ and CO$_2$ is the component that is being selectively adsorbed by the functionalized zeolitic framework.

* * * * *

UNITED STATES PATENT AND TRADEMARK OFFICE
CERTIFICATE OF CORRECTION

| | | |
|---|---|---|
| PATENT NO. | : 8,540,802 B2 | Page 1 of 1 |
| APPLICATION NO. | : 12/598855 | |
| DATED | : September 24, 2013 | |
| INVENTOR(S) | : Omar M. Yaghi, Hideki Hayashi and Rahul Banerjee | |

It is certified that error appears in the above-identified patent and that said Letters Patent is hereby corrected as shown below:

In Column 1, line 10, insert the following new paragraph:

--STATEMENT REGARDING FEDERALLY SPONSORED RESEARCH OR DEVELOPMENT

This invention was made with Government support under Grant No. DE-FG02-06ER15813, awarded by the Department of Energy. The Government has certain rights in the invention.--

Signed and Sealed this
First Day of March, 2016

Michelle K. Lee
*Director of the United States Patent and Trademark Office*